(12) United States Patent
Tojima et al.

(10) Patent No.: US 6,775,716 B2
(45) Date of Patent: Aug. 10, 2004

(54) HIGH-PERFORMANCE DMA CONTROLLER

(75) Inventors: Masayoshi Tojima, Kasuya-gun (JP); Yasuo Kohashi, Kasuya-gun (JP); Tomonori Yonezawa, Fukuoka (JP)

(73) Assignee: Matsushita Electric Industrial Co., Ltd. (JP)

( * ) Notice: Subject to any disclaimer, the term of this patent is extended or adjusted under 35 U.S.C. 154(b) by 451 days.

(21) Appl. No.: 09/859,802

(22) Filed: May 18, 2001

(65) Prior Publication Data

US 2002/0026543 A1 Feb. 28, 2002

(30) Foreign Application Priority Data

May 19, 2000 (JP) .......................................... 2000-148680
Apr. 19, 2001 (JP) .......................................... 2001-120483

(51) Int. Cl.[7] ............................................. G06F 13/28
(52) U.S. Cl. ............................. 710/22; 710/33; 710/58; 712/225; 709/104; 711/108
(58) Field of Search .............................. 710/15, 18, 20, 710/22, 23, 25, 26, 28, 33, 36, 58, 104, 24; 712/225; 709/104; 711/108, 100, 112, 600

(56) References Cited

U.S. PATENT DOCUMENTS

| | | | | |
|---|---|---|---|---|
| 5,212,795 A | * | 5/1993 | Hendry ........................ | 395/725 |
| 5,353,417 A | * | 10/1994 | Fuoco et al. ................. | 395/325 |
| 5,388,219 A | * | 2/1995 | Chan et al. .................. | 395/275 |
| 5,542,110 A | * | 7/1996 | Minagawa .................... | 395/287 |

(List continued on next page.)

FOREIGN PATENT DOCUMENTS

| | | |
|---|---|---|
| EP | 0 208 287 B1 | 1/1987 |
| JP | 62-103749 | 5/1987 |
| JP | 4-346150 | 12/1992 |
| JP | 5-50597 | 7/1993 |
| JP | 06060645 A | 3/1994 |

(List continued on next page.)

OTHER PUBLICATIONS

International Symposium on Low–Power and High–Speed Chips, "Proceedings Notebook for COOL Chips III," Kikai–Shinko–Kaikan, Apr. 24–25, 2000.

*Primary Examiner*—Jeffrey Gaffin
*Assistant Examiner*—Rijue Mai
(74) *Attorney, Agent, or Firm*—Parkhurst & Wendel, L.L.P.

(57) ABSTRACT

A high-performance DMA controller for controlling data transfer between a main storage means holding various kinds of data and a plurality of local storage means, comprises: an interface for generating a control signal for the main storage means; a data I/O unit for controlling I/O of data; a parameter holding unit for holding various kinds of parameters that are required for execution of data transfer; a data transfer request receiver for receiving requests of data transfer; and a start command receiver for receiving a start/stop command of the data transfer controller. The data transfer request receiver receives, from a data transfer request source, reservations of plural data transfer requests comprising execution priority information and local storage means type information, each information being arbitrarily set by the data transfer request source, and holds the local storage means type information in association with each execution priority information. The data transfer controller receives only the reservations of data transfer requests until a start command is issued from a system controller and, when a start command is issued, the data transfer controller sequentially decodes the local storage means type information of the reserved data transfer requests having relatively high execution priorities, in chronological order of the data transfer requests, and then sequentially takes parameters required for data transfer from the parameter holding unit, according to the decoding result, to execute data transfer.

28 Claims, 31 Drawing Sheets

U.S. PATENT DOCUMENTS

| | | |
|---|---|---|
| 5,612,926 A | 3/1997 | Yazawa et al. |
| 5,765,025 A * | 6/1998 | Morimoto et al. ............ 710/23 |
| 5,974,479 A | 10/1999 | Satoh |
| 6,041,368 A | 3/2000 | Nakatsuji et al. |
| 6,111,592 A * | 8/2000 | Yagi .......................... 345/511 |
| 6,438,635 B1 | 8/2002 | Date et al. .................. 710/113 |
| 6,499,076 B2 | 12/2002 | Date et al. .................. 710/113 |
| 6,574,682 B1 * | 6/2003 | Chan .......................... 710/22 |
| 2002/0059491 A1 | 5/2002 | Date et al. .................. 710/240 |

FOREIGN PATENT DOCUMENTS

| | | |
|---|---|---|
| JP | 06214939 A | 8/1994 |
| JP | 07-013923 | 1/1995 |
| JP | 7-169266 | 7/1995 |
| JP | 7-182857 | 7/1995 |
| JP | 8-153387 | 6/1996 |
| JP | 8-255034 | 10/1996 |
| JP | 9-223102 | 8/1997 |
| JP | 11-45225 | 2/1999 |
| KR | 00257071 B1 | 2/2000 |

\* cited by examiner

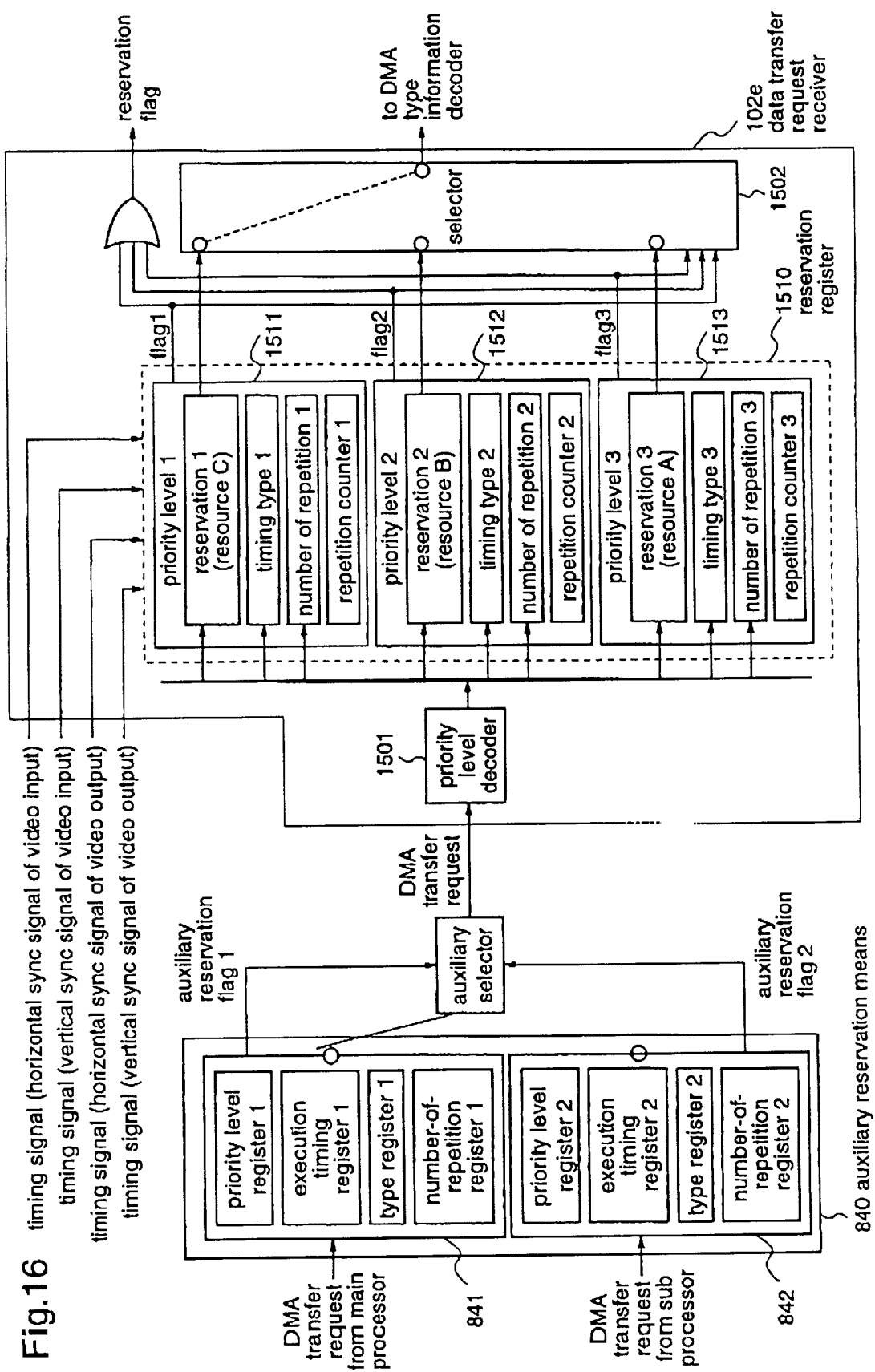

Fig.17 parameter memory space

| | access pattern designation parameter information | read/write information | access unit information |
|---|---|---|---|
| resource A parameter area | ringer buffer 2 | write | byte |
| | start address | $0000 | |
| | number of transfers | 0 | |
| resource B parameter area | rectangle area access | read | byte |
| | start address | $0000 | |
| | number of transfers | 0 | |
| resource C parameter area | continuous access | write | word |
| | start address | $3F00 | |
| | number of transfers | 88 | |
| ... | ... | ... | |
| for access to rectangle area | start address | $1000 | |
| | number of accesses in vertical direction | 16 | |
| | number of accesses in horizontal direction | 16 | |
| for access to ring buffer 1 area | area head address | $1F00 | |
| | area end address | $3FFF | |
| | start address | $2000 | |
| | number of transfers | 352 | |
| for access to ring buffer 2 area | area head address | $4000 | |
| | area end address | $7FFF | |
| | start address for writing | $4000 | |
| | number of transfers for writing | 352 | |
| | start address for reading | $4000 | |
| | number of transfers for reading | 172 | |
| ... | | | |

HIGH-PERFORMANCE DMA CONTROLLER

FIELD OF THE INVENTION

The present invention relates to DMA (Direct Memory Access) controllers for controlling direct data transfer between memories and, more particularly, to a DMA controller providing high efficiency of data transfer and low power consumption.

BACKGROUND OF THE INVENTION

In a data processing apparatus in which plural devices or memories are connected to a data bus, when performing direct data transfer between the devices or memories, plural DMA transfer requests assigned with priorities are continuously executed to improve the transfer efficiency. There have been known several methods of the DMA transfer, as follows.

For example, Japanese Published Patent Application No. Hei.09-223102 discloses a direct memory access controller (DMA controller) that improves the data transfer efficiency as described above. FIG. 27 is a block diagram illustrating the DMA controller, and FIG. 28 is a block diagram illustrating a data processing apparatus including the DMA controller shown in FIG. 27 as one of components. With reference to FIGS. 27 and 28, in a DMA controller 10022, control data for plural DMA transfers are set in registers (data holding means) 10012~10016, a DMA wait register (priority holding means) 10027 holds the priorities of the plural DMA transfers, and the plural DMA transfers are executed in the order of the priorities held by the DMA wait register 10027, under control of a control circuit (transfer control means) 10025. In the DMA controller 10022, the control circuit 10025 is connected to a CPU 10004 through a DMA access line 10023. Through the DMA access line 10023, addresses, data, and a control signal for access of the CPU 10004 to the registers 10012~10016 are transferred, and an interruption signal, a request signal, and an acknowledge signal for informing the end of DMA transfer or the like are transferred. The priorities stored in the DMA wait register (priority holding means) 10027 are predetermined on the basis of the input times of the control data of the plural DMA transfers, or the importance of I/O units 10007 as destinations.

Further, there have been known several methods of clock control to realize low power consumption in a data processing apparatus.

For example, Japanese Published Patent Application No. Hei.08-255034 discloses a low power consumption type data processing apparatus that reduces power consumption without changing the design of a control circuit of a LSI as a whole. The construction of this low power consumption type data processing apparatus is shown in FIG. 29. The data processing apparatus comprises a plurality of functional circuits 30123~30125, clock control gate circuits 30117~30119 provided for the respective functional circuits, gate control registers 30105~30107 for recording control data that define the operations of the respective gate circuits, and an address decoder circuit 30111 for controlling writing of data into the registers 30105~30107. The registers 30105~30107 are allocated to memory map areas of a CPU or the like, and have their own addresses. The address decoder circuit 30111 decodes address values of the respective registers, which are supplied through the address bus 30103, on the basis of a write enable signal Sen inputted to the circuit 30111, according to a command from the CPU, and records the control data to the functional circuits, which are supplied through the data bus 30104, in the registers. The outputs from the registers are used as clock supply control signals Scc for the respective functional circuits 30123~30125, and the gate circuits 30117~30199 permit or inhibit supply of clock signals to the functional circuits 30123~30125, on the basis of the clock supply control signals Scc.

Meanwhile, Japanese Published Patent Application No. Hei.08-153387 discloses a FIFO memory that inhibits access according to the number of significant pixels of an input video signal to realize low power consumption. The construction of the FIFO memory is shown in FIG. 30. FIG. 30 is a block diagram illustrating the FIFO memory in view of its function. The FIFO memory comprises a memory cell array 40006 into/from which a data signal is written and read; a clock generator 40003 that receives a reset signal RES supplied from the outside, and generates a CLK (bit line clock) for an I/O circuit 40007 and a first clock CLK1 (word line clock) for a word line pointer 40004, on the basis of a clock signal CLK0 supplied from the outside; an address designation means (the I/O circuit 40007 and the word line pointer 40004) that makes access to the word lines and the bit lines of the memory cell array 40006 on the basis of the CLK and the CLK1, respectively; and a control flag generator 40002 that generates a signal to stop the operation of the clock generator 40003. According to the CLK1 outputted from the clock generator 40003, the word line pointer 40004 sequentially designates the word lines 40008. When the final pointer 40005 outputs a last line access signal PAS3 indicating access to the last word line 40008E, to the control flag generator 40002, the control flag generator 40002 detects the access of the last address on the basis of the last line access signal PAS3 and a clock COS that is in synchronization with the CLK1, and outputs a clock control signal CCNT to the clock generator 40003 according to the timing of the detection. On receipt of the clock control signal CCNT, the clock generator 40003 stops counting of the fundamental clock CLK0. That is, the FIFO memory is a special FIFO memory provided with a clock control signal generation means (control flag generator 40002) which detects the timings to start writing and readout of data from the control signal, starts supply of the clock to the memory cell array 40006, and detects the last address signal designated by the address designation means (the I/O circuit and the word line pointer) to stop the clock of the clock generator 40003.

Furthermore, Japanese Published Patent Application No. Hei.7-182857 relates to a microcomputer system, and discloses a method of performing self-refresh control on a DRAM at waiting of a CPU. FIG. 31 is a block diagram illustrating the construction of the microcomputer system.

With reference to FIG. 31, when the microcomputer system is set in the waiting state, a self-refreshing mode is set by a CPU 50001, and switching is performed from an interval refreshing circuit 50004 to a self-refreshing circuit 50005 by a command from a RAM controller 50003. Then, under the state where a clock signal to be generated from a clock generator 50002 during normal operation is stopped, the self-refreshing circuit 50005 supplies a control signal to the DRAM controller 50003 to make the DRAM controller 50003 perform self-refreshing.

Furthermore, Japanese Published Patent Application No. Hei.7-169266 discloses a method of performing split control on a memory cell array in a semiconductor memory device. FIG. 32 is a block diagram illustrating a fundamental structure of a semiconductor memory.

With reference to FIG. 32, the semiconductor memory is provided with a plurality of memory arrays 60001, and when a predetermined memory array 60001 is selected by a memory array selection circuit 60005, a word line in the selected memory array 60001 is selected according to an address of a first external address signal group. Simultaneously, with respect to the memory arrays 60001 which are not selected, a word line fundamental clock for self-refreshing and a word line fundamental clock for refreshing (/RASF) are outputted from a clock generation circuit 60006 for self-refreshing that is contained in the chip, to select word lines in the unselected memory arrays 60001. Before a set time at which the memory array 60001 is to be selected, a refreshing stop signal is outputted to stop the refreshing operation compulsorily, whereby re-storage of sufficient charge in the memory cells is avoided. Since the memory array is so divided and the selected memory array performs normal read/write while the unselected memory arrays perform refreshing, there is no competition between normal read/write and refreshing in one memory array and, therefore, it is not necessary to control refreshing from the outside, and high-speed serial access is achieved. Further, the memory array selection circuit 60005 is used to select at least one memory sell array, and a selection signal from this circuit 60005 is used to select either the output of the word line fundamental clock (/RAS) or the output of the clock for refreshing (/RASF).

In the DMA controller described in Japanese Published Patent Application No. Hei.9-223102, however, since data transfer is executed at the time when the control data of plural DMA transfers are set, the control data cannot be set in advance, and data transfer requests cannot be reserved in advance. Therefore, setting of plural data transfers cannot be performed in advance according to a program of the CPU or the like, whereby the degree of freedom in program design of the CPU or the like is reduced.

Further, in the DMA controller, the priorities are not designated arbitrarily but are designated according to the control data setting times or the importance of the I/O units as destinations. Therefore, when the importance of the destination I/O units varies, the priorities cannot be set arbitrarily. Further, as means for holding the plural transfer data, the priorities of the transfer data are stored. Therefore, when the I/O units as destinations increase, the priority holding means should be increased by the increase of the I/O units.

Further, in the data transfer request process described in Japanese Published Patent Application No. Hei.9-223102, the order of data transfer requests is determined as soon as the requests are accepted. Therefore, interruption/resumption of data transfer, which is complicated, may be required, whereby the priorities may be inverted depending on the timings of data transfer requests and the priorities. That is, in the case where the priorities of reservations are determined at the time of data transfer requests, if a data transfer request which has been made recently but has a higher priority is received before starting the next data transfer, the order of execution of data transfer cannot be changed. That is, the order of data transfer cannot be optimized.

Further, although the DMA controller described in Japanese Published Patent Application No. Hei.9-223102 can realize interruption of data transfer, it cannot realize canceling of data transfer request being reserved, or rearrangement of data transfer requests being reserved, by a program of the CPU or the like. Further, in order to cancel data transfer being executed, this DMA controller employs a method of temporarily stopping DMA transfer while the data bus is released for the CPU, but it does not employ a method of stopping DMA transfer being executed to start new DMA transfer. In order to realize such interruption or temporal stop of DMA transfer, means for holding data for resuming the DMA transfer is required and, further, periods for holding the data and resuming the DMA transfer are required, resulting in complicated control and circuit construction. Considering that the control and circuit construction are complicated, the conventional method provides less effect unless the number of residual data transfers at interruption is larger than the number of cycles of (data saving process+transfer resuming process). Further, even though the possibility that the DMA transfer is interrupted or temporarily stopped is very low, the device circuit is increased in scale and complicated, resulting in disadvantages in time period for development and power consumption.

Furthermore, in Japanese Published Patent Application No. Hei.9-223102, since DMA transfer is executed at the time when control data or a data transfer request is issued, it is impossible to reverse data transfer in advance and execute the data transfer automatically when a predetermined time comes, or at a predetermined timing. Further, since the data holding means is divided into plural parts, access control for each part is required, whereby the device construction is increased and, moreover, plural access commands must be issued by the program of the CPU or the like. Furthermore, this prior art literature describes that the above-mentioned data holding means holds address information and I/O (destination) information. However, since these information should be divided into plural resources when being stored, even when various access patterns are desired when making access to the memory, only one pattern access is realized because the data holding means does not hold parameters relating to these information.

When there are plural data transfer request sources, the priorities should be held for the respective destinations as described in Japanese Published Patent Application No. Hei.9-22310. However, since the number of transfer request sources is not always equal to the number of destinations, if the number of destinations increases as the number of transfer request sources increases, the number of holding means increases in the prior art method. Further, since both of the priorities and the entry order should be checked in the data transfer process, control is complicated.

Further, with respect to the prior art clock control system that realizes low power consumption, when performing clock supply/stop control by the prior art apparatus described in Japanese Published Patent Application No. Hei.8-255034, since access to the control register should be made before and after the functional circuit is operated, accurate control by the program of the CPU or the like is required.

Further, in the FIFO memory disclosed in Japanese Published Patent Application No. Hei.8-153387, although the clock control method for the memory cells is described, such control as described in this literature is not incorporated in memory devices that are generally used as parts, and therefore, the memory cells must be controlled by an external controller. Since the external controller is provided with a memory controller, the controller must perform low-power-consumption control including the memory controller. Accordingly, the timing to start data transfer cannot be detected by a reset signal at the access start time to the memory as described in the prior art method, when plural pieces of data transfer requests are reserved in advance, or when the memory access pattern is arbitrary, or when the number of times of data transfer or the number of data transfers is arbitrary, or when there are plural and arbitrary timings to start data transfer. Further, also the end of data transfer cannot be detected by detecting the last word line access. Further, since the number of reserved data transfer requests and the number of transfers are arbitrary, these cannot be set in advance. Moreover, when there is only one memory to be accessed, clocks are supplied to the non-accessed area in the memory, resulting in waste of power. Furthermore, when the memory is constituted by a DRAM, even if a part of the DRAM is accessed, the whole DRAM should be operated at each access, and the whole DRAM should be operated also at refreshing, resulting in waste of power.

Furthermore, in the apparatus disclosed in Japanese Published Patent Application No. Hei.7-182657, since the self-refreshing mode control circuit is selected only when the system is in the waiting state, the setting cannot be arbitrarily changed in real time during operation, and therefore, the power at operation cannot be reduced. Further, when the DRAM is divided into plural banks, how to control them is not described. Further, in the case where the DRAM is divided into plural banks, when automatic refreshing is performed on unused banks, clocks must be supplied to the unused banks, resulting in waste of power. Moreover, the data forfeits if no clock is supplied.

Furthermore, the semiconductor memory disclosed in Japanese Published Patent Application No. Hei. 7-169266 should be fabricated by changing the construction of the semiconductor memory itself, leading to high cost. Further, since each memory cell array 60001 is provided with an address selection circuit 60003, a row decoder 60002, and a refreshing counter 60004, the circuit scale is increased. Moreover, since the semiconductor memory is not aimed at reduction of power consumption, it is not suited to a DMA controller of the present invention in which a memory bank is divided to reduce power consumption.

Meanwhile as the result of realizing a bulk memory area with a single DRAM in an actual LSI, there is a report as follows.

According to "A Low Power MPEG-4 Video/Audio codec LSI with 16 Mbit embedded DRAM, Proceedings of COOL Chips, III, pp.89–100, April 2000", the power consumption of a 16Mbit DRAM constituted by a single macro is about 25% of 240 mw that is the power consumption of the whole LSI. Generally, as a logic part becomes smaller, the power supply voltage is reduced with relative ease, and therefore it is expected that reduction of power consumption is promoted. However, with respect to a consolidated DRAM, the voltage cannot be easily reduced due to memory cell drive. In the future, the memory capacity to be consolidated will be increased due to diversification of video applications (3D graphics, improved resolution, etc.). Accordingly, in a system LSI for which reduction of power consumption is promoted, the ratio of the power consumption of memories represented by a DRAM to the whole power consumption cannot be ignored.

SUMMARY OF THE INVENTION

The present invention is made to solve the above-described problems and has for its object to provide a high-performance DMA controller that can be easily designed with less circuit scale, and that can provide high efficiency of data transfer and low power consumption.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a high-performance DMA controller which is a data transfer controller for controlling data transfer between a main storage means holding various kinds of data, and a plurality of local storage means, and the data transfer controller comprises: an interface for generating a control signal for controlling the main storage means; a data I/O unit for controlling input and output of data; a parameter holding unit for holding various kinds of parameters that are required for execution of data transfer; a data transfer request receiver for receiving requests of data transfer; and a start command receiver for receiving a start/stop command of the data transfer controller; wherein the data transfer request receiver receives, from a data transfer request source, reservations of plural data transfer requests comprising execution priority information and local storage means type information, each information being arbitrarily set by the data transfer request source, and holds the local storage means type information in association with each execution priority information; and the data transfer controller receives only the reservations of data transfer requests until a start command is issued from a system controller for controlling the whole apparatus and, when a start command is issued from the system controller, the data transfer controller sequentially decodes the local storage means type information of the reserved data transfer requests having relatively high execution priorities, in chronological order of the data transfer requests, and then sequentially takes parameters required for data transfer from the parameter holding unit according to the decoding result, to execute data transfer. Therefore, only setting of DMA parameters and reservation of DMA transfer requests can be performed without executing data transfer.

According to a second aspect of the present invention, in the high-performance DMA controller according to the first aspect, when there are a plurality of data transfer request sources, said data transfer controller is provided with an auxiliary reservation unit for receiving reservations of data transfer requests from each of the data transfer request sources, said data transfer requests including execution priority information and local storage means type information which are arbitrarily set by the data transfer request sources; and the auxiliary reservation means transfers the data transfer requests which have been received for each of the data transfer request sources, to the data transfer request receiver, according to predetermined priorities of the data transfer request sources. Therefore, the data transfer request receiver can receive the data transfer requests that have been simultaneously outputted from the plural data transfer request sources, and reserve the data transfer requests with priorities, resulting in efficient data transfer. Further, when the circuit is altered adaptively to the plural transfer request sources, the circuit that is adapted to a single transfer request source can be reused.

According to a third aspect of the present invention, in the high-performance DMA controller according to the second aspect, one of the plural data transfer request sources is a system controller for controlling the whole system. Therefore, in programming of a processor or the like as the system controller, since initial setting for data transfer can be performed before startup of the system controller, the degree of freedom is increased, for example, an initial setting processor can be developed independently. This means that the development of the processor or the like is facilitated, leading to reduction in the period time for the development.

According to a fourth aspect of the present invention, in the high-performance DMA controller according to the second aspect, the auxiliary reservation means comprises: a plurality of auxiliary reservation registers for temporarily-holding the data transfer requests from the respective data transfer request sources; and an auxiliary selector for selecting the outputs of the data transfer requests which have temporarily been stored in the auxiliary reservation registers; and the auxiliary selector selects the data transfer requests according to the predetermined priorities of the data transfer request sources, and transfers them to the data transfer request receiver. Therefore, it is possible to control the data transfer requests that have been simultaneously outputted from the plural data transfer request sources, with a minimum of additional circuits.

According to a fifth aspect of the present invention, in the high-performance DMA controller according to any of the first, second, and fourth aspects, the data transfer request receiver comprises: a priority level decoder for decoding the execution priority information of the data transfer requests; a reservation register corresponding to each execution priority information, for holding the local storage means type information in association with each execution priority information; and a selector for selecting the outputs of the local storage means type information; and the priority level decoder stores the plural data transfer requests in the reservation registers corresponding to the respective execution priority information, and the selector selects the local storage means type information to be executed next, according to the status of a reservation flag indicating whether or not the reservation register corresponding to each execution priority information holds the reservation of the data transfer request, and transfers the selected information to the interface. Therefore, the number of registers for holding the data transfer requests can be reduced. Further, DMA transfer execution is determined on the basis of, not the priorities of all transfer types, but the transfer types in the register of the highest priority. Therefore, the priority can be determined at high speed, and control is facilitated and, moreover, the circuit is simplified. As the result, the circuit development of the high-performance DMA controller is facilitated, resulting in reduction in the According to a sixth aspect of the present invention, in the high-performance DMA controller according to the fifth aspect, the data transfer controller determines data transfer type information to be executed next from the data transfer requests previously reserved in the reservation registers, according to the execution priority information and the times at which the transfer requests have been made, at a time a predetermined period before the end of the previous data transfer. Therefore, continuous and efficient data transfer can be performed with minimized data transfer interval by executing the preparation of data transfer execution, whereby a reservation of data transfer request of high priority, which is inputted just before data transfer, can be executed while maintaining the continuity of reservations of data transfer requests from the data transfer request source. Therefore, even when a data transfer request of higher priority is issued during execution of data transfer, data transfer can be executed in the latest order of priorities. Since control of interruption/resumption is not complicated, the circuit scale of the high-performance DMA controller is minimized, leading to reduction in the time period for development.

According to a seventh aspect of the present invention, in the high-performance DMA controller according to the sixth aspect, any of the data transfer requests includes a cancel command for canceling a data transfer request reserved in any of the reservation registers. Therefore, the reserved DMA requests can be canceled easily. Further, DMA transfer, which has become unnecessary due to the status of the system, is not carried out. Furthermore, when the canceling is combined with an operation such as re-reservation, reservations can be interexchanged. Furthermore, since unnecessary DMA transfer is not carried out, the power consumption of the high-performance DMA controller is reduced.

According to an eighth aspect of the present invention in the high-performance DMA controller according to the seventh aspect, the cancel command is effective to data transfer that is currently executed. Therefore, it is not necessary to hold parameters during halts, such as temporal stop or interruption/resumption and, further, subsequently reserved DMA transfer can be continuously executed with priority. Since this operation ensures DMA continuity even when canceling is performed, saving/re-loading cycle for interruption/resumption is not required, whereby the efficiency of the DMA transfer is not reduced.

According to a ninth aspect of the present invention, in the high-performance DMA controller according to the seventh aspect, the priority level decoder further decodes whether any of the data transfer requests includes a cancel command for canceling a data transfer request reserved in any of the reservation registers; when a cancel command is made to a reserved data transfer request, the data transfer request is canceled by changing the status of the reservation flag; and when a cancel command is made to data transfer that is currently executed, the system controller terminates the data transfer. Therefore, canceling of reservations can be performed at high speed by simple control. Further, temporal stop or interruption, which has conventionally been realized by a complicated circuit, can be realized by reservation determination timing, reservation cancel command, and re-reservation. Thereby, the high-performance DMA controller is not provided with complicated controls and needless circuits, leading to a considerable reduction in the time period for circuit design and development and the time period for verification.

According to a tenth aspect of the present invention, in the high-performance DMA controller according to the fifth aspect, the data transfer request receiver is connected to the system controller that controls the whole apparatus; and the reservation register corresponding to each execution priority information comprises a plurality of setting registers arranged in a ring shape, and a pointer register for selecting, from the plural setting registers, a setting register to be set next, and a setting register to be executed next. Therefore, it is possible to cancel the data transfer requests that have already been reserved, or interchange the priority levels of the data transfer requests, or change of the order of execution, directly from software or the like of the system controller. Further, the DMA controller can flexibly cope with various kinds of error processing and application requests, which occur during system operation, whereby the system performance is improved, resulting in a higher-performance system. Moreover, the degree of freedom in software development is increased.

According to an eleventh aspect of the present invention, in the high-performance DMA controller according to the tenth aspect, the data transfer request receiver is connected to the system controller; and the plural setting registers or the pointer register are/is arbitrarily read or written by the system controller, regardless of the data transfer requests. Therefore, setting can be speedily and arbitrarily changed directly from software or the like of the system controller. Further, it is possible to cancel the data transfer requests that have already been reserved, or interchange the priority levels of the data transfer requests, or change the order of execution. Thereby, the programmability (degree of freedom in program design) of the data transfer request source is improved, independent program designs by plural developers are facilitated. This leads to reduction in the time period for development at the data transfer request source, and increases the degree of freedom in the framework of development. Furthermore, the DMA controller can flexibly cope with various kinds of error processing and application requests, which occur during system operation, whereby the system performance is improved, resulting in a higher-performance system.

According to a twelfth aspect of the present invention, in the high-performance DMA controller according to the fifth aspect, the plural data transfer requests further include execution timing information that indicates timings to execute the data transfer requests reserved in the reservation register; and the data transfer request receiver does not execute data transfer including the execution timing information at timing other than the specified execution timing, regardless of the execution priority, add executes data transfer when the execution timing has come, according to the execution priority at that time. Therefore, delayed data transfer can be executed easily. This facilitates, for example, program design of the data transfer request source is facilitated, which program is separated into formation of a module for controlling issue of data transfer requests and formation of a processing module which does not consider data transfer. Thereby, the program development of the data transfer request source is facilitated, resulting in improvement in the efficiency of development, reduction in the time period for development, and reduction in the number of program steps.

According to a thirteenth aspect of the present invention, in the high-performance DMA controller according to the twelfth aspect, the execution timing information is the number of cycles from when a data transfer request is reserved to when the data transfer is executed; and the reservation register corresponding to each execution priority information is further provided with a reservation timer for holding the number of cycles. Therefore, execution time setting is facilitated. Thereby, delayed DMA transfer can be executed easily, and data transfer can be executed at a desired timing or when a desired time has come. As the result, development of the data transfer request source is facilitated, resulting in improvement in the efficiency of development, reduction in the time period for development, and reduction in the number of program steps.

According to a fourteenth aspect of the present invention, in the high-performance DMA controller according to the twelfth aspect, the execution timing information indicates whether a predetermined timing signal transmitted to the data transfer request receiver is to be used or not; and the reservation register corresponding to each execution priority information is further provided with a timing designation register for holding designation as to whether the timing signal is to be used or not. Therefore, the range of choices of execution methods is extended, and data transfer requests can be reserved without considering the timing to issue the data transfer requests. Thereby, the program of the data transfer request source and the request issue timing control are facilitated, and the degree of freedom in development is increased, leading to reduction in the time period for development.

According to a fifteenth aspect of the present invention, in the high-performance DMA controller according to the twelfth aspect, the execution timing information designates the type of a timing signal to be used, from plural timing signals transmitted to the data transfer request receiver; and the reservation register corresponding to each execution priority information is further provided with a timing type register for holding the type of the designated timing signal. Therefore, the degree of freedom in designation of data transfer execution timing is increased, and control for request issue timing designation by the data transfer request source is dispensed with, leading to further reduction in the load on development.

According to a sixteenth aspect of the present invention, in the high-performance DMA controller according to the twelfth aspect, the data transfer request further includes repetition information indicating the number of times the data transfer request is repeated; the data transfer request receiver is further provided with a number-of-repetition designation register for holding the repetition information, and a number-of-repetition counter for counting the number-of-repetition; and on receipt of the repetition information, the data transfer request receiver holds the reservation of the data transfer request, and when the execution timing has come, the data transfer request receiver executes the corresponding data transfer by the number of repetition times, according to the execution priority at that time. Therefore, it is not necessary for the data transfer request source to make data transfer requests of the same kind by plural times, whereby issue of requests from the data transfer request source is simplified.

According to a seventeenth aspect of the present invention, in the high-performance DMA controller according to the first aspect, the parameter holding unit has areas partitioned by addresses for each of the local storage means; and parameters to be used for data transfer corresponding to each local storage means are previously stored in each area by the system controller. Therefore, even when the DMA controller is provided with only one DMA parameter memory, information relating to plural resources can be continuously read out. Thereby, only a single command of continuous access to the parameter memory is required, whereby the program code of the data transfer request source is simplified, leading to reduction in the number of program steps and reduction in the number of execution cycles. These reductions result in improved system performance. Further, also when the execution control circuit reads data from the parameter memory, since the execution control circuit can make continuous access to the memory, preparation for data transfer can be performed at high speed and, moreover, the control circuit of the high-performance DMA controller is simplified, resulting in reduced circuit scale and reduced time period for development.

According to an eighteenth aspect of the present invention, in the high-performance DMA controller according to the first aspect, the parameter holding unit has areas partitioned by addresses for each access pattern to the main storage means; and parameters corresponding to each access pattern are previously stored in each area by the system controller. Therefore, even when the controller is provided with only one DMA parameter memory, continuous and easy access to the memory is achieved. Further, even when access to the data memory has plural access patterns, setting and readout are performed speedily and easily. Thereby, even though the controller is provided with only one DMA parameter memory, data transfer is realized in plural access methods. In this case, only a single command of continuous access to the parameter memory is required, whereby the program code of the data transfer request source is simplified, leading to reduction in the number of program steps and reduction in the number of execution cycles. As the result, the performance of the system is improved. Moreover, also when the execution control circuit reads data from the parameter memory, since the circuit can make continuous access to the memory, the control circuit of the high-performance DMA controller is simplified, leading to reduced circuit scale and reduced time period for development.

According to a nineteenth aspect of the present invention, in the high-performance DMA controller according to the first aspect, the parameter holding unit has areas partitioned by addresses for each of the local storage means, and areas partitioned by addresses for each access pattern to the main storage means; and parameters to be used for data transfer corresponding to each local storage means are previously stored in each of the areas partitioned by addresses for each local storage means, by the system controller, and parameters corresponding to each access pattern are previously stored in each of the areas partitioned by addresses for each access pattern, by the system controller. Therefore, even if the resources do not have the respective access pattern parameters, the resources can access the main memory by using the plural access patterns. Thereby, various kinds of accesses can be made to the main memory, resulting in improved system performance Furthermore, since required parameters are put together in address units, high-speed access to the parameter memory is achieved, and access control is facilitated. Furthermore, required parameters are stored in an address area corresponding to each resource and, further, required parameters are stored in an address area corresponding to each access pattern. Thereby, the parameter memory area corresponding to each resource is minimized while realizing many access patterns for each resource. This leads to reduction in the capacity of the parameter memory, reduction in the circuit scale of the high-performance DMA controller, and reduction in power consumption of the DMA controller.

According to a twentieth aspect or the present invention, in the high-performance DMA controller according to any of the seventeenth to nineteenth aspects, the parameters stored in the parameter holding means include; write/read information, access unit information, and access pattern information, corresponding to each local storage means, and a start address, the number of transfers, rectangle area access information, and start and end address information of an area forming a ring buffer, corresponding to each access pattern. Therefore, it is not necessary to specify parameters when making a data transfer request, whereby the data transfer request can be simplified and, further, many combinations of access patterns are realized. Thereby, the degree of freedom in development of the program of the processor is increased, and the program is simplified, and moreover, circuit control is facilitated, leading to reduction in the time period for development.

According to a twenty-first aspect of the present invention, in the high-performance DMA controller according to the first or second aspect, the data transfer controller further includes a clock controller for controlling supply and stop of clocks to the interface, the data I/O unit, the parameter holding means, and the main storage means; and the clock controller stops supply of clocks when the system controller does not start the data transfer controller supplies clocks when the system controller starts the data transfer controller and a data transfer request is reserved in the data transfer request receiver, stops supply of clocks when the data transfer request receiver has execution timing information, until the execution time comes, starts supply of clocks when the execution time has come, and stops supply of clocks when the reservations in the data transfer request receiver have gone and the final data transfer has ended. Therefore, the power to the high-performance DMA controller is efficiently controlled by automatically supplying the control clock relating to data transfer and the clock of the main memory only during the minimum period of time. Thereby, a system that realizes lower power consumption is obtained. Furthermore, it is not necessary for the program of the data transfer request source to perform clock control every time a data transfer request is issued and, therefore, the program is not complicated.

According to a twenty-second aspect of the present invention, in the high-performance DMA controller according to the twelfth aspect, the data transfer controller is further provided with a clock controller for controlling supply and stop of clocks to the interface, the data I/O unit, the parameter holding means, and the main storage means; the clock controller stops supply of clocks when the system controller does not start the data transfer controller, supplies clocks when the system controller starts the data transfer controller and a data transfer request is reserved in the data transfer request receiver, stops supply of clocks until the execution timing comes according to the execution timing information received by the data transfer request receiver even if the data transfer controller is started and a data transfer request is reserved, and starts supply of clocks when the execution timing has come, and stops supply of clocks when the reservations in the data transfer request receiver have gone and the final data transfer has ended. Therefore, the power to the high-performance DMA controller can be efficiently controlled by automatically supplying the clocks for a required minimum period of time. Thereby, a system that can realize lower power consumption is obtained. Further, it is not necessary for the program of the data transfer request source to perform clock control every time a data transfer request is issued. Therefore, the program is not complicated and, moreover, the number of program steps is reduced, and the number of execution cycles is reduced, resulting in improved execution performance.

According to a twenty-third aspect of the present invention, there is provided a high-performance DMA controller which is a data transfer controller for controlling data transfer between a main storage means holding various kinds of data, and a plurality of local storage means, wherein the main storage means comprises a plurality of individual main storage means that are obtained by dividing the main storage means into plural areas to which clocks are supplied independently; the data transfer controller includes a clock controller for controlling supply and stop of clocks to the main storage means and the data transfer controller, and an address decision unit for deciding an address area to access; and the clock controller supplies clocks and control signals only to the areas-to-be-used selected by the address decision unit from the plural individual main storage means, and supplies no clocks and no control signals to the unselected areas. Therefore, it is possible to operate a desired part of the main memory only for a desired period of time. Thereby, the power consumption of the circuit of the high-performance DMA controller and the power consumption of the memory are efficiently controlled, providing a system that realizes lower power consumption.

According to a twenty-fourth aspect of the present invention, there is provided a high-performance DMA controller which is a data transfer controller for controlling data transfer between a main storage means holding various kinds of data, and a plurality of local storage means, wherein the main storage means comprises a plurality of individual main storage means that are obtained by dividing the main storage means into plural areas to which clocks are supplied independently; the data transfer controller includes a clock controller for controlling supply and stop of clocks to the main storage means and the data transfer controller, and an area setting register for selecting areas-to-be-used from the individual main storage means; and the clock controller supplies clocks and control signals only to the areas-to-be-used selected by the area setting register from the plural individual main storage means, and supplies no clocks and no control signals to the unselected areas. Therefore, even when the main memory is constructed by, for example, a DRAM that is difficult to address-control, it is possible to provide a system that realizes low power consumption, by the above-mentioned simple control to the main memory, without operating unnecessary memories.

According to a twenty-fifth aspect of the present invention, in the high-performance DMA controller according to the twenty-third or twenty-fourth aspect, the data transfer controller is provided with a power supply controller for controlling supply and stop of power to the individual main storage means; and the power supply controller supplies power to only the selected areas-to-be-used, and supplies no power to the unselected areas. Therefore, current leakage from unused part of the main memory is reduced, leading to further reduction in power consumption.

According to a twenty-sixth aspect of the present invention, in the high-performance DMA controller according to the twenty-third or twenty-fourth aspect, the individual main storage means are constituted by SRAMs. Therefore, stop control can be performed utilizing addresses, and special setting means is not required, whereby the circuit of the high-performance DMA controller is simplified.

According to a twenty-seventh aspect of the present invention, in the high-performance DMA controller according to the twenty-third or twenty-fourth aspect, the individual main storage means are constituted by DRAMs, clocks and control signals are supplied to only selected DRAMs, and the selected DRAMs perform refreshing; and no clocks and no control signals are supplied to unselected DRAMs, and the unselected DRAMs do not perform refreshing. Therefore, even in a system that requires a bulk memory such as a DRAM, the power consumption of the main memory can be minimized, and supply of clocks and control signals can be easily controlled.

According to a twenty-eighth aspect of the present invention, in the high-performance DMA controller according to the twenty-third or twenty-fourth aspect, the individual main storage means are constituted by DRAMs, clocks and control signals are supplied to only selected DRAMs, and the selected DRAMs perform auto-refreshing; and no clocks and no control signals are supplied to unselected DRAMs, and the unselected DRAMs do not perform auto-refreshing but perform self-refreshing. Therefore, the power consumption can be easily reduced while maintaining the contents of the unused memory area.

BRIEF DESCRIPTION OF THE DRAWINGS

FIG. 16 is a block diagram illustrating an auxiliary reservation means and a data transfer request receiver which are included in a DMA controller that receives DMA transfer requests from plural sources of DMA transfer requests.

FIG. 17 is a diagram illustrating an example of DMA parameter memory contents, in a DMA controller according to a ninth embodiment of the invention.

FIG. 24 is a block diagram illustrating a system including a DMA controller according to a thirteenth embodiment of the present invention.

DETAILED DESCRIPTION OF THE PREFERRED EMBODIMENTS

[Embodiment 1]

Hereinafter, a DMA controller according to a first embodiment of the present invention will be described.

Initially, a DMA controller and a system including the DMA controller according to the first embodiment will be described with reference to FIGS. 1 and 2.

Figure 1:
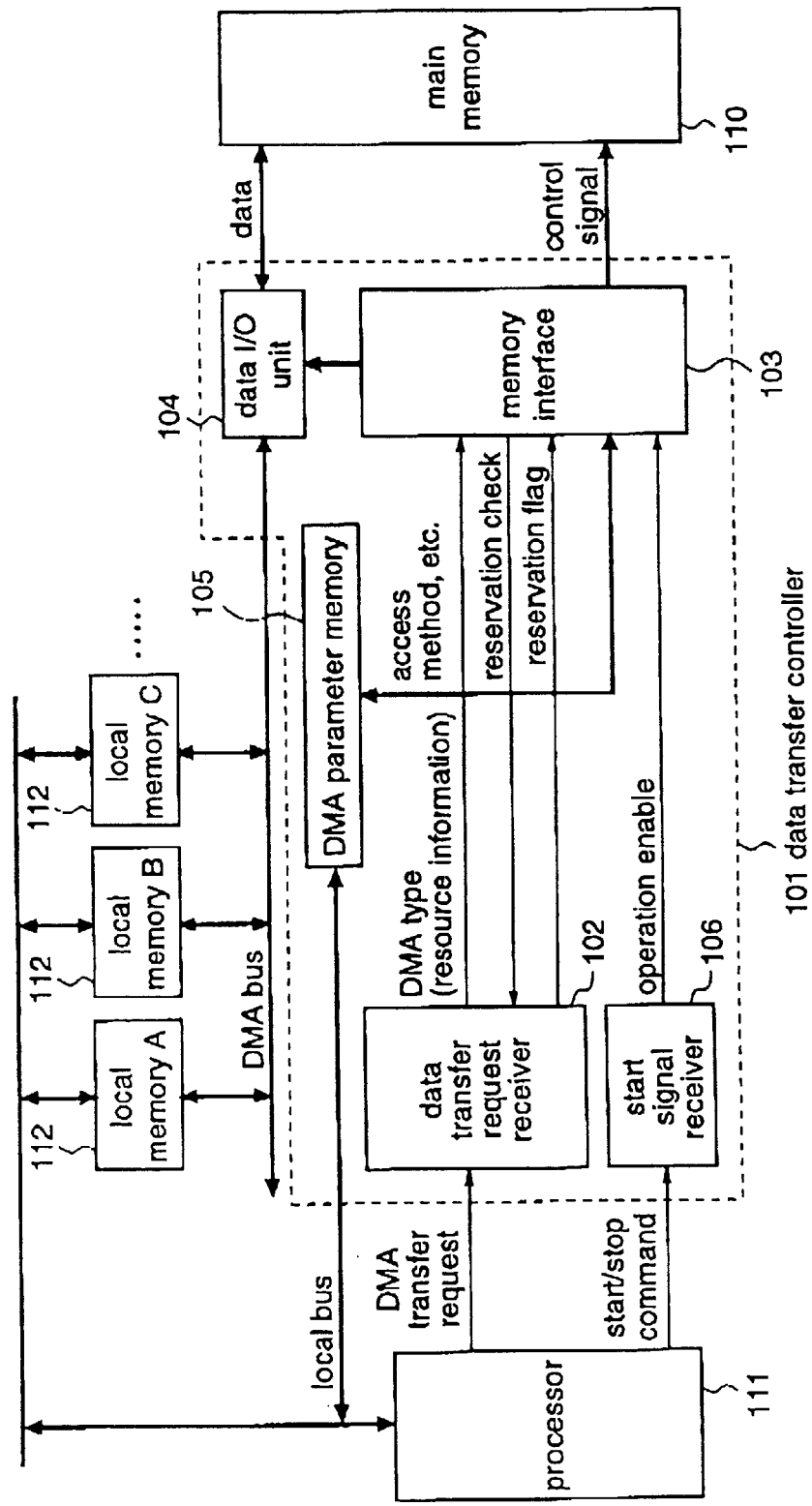
FIG. 1 is a block diagram illustrating a system including a DMA controller according to a first embodiment of the invention.
Figure 2:
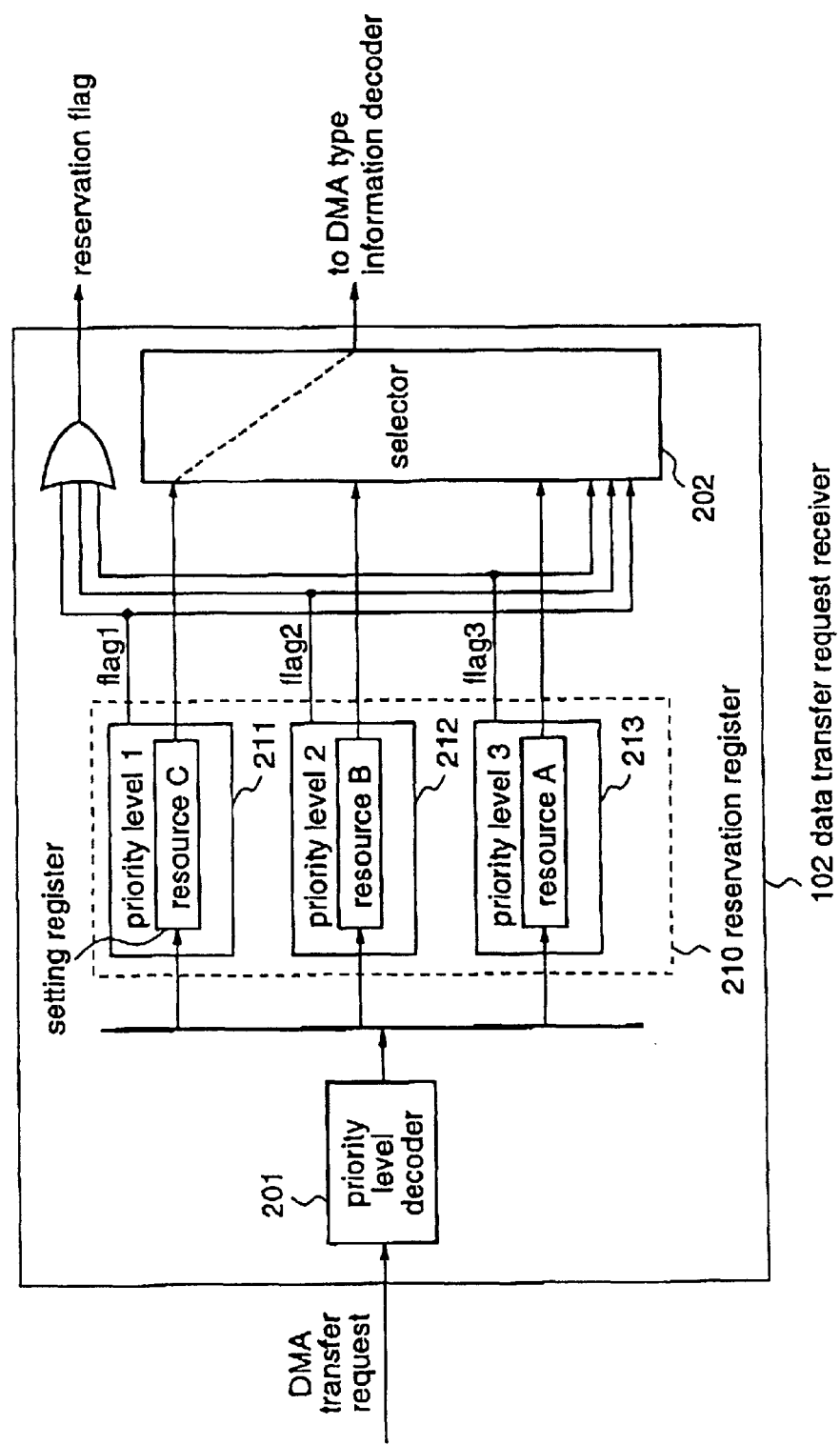
FIG. 2 is a block diagram illustrating the data transfer request receiver included in the DMA controller according to the first embodiment.

FIG. 1 is a block diagram illustrating a system having a DMA controller (data transfer controller 101) according to the first embodiment, and FIG. 2 is a block diagram illustrating a data transfer request receiver 102 included in the data transfer controller 101.

With reference to FIG. 1., this system is composed of a data transfer controller 101 as a DMA controller, a processor 111, a main memory 110, local memories 112, a DMA bus, and a local bus.

The processor 111 controls the whole system including the data transfer controller 101, and issues a DMA transfer request to the data transfer controller 101.

The main memory 110 holds various kinds of data, and the local memories 112 are a group of local memories connected to the processor 111 through the local bus.

The data transfer controller (DMA controller) 101 comprises a data transfer request receiver 102, a memory interface 103, a data I/O unit 104, a DMA parameter memory 105, and a start signal receiver 106.

The memory interface 103 generates a control signal to the main memory 110, the data I/O unit 104 controls input and output of data, and the DMA parameter memory 105 holds parameters required to execute DMA transfer.

The start signal receiver 106 receives a command to start or stop the data transfer controller 101, from the processor 111, and sends the command to the memory interface 103.

The data transfer request receiver 102 receives a DMA transfer request from the processor 111, and the detail of its construction will be described with reference to FIG. 2.

In FIG. 2, the data transfer request receiver 102 is composed of a priority level decoder 201, a reservation register 210, and a selector 202.

The priority level decoder 201 decodes the priority level of an inputted DMA transfer request to determine a register where the request is to be stored.

The reservation register 210 is composed of a priority-level-1 reservation register 211, a priority-level-2 reservation register 212, and a priority-level-3 reservation register 213, and resource type information (resource A, B, or C) is stored in each priority-level reservation register. Each priority-level reservation register is provided with a setting register for holding the resource type information. When reservations are made to the respective priority-level reservation registers 211~213, reservation flags 1~3 corresponding to the respective registers 211~213 are set. Further, these reservation flags are ORed, and transmitted to the memory interface 103 as reservation flags indicating that there are reservations in the data transfer request receiver 102.

The selector 202 selects the resource type information outputted from the priority-level reservation registers 211~213, and the selection depends on the states of the reservation flags 1~3 outputted from the respective priority-level reservation registers. For example, when the reservation flag 1 is "1", the selector 202 selects the output of the priority-level-1 reservation register 211. When the reservation flag 1 is "0" and the reservation flag 2 is "1", the selector 202 selects the output of the priority-level-2 reservation register 212. When both of the reservation flags 1 and 2 are "0" and the reservation flag 3 is "1", the selector 202 selects the output of the priority-level-3 reservation register 213. That is, priority level 1>priority level 2>priority level 3.

Next, the operation of the DMA controller (data transfer controller) 101 in the system of this first embodiment will be described with reference to FIGS. 1 and 2.

Initially, the processor 111 stores parameters required for execution of DMA transfer in the DMA parameter memory 105 through the local bus. The parameters are as follows: read/write information, access unit information such as byte or word, access information indicating consecutive access, rectangle access, ring pointer access, or the like, various kinds of address information such as start address, and the number of transfers.

As preprocessing before startup of the data transfer controller (DMA controller) 101, the processor 111 inputs a reservation for a DMA request to be executed immediately, in the data transfer request receiver 102. At this time, a reservation flag is transmitted to the memory interface 103.

When this system goes into the operation starting state, the processor 111 issues a start command to the start signal receiver 106. On receipt of the start command, the data transfer controller 101 starts DMA transfer.

Initially, as the reservation flag is effective, the memory interface 103 outputs a reservation check signal to the data transfer request receiver 102.

Assuming that, at present, three reservations of DMA transfers are made in the data transfer request receiver 102 as shown in FIG. 2, the reservation flag 1 is "1 ". In FIG. 2, since a code expressing the resource C is held in the setting register of the priority-level-1 reservation register 211, the selector 202 selects the resource C (local memory C) which is the output of the priority-level-1 reservation register 211.

When the resource C as the reservation information is transmitted as the DMA type information to the memory interface 103, the memory interface 103 decodes that the local memory C is reserved.

Thereafter, the reservation flag 1 of the priority level 1 that has been read becomes "0", and the reservation flag 2 is "1". So, the selector 202 selects the output of the priority-level-2 register 212.

The memory interface 103 makes access to a predetermined address in the DMA parameter memory 105 in which DMA transfer execution information of the local memory C is stored, thereby loading the parameters required for DMA transfer execution. According to the loaded value, the memory interface 103 generates a control signal to the main memory 110, and executes DMA transfer with the local memory C.

When the DMA transfer between the local memory C and the main memory 110 is completed, the memory interface 103 issues a reservation check signal to the data transfer request receiver 102, and outputs the information of the resource B (local memory B) that is stored in the setting register of the priority-level-2 reservation register 212.

Likewise, when the resource B as the reservation information is transmitted as the DMA type information to the memory interface 103, the memory interface 103 decodes that the local memory B is reserved. Thereafter, since the reservation flag 1 is "0", the reservation flag 2 is "0", and the reservation flag 3 is "1", the selector 202 selects the priority-level-3 register 213. Thereafter, DMA transfer is executed in like manner as mentioned above.

In this way, the memory interface 103 checks the reservations stored in the data transfer request receiver 102, and continuously performs DMA transfers until the reservation flags become "0".

Further, when the processor 111 issues a stop command to the start signal receiver 106, the data transfer controller 101 stops execution of subsequent DMA transfers at the time when the currently executed DMA transfer is ended and, thereafter, accepts only reservations of DMA transfer.

As described above, according to the first embodiment of the invention, since the data transfer controller (DMA controller) 101 is provided with the start signal receiver 106, only reservations of DMA transfer requests received from the processor 111 (data transfer request source) can be carried out without executing the DMA transfer. Thereby, the degree of freedom in programming of the processor 111 or the like as a system controller is increased.

Further, according to the first embodiment, since the data transfer request receiver 102 holds the resource type information corresponding to the priority of each DMA transfer reservation, the number of registers is not (the number of resource types×the number of bits indicating the priorities) but (the number of priorities×the number of bits indicating the number of resource types), whereby the number of holding registers in the data transfer request receiver 102 is reduced.

Further, according to the first embodiment, execution of DMA transfer is determined not after checking the priorities of all of the transfer type information but after checking the resource type information that is stored in the register of the highest priority. Therefore, the determination is facilitated and the circuit for the determination is simplified.
[Embodiment 2]

Hereinafter, a description will be given of a DMA controller according to a second embodiment of the present invention.

Initially, a DMA controller and a system including the DMA controller according to this second embodiment will be described with reference to FIGS. 3 and 4.

Figure 3:
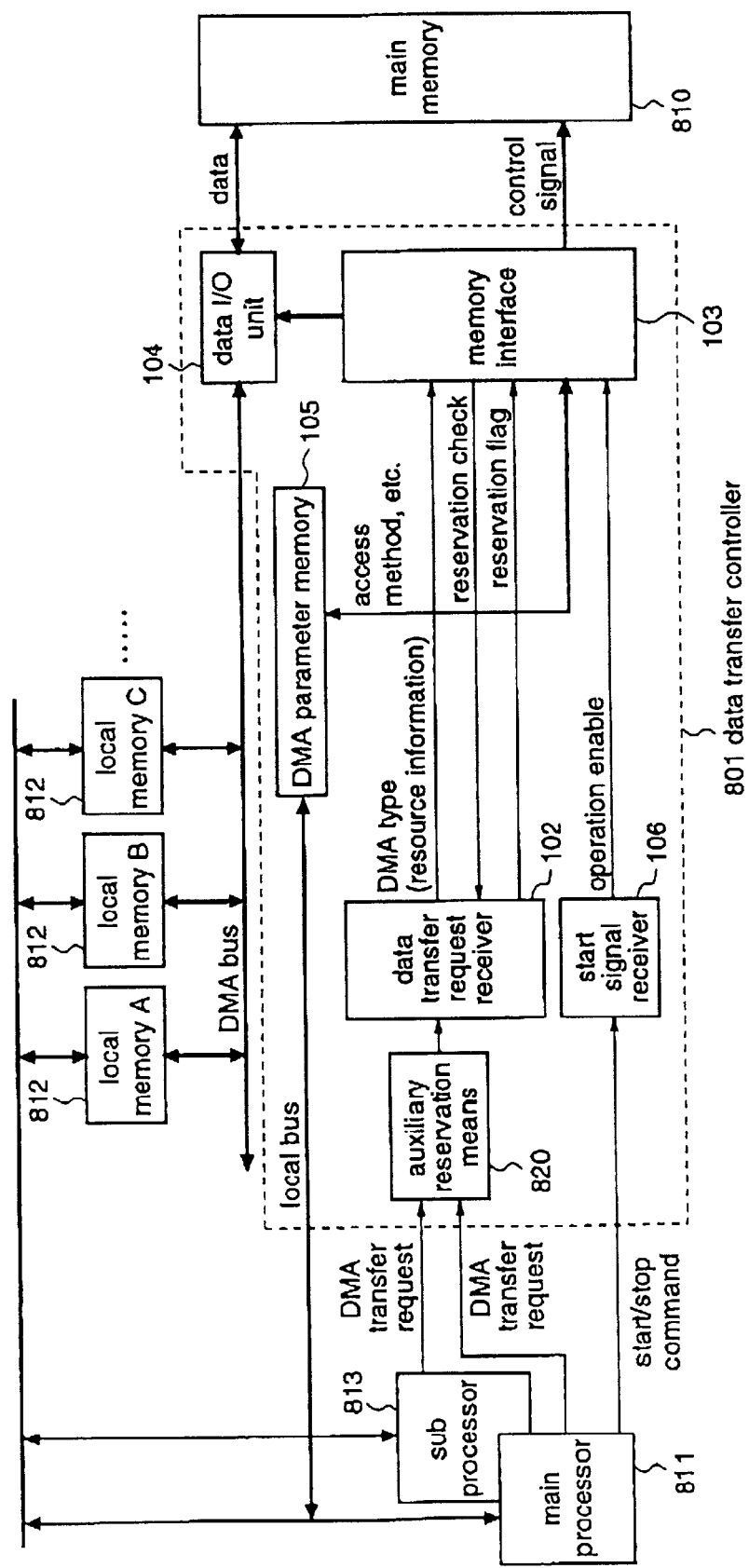
FIG. 3 is a block diagram illustrating a system including a DMA controller which receives DMA transfer requests from plural sources of DMA transfer requests, according to a second embodiment of the invention.
Figure 4:
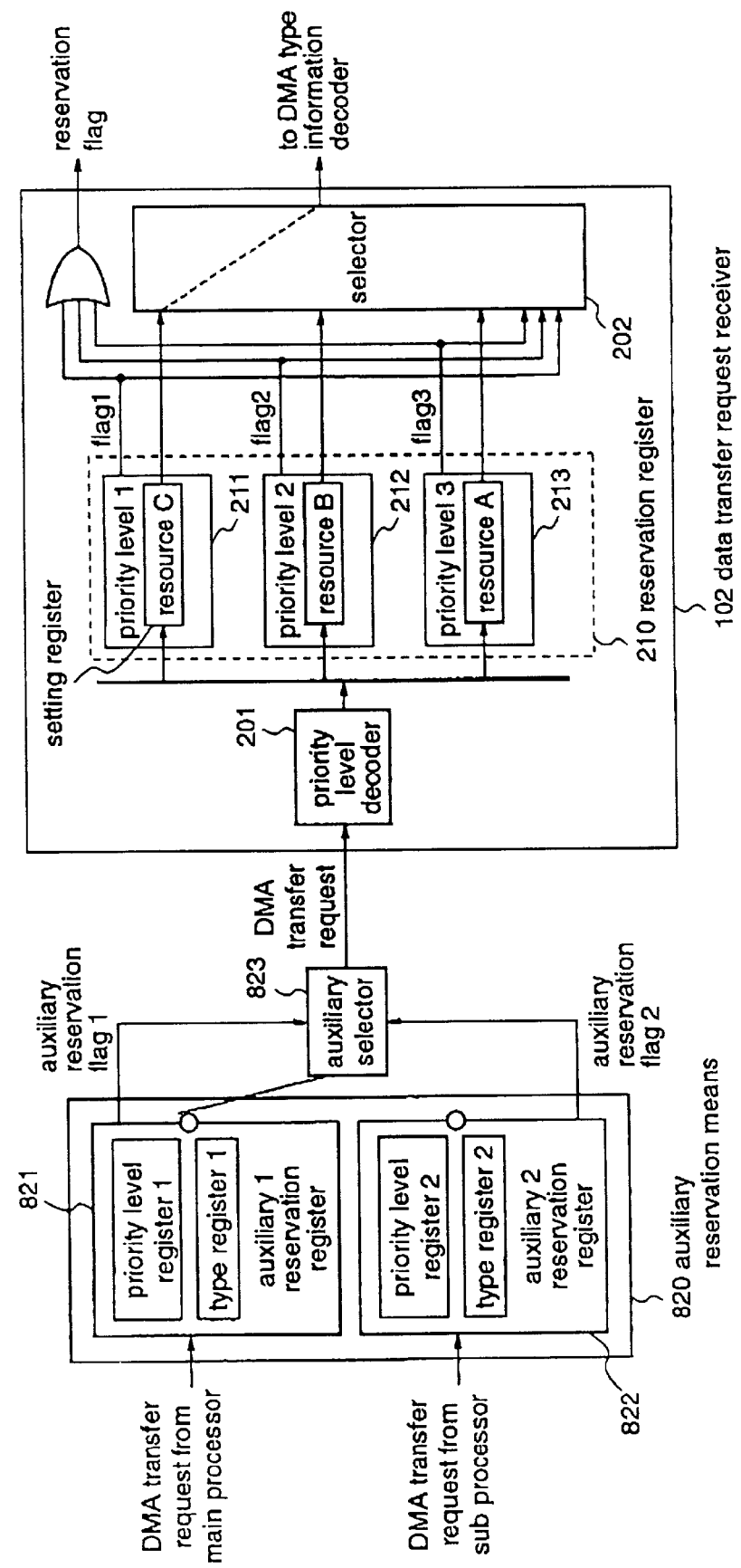
FIG. 4 is a block diagram illustrating an auxiliary reservation means and a data transfer request receiver which are included in the DMA controller according to the second embodiment.

FIG. 3 is a block diagram illustrating a system including a DMA controller (data transfer controller) 801 of this second embodiment, and FIG. 4 is a block diagram illustrating a data transfer request receiver 102 included in the DMA controller 801.

The system shown in FIG. 3 includes plural sources of DMA transfer requests to the data transfer controller (DMA controller) 801. To be specific, there are two sources of DMA transfer requests, a main processor 811 and a sub processor 813. Therefore, the system of this second embodiment comprises the data transfer controller 801, the main processor 811, the sub processor 813, a main memory 810, local memories 812, a DMA bus, and a local bus.

The main processor 811 and the sub processor 813 issue DMA transfer requests to the data transfer controller 801, and the main processor 811 controls the whole system including the data transfer controller 801.

The main memory 810 holds various kinds of data, and the local memories 812 are a group of local memories collected to the main processor 811 and the sub processor 813 through the local bus.

The data transfer controller (DMA controller) 801 comprises an auxiliary reservation means 820, a data transfer request receiver 102, a memory interface 103, a data I/O unit 104, a DMA parameter memory 105, and a start signal receiver 106.

The auxiliary reservation means 820 receives DMA transfer requests from the plural sources of DMA transfer requests, i.e., the main processor 811 and the sub processor 813, and temporarily holds them. Further, the auxiliary reservation means 820 selects a DMA transfer request to be transmitted to the data transfer request receiver 102, according to the priority that has previously been set on the basis of the importance of system control.

Other constituents are identical to those described for the first embodiment and, therefore, do not require repeated description.

Hereinafter, the data transfer request receiver 102 and the auxiliary reservation means 820, which are included in the data transfer controller 801, will be described in more detail with reference to FIG. 4.

In FIG. 4, the auxiliary reservation means 820 is composed of an auxiliary 1 reservation register 821 that receives DMA transfer requests from the main processor 811; an auxiliary 2 reservation register 822 that receives DMA transfer requests from the sub processor 813; and an auxiliary selector 823 that selects any of the DMA transfer requests stored in the plural auxiliary reservation registers according to the priority that has previously been set according to the importance of system control.

Each of the auxiliary 1 reservation register 821 and the auxiliary 2 reservation register 822 is provided with a priority level register and a type register. The priority information (DMA transfer request information) and the resource type information (resources A to C) which are outputted from each processor are temporarily stored in the priority level register and the type register, respectively. When the reservation information is stored in the respective auxiliary reservation registers 821 and 822, an auxiliary reservation flag 1 and an auxiliary reservation flag 2 from the respective registers 821 and 822 become effective.

Since the construction of the data transfer request receiver 102 is identical to that described for the first embodiment, repeated description is not necessary.

Next, the operation of the DMA controller (data transfer controller) 801 in the system of this second embodiment will be described with reference to FIGS. 3 and 4.

When a DMA transfer request from the main processor 811 is inputted to the auxiliary reservation means 820, information of the DMA transfer request is stored in the priority level register 1 and the type register 1 of the auxiliary 1 reservation register, as described above. When the auxiliary 1 reservation register accepts the information, the auxiliary reservation flag 1 becomes effective, and the auxiliary selector 823 transmits the information (priority level, resource type) that has been held in the auxiliary 1 reservation register, to the data transfer request receiver 102.

Assuming that the main processor 811 and the sub processor 813 issue the DMA transfer requests to the auxiliary reservation means 820 at the same time, the DMA transfer request from the main processor 811 is inputted to the auxiliary 1 reservation register 821 while the DMA transfer request from the sub processor 813 is inputted to the auxiliary 2 reservation register 822, and the information of each DMA transfer request is stored in the priority level register and the type register of each auxiliary reservation register. Simultaneously with the storage of the information, both of the auxiliary reservation flags 1 and 2 become effective. In this second embodiment, since it is predetermined that the main processor 811 is higher in importance of system control than the sub processor 813, the auxiliary selector 823 selects the DMA transfer request from the main processor 811 that is stored in the auxiliary 1 reservation register 821, and outputs the information of the DMA transfer request to the data transfer request receiver 102. The operation of the data transfer request receiver 102 after reception of the DMA transfer request is identical to that described for the first embodiment and, therefore, does not require repeated description.

While in this second embodiment there are two processors as sources of DMA transfer requests, when there are arbitrary number of DMA transfer request sources, the auxiliary reservation means 820 is provided with auxiliary reservation registers as many as the DMA transfer request sources. Further, while in this second embodiment the information included in each DMA transfer request is the priority level and the resource type, even when the DMA transfer request includes more information, the DMA controller of this second embodiment can cope with the information by increasing the number of registers included in each auxiliary reservation register.

As described above, since the DMA controller of this second embodiment is provided with the auxiliary reservation means 820, it is possible to realize a high-performance DMA controller capable of controlling plural transfer requests which are simultaneously transmitted from plural sources of DMA transfer requests. Further, the circuit construction of the DMA controller adapted to a single transfer request source can be altered so that it can cope with plural transfer request sources, by only adding the auxiliary reservation means 820 to the DMA controller. Therefore, the circuit can be reused.

While in this second embodiment the DMA transfer request sources are processors, the sub processor may be implemented by hardware, or both of the main processor and the sub processor may be implemented by hardware, with the same effects as mentioned above.

[Embodiment 3]

Hereinafter, a DMA controller according to a third embodiment of the present invention will be described.

Since a DMA controller and a system including the DMA controller according to the third embodiment are identical in construction as those mentioned for the first embodiment, repeated description is not necessary.

Hereinafter, a description will be given of data transfer requests, DMA transfer execution timing, and transition of data execution waiting state, in adherence to the operation of the data transfer controller (DMA controller) 101 according to the first embodiment.

Figure 5:
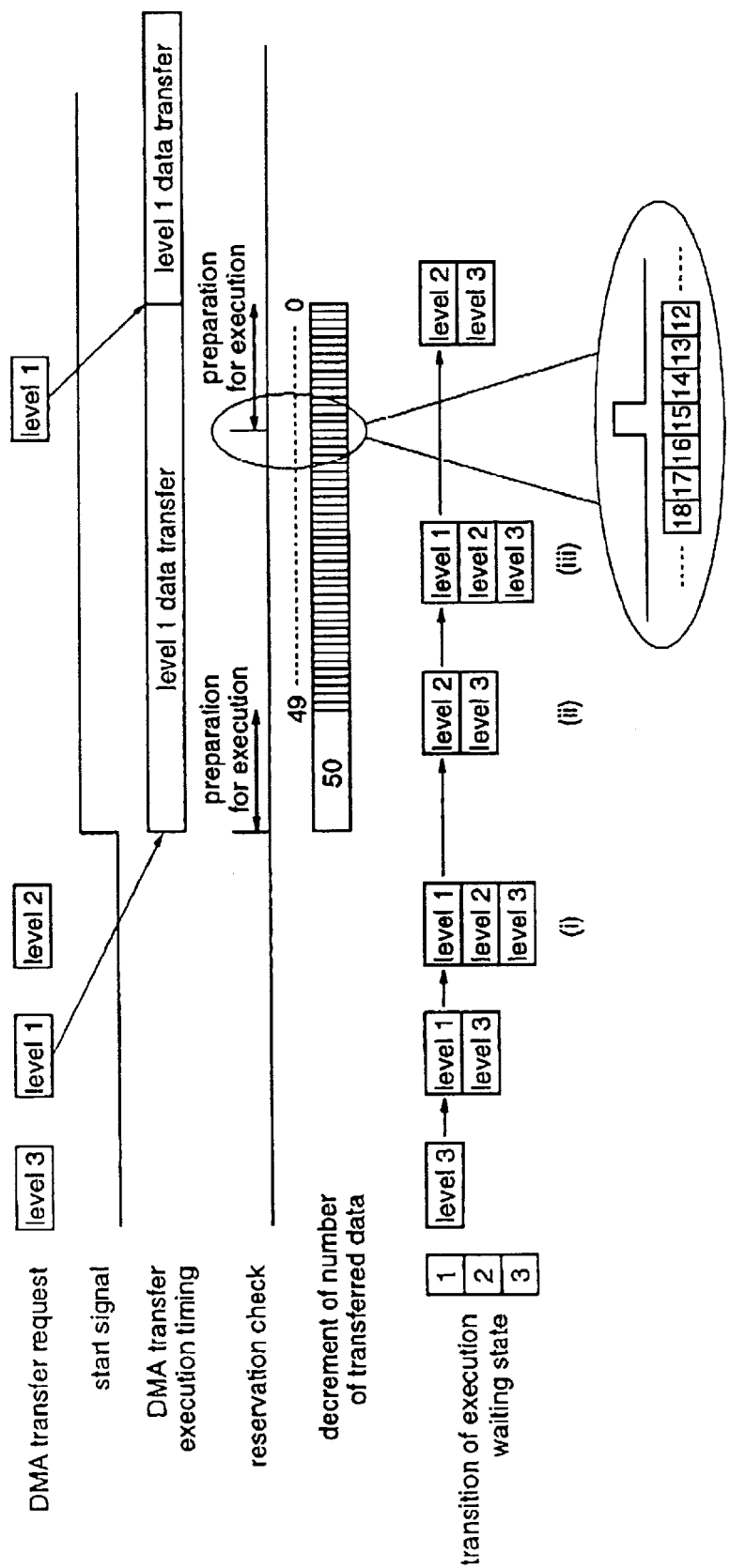
FIG. 5 is a diagram for explaining timings of data transfer request and DMA transfer execution, in a system according to a third embodiment of the invention.

FIG. 5 is a diagram illustrating DMA transfer requests, transition of DMA transfer execution waiting state, and DMA transfer execution timing, according to the third embodiment.

It is assumed that DMA transfer requests are issued from the processor 111 at the timing shown in FIG. 5. In the data transfer request receiver 102, the order of execution priorities transits as shown in FIG. 5.

Initially, as shown in FIG. 5, the processor 111 outputs three DMA transfer requests from when a start command is issued to when a start signal becomes "1" (execution waiting state (i)). When the memory interface 103 issues a reservation check signal under this state, the reservation of priority level 1, which is of the highest priority among the reserved requests, will be executed.

When the data transfer of priority level 1 is put into execution, the order of priorities to execute the reservations in the data transfer request receiver 102 transits to the execution waiting state (ii) wherein priority level 2>priority level 3.

However, if a DMA transfer request of priority level 1 is issued from the processor 111 to the data transfer request receiver 102 during execution of the DMA transfer of priority level 1, the order of priorities to execute the reservations in the data transfer request receiver 102 transits to the execution waiting state (iii) wherein priority level 1>priority level 2>priority level 3.

When the DMA transfer of priority level 1 is completed, a reservation check signal is again issued from the memory interface 103, and the reservation of priority level 1, which is of the highest priority among the reserved requests, will be executed.

Hereinafter, the timing to issue the reservation check signal will be specifically described. For example, in the memory interface 103, the number of data transfers (DMA transfers) performed between the main memory 110 and the respective local memories is counted. At a time a predetermined period (e.g., 16 cycles) before the previous DMA transfer is completed, the memory interface 103 issues a reservation check signal to the data transfer request receiver 102 on receipt of this reservation check signal, the data transfer request receiver 102 checks the reservation register 210, and performs preparation for the next DMA transfer process. Although the predetermined time before completion of the previous DMA transfer is 16 cycles, this time depends on the number of cycles required for loading of various parameters to execute the next DMA transfer, from the DMA parameter memory 105, that is, this time corresponds to a setup time for putting the next DMA transfer into execution. Accordingly, the number of cycles corresponding to the setup time may be varied arbitrarily according to the condition of execution.

The above-mentioned DMA transfer process according to the third embodiment is also applicable to the case where there are plural sources of DMA transfer requests as described for the second embodiment.

As described above, according to the third embodiment of the invention, the memory interface 103 outputs a reservation check signal to the data transfer request receiver immediately before execution of the next DMA transfer to confirm the data to be transferred next. Therefore, it is possible to execute a DMA reservation of the highest priority, which is inputted just before execution of the next DMA transfer, while maintaining the continuity of DMA reservations.

When the reservation check signal is issued by a predetermined number of cycles before completion of DMA transfer in expectation of a setup time for the DMA transfer, higher continuity is secured. In order to realize this, the memory interface 103 detects a time ten and several cycles before completion of DMA transfer, and issues a reservation check signal when detecting it.

[Embodiment 4]

Hereinafter, a DMA controller according to a fourth embodiment of the present invention will be described.

First of all, a DMA controller and a system including the DMA controller according to the fourth embodiment will be described with reference to FIGS. 1 and 6.

Figure 6:
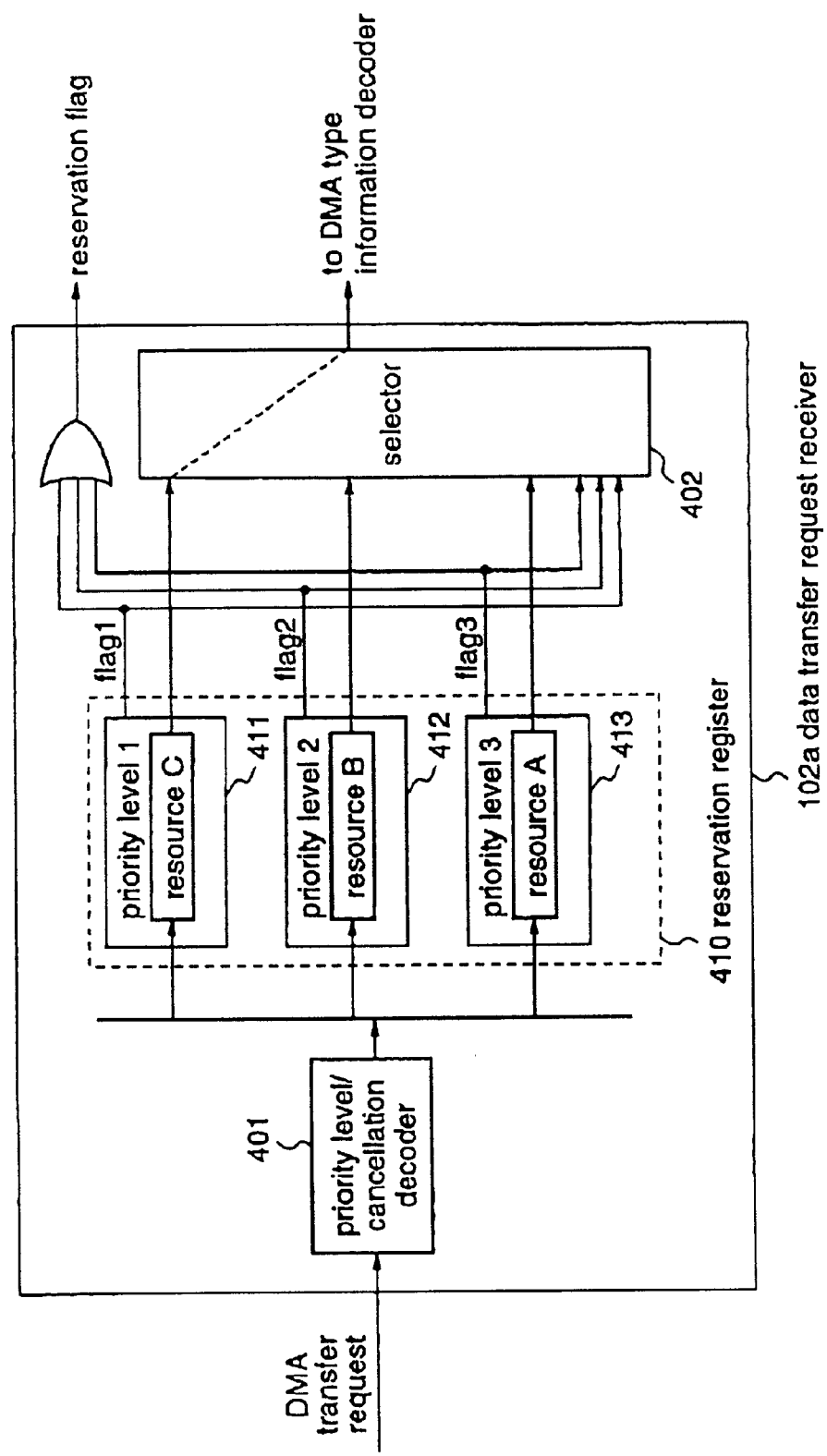
FIG. 6 is a block diagram illustrating a data transfer request receiver included in a DMA controller according to a fourth embodiment of the invention.

FIG. 6 is a block diagram illustrating a data transfer request receiver 102a according to the fourth embodiment.

In FIG. 4, the data transfer request receiver 102a comprises a priority level/cancellation decoder 401, a selector 402, and a reservation register 410.

The priority level/cancellation decoder 401 decodes the priority level of an inputted DMA transfer request, and decodes whether the DMA transfer request is cancellation or not, to determine a register for storage or a register to be canceled.

The reservation register 410 is composed of a priority-level-1 reservation register 411, a priority-level-2 reservation register 412, and a priority-level-3 reservation register 413, and resource type information (resource) is stored in each priority-level reservation register. Each priority-level reservation register is provided with a setting register for holding the resource type information.

When reservations are made to the respective priority-level reservation registers 411~413, reservation flags 1~3 corresponding to the respective registers 411~413 are set. Further, these reservation flags are Ored, and transmitted to the memory interface 103 as reservation flags indicating that there are reservations in the data transfer request receiver 102a.

The selector 402 selects the resource type information outputted from each priority-level reservation register, and the selection depends on the state of the reservation flag outputted from each priority-level reservation register. For example, when the reservation flag 1 is "1", the selector 402 selects the output of the priority-level-1 reservation register 411. When the reservation flag 1 is "0" and the reservation flag 2 is "1", the selector 402 selects the output of the priority-level-2 reservation register 412. When both of the reservation flags 1 and 2 are "0" and the reservation flag 3 is "1", the selector 402 selects the output of the priority-level-3 reservation register 413. That is, the order of priorities is priority level 1>priority level 2>priority level 3.

Since other constituents of the DMA controller and the system including the DMA controller according to the fourth embodiment are identical to those described for the first embodiment, repeated description is not necessary.

Next, the operation of the DMA controller (data transfer controller) 101 in the system according to the fourth embodiment will be described with reference to FIGS. 1 and 5.

It is assumed that DMA transfer requests have been reserved in the data transfer request receiver 102a by the processor 111 in like manner as described for the first embodiment.

Assuming that, at present, three DMA requests are reserved in the data transfer request receiver 102a as shown in FIG. 6, the reservation flag 1 is "1". Since a code expressing a resource C is stored in the priority-level-1 reservation register 411, the selector 402 selects the resource C (local memory C) that is the output of the priority-level-1 reservation register 411, whereby DMA transfer is executed between the local memory C and the main memory 110.

It is assumed that, during the DMA transfer, the processor 111 issues a cancel command utilizing a DMA request. This cancel command includes priority level information and resource type information.

For example, it is assumed that cancel information is issued together with the priority level 2 and the resource B. On receipt of the DMA request including the cancel information, the data transfer request receiver 102a recognizes that the DMA request is a cancel command for the priority level 2, by the priority level/cancellation decoder 401. Based on the cancel command, the data transfer request receiver 102a sets the reservation flag 2 of the priority-level-2 reservation register 412 to "0", whereby the reservation of DMA transfer between the main memory 110 and the resource B (local memory B) having the priority level of 2 is canceled.

Thereby, the reservation flags 1, 2, and 3 will be set to "0", "0", and "1", respectively, at the time when the currently executed DMA transfer between the local memory C and the main memory 110 is completed. So, DMA transfer between the resource A and the main memory 110, which is reversed in the priority-level-3 reservation register 413, will be executed next.

On the other hand, when the processor 111 issues a cancel command for the resource C at the priority level of 2 while the DMA transfer of priority level 1 between the resource C (local memory C) and the main memory 110 is being executed, the data transfer request receiver 102a judges that the DMA request is to cancel the DMA transfer being executed, and issues a stop signal to the memory interface 103. On receipt of the stop signal, the memory interface 103 brings the DMA transfer being executed to the end.

The above-described DMA transfer process according to the fourth embodiment is also applicable to the case where there are plural sources of DMA transfer requests as described for the second embodiment.

As described above, according to the fourth embodiment of the invention, since the reserved DMA transfer can be canceled by a command from the processor 111 (data transfer request source), the DMA transfer which is not needed anymore due to the system condition is not executed and, further, the needless DMA transfer can be replaced with another reservation by combining the canceling operation with an operation such as re-reservation.

Moreover, since the needless DMA transfer is not executed, the power consumption is reduced.

Further, in this fourth embodiment, it is not necessary to hold parameters during halts such as temporary stop described for the prior art or interruption/resumption and, moreover, the subsequent reservation of DMA transfer can be continuously executed with priority. Thereby, continuity of DMA transfer is maintained even when interruption or temporal stop is carried out.

Further, since the process of temporal stop or interruption, which has conventionally been realized by a complicated circuit, can be easily realized by only a cancel command and re-reservation, the DMA controller dispenses with complicated control and needless circuits, resulting in significant reduction in the time period for design and development and the time period for verification.

[Embodiment 5]

Hereinafter, a DMA controller according to a fifth embodiment of the present invention will be described.

Initially, a DMA controller and a system including the DMA controller according to the fifth embodiment will be described with reference to FIGS. 7 and 8.

Figure 7:
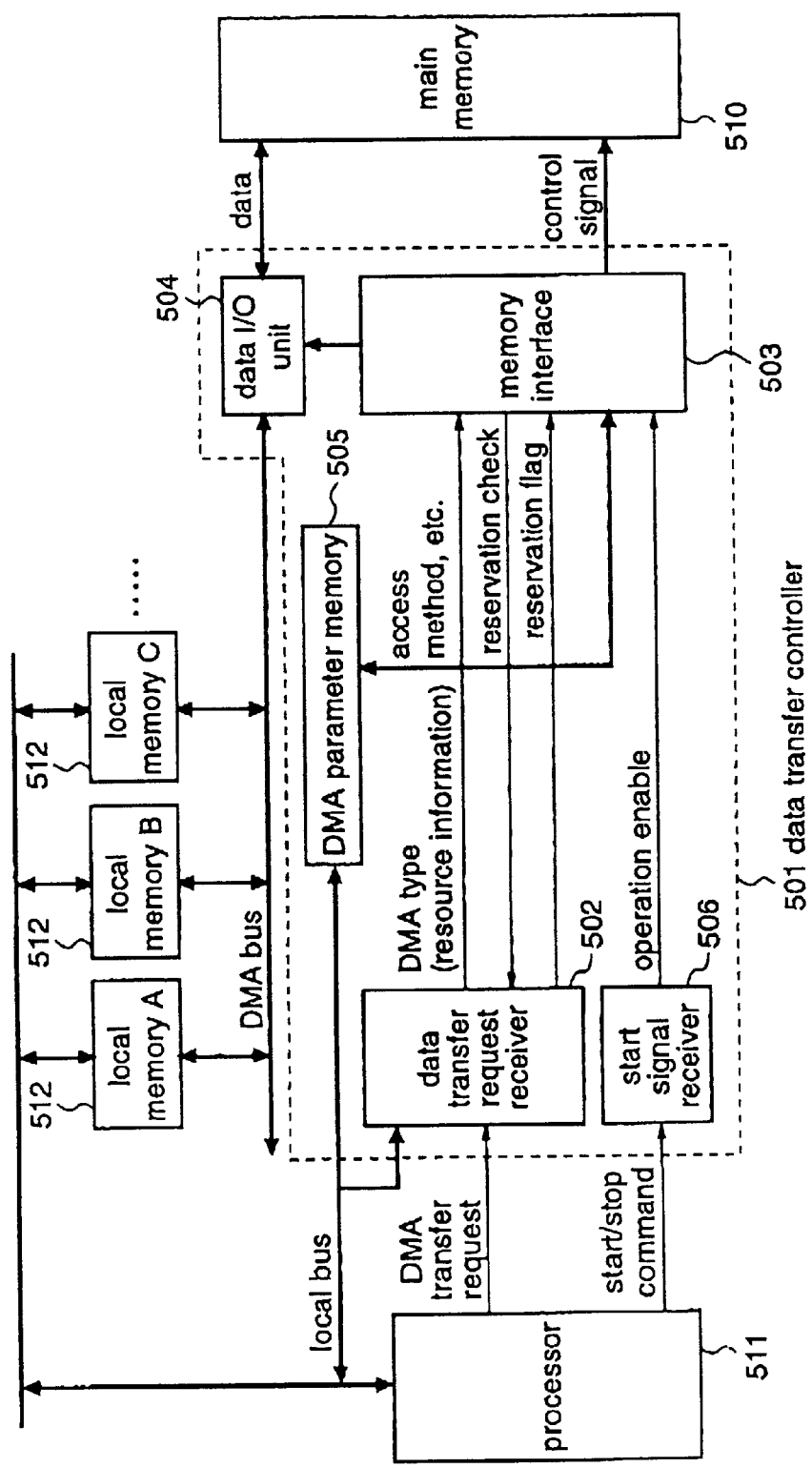
FIG. 7 is a block diagram illustrating a system including a DMA controller according to a fifth embodiment of the invention.
Figure 8:
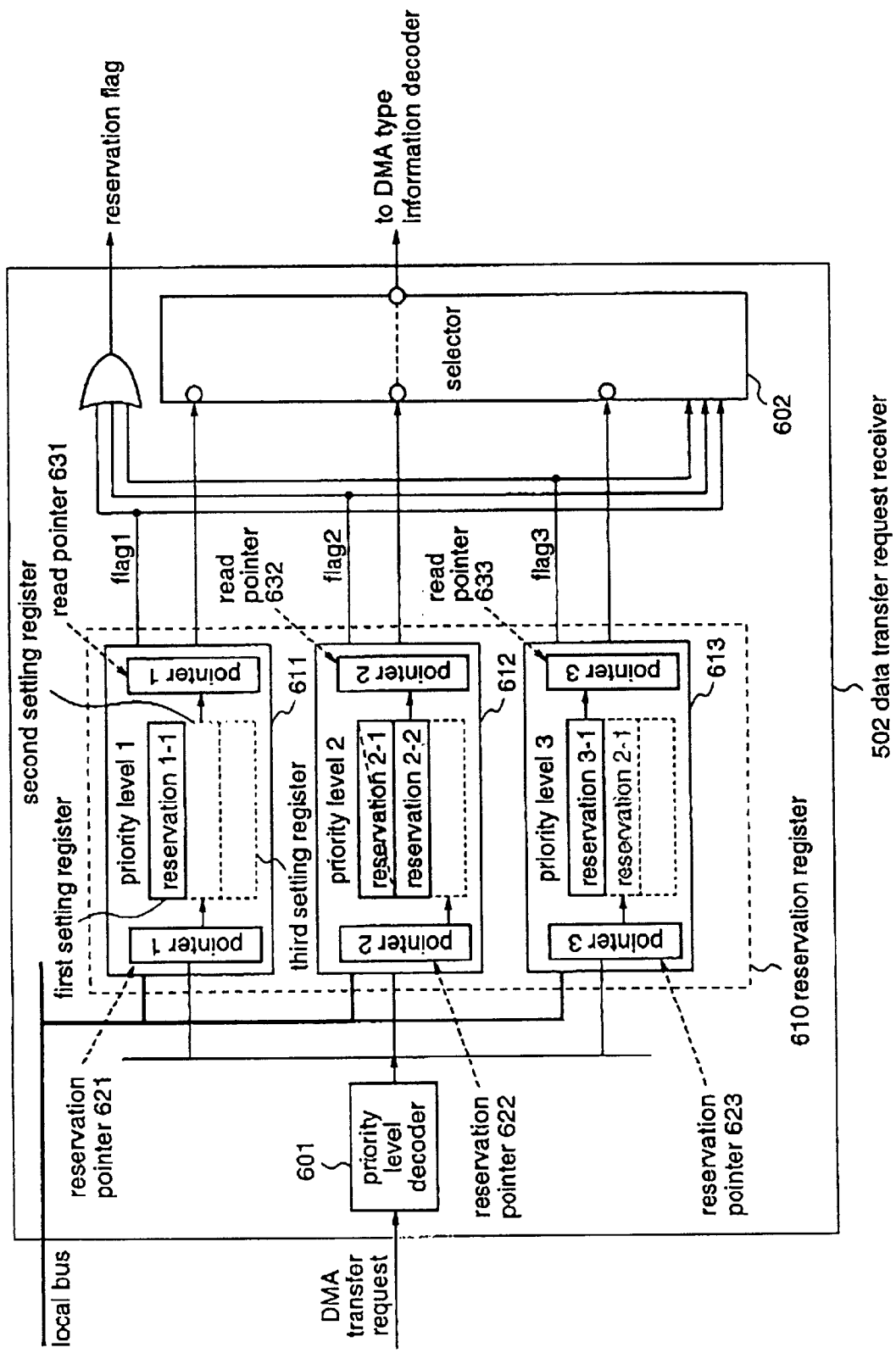
FIG. 8 is a block diagram illustrating a data transfer request receiver included in the DMA controller according to the fifth embodiment.

FIG. 7 is a block diagram illustrating a system having a DMA controller (data transfer controller) 501 according to the first embodiment, and FIG. 8 is a block diagram illustrating a data transfer request receiver 502 included in the data transfer controller 501.

With reference to FIG. 7, this system is composed of a data transfer controller 501 as a DMA controller, a processor 511, a main memory 510, local memories 512, a DMA bus, and a local bus.

The processor 511 controls the whole system including the data transfer controller 501, and issues a DMA transfer request to the data transfer controller 501.

The main memory 510 holds various kinds of data, and the local memories 512 are a group of local memories connected to the processor 111 through the local bus.

The data transfer controller (DMA controller) 501 comprises a data transfer request receiver 502, a memory interface 503, a data I/O unit 504, a DMA parameter memory 505, and a start signal receiver 506.

The data transfer request receiver 502 receives a DMA transfer request from the processor 511, and the receiver 502 is connected to the processor 511 through the local bus and a signal line relating to DMA request. Hereinafter, the construction of the data transfer request receiver 502 will be described with reference to FIG. 8.

In FIG. 8, the data transfer request receiver 502 is composed of a priority level decoder 601, a selector 602, a reservation register 610, and a local bus.

The priority level decoder 601 decodes the priority level of an inputted DMA transfer request to determine a register where the request is to be stored.

The reservation register 610 is composed of a priority-level-1 reservation register 611, a priority-level-2 reservation register 612, and a priority-level-3 reservation register 613, and each priority-level reservation register is provided with plural setting registers for holding resource type information, and a pointer register. In FIG. 8, each of the priority level reservation registers 611~613 is provided with three setting registers.

Each pointer register comprises a reservation pointer and a read pointer. In each of the respective priority level reservation registers 611~613, each of the reservation pointers 621~623 selects a setting register to be set next, and each of the read pointers 631~633 selects a setting register to be executed next.

Further, as shown in FIGS. 7 and 8, the processor 511 is connected, through the local bus, to the respective priority level reservation registers 611~613 in the data transfer request receiver 502, whereby the processor 511 can directly read/write data from/into the setting registers and the point register in each priority level reservation register.

In FIG. 8, when reservations are inputted to the respective priority level reservation registers 611~613, reservation flags 1~3 corresponding to the respective registers 611~613 are set. Further, these reservation flags are ORed, and transmitted to the memory interface 503 as reservation flags indicating that there are reservations in the data transfer request receiver 502.

The selector 602 selects the resource type information outputted from the respective priority-level reservation registers 611~613, and the selection depends on the states of the reservation flags 1~3 outputted from the respective priority-level reservation registers. For example, when the reservation flag 1 is "1", the selector 602 selects the output of the priority-level-1 reservation register 611. When the reservation flag 1 is "0" and the reservation flag 2 is "1", the selector 602 selects the output of the priority-level-2 reservation register 612. When both of the reservation flags 1 and 2 are "0" and the reservation flag 3 is "1", the selector 602 selects the output of the priority-level-3 reservation register 613. That is, the order of priorities is priority level 1>priority level 2>priority level 3.

Next, the operation of the DMA controller (data transfer controller) 501 in the system of this fifth embodiment will be described with reference to FIGS. 7 and 7.

Initially, the processor 511 stores parameters required for execution of DMA transfer in the DMA parameter memory 505 through the local bus. These parameters are as follows: read/write information, access unit information such as byte or word, access information indicating consecutive access, rectangle access, ring pointer access, or the like, various kinds of address information such as start address, and the number of transfers.

As preprocessing before startup of the data transfer controller (DMA controller) 501, the processor 511 inputs a reservation for a DMA request to be executed immediately, in the data transfer request receiver 502. At this time, a reservation flag is transmitted to the memory interface 503. The processor 511 directly writes the reservation for the DMA transfer request, in the reservation register 610, by a DMA transfer request signal or through the local bus.

As already described for the first embodiment, when the processor 511 issues a start command to the start signal receiver 506, the data transfer controller 501 starts DMA transfer.

Initially, as the reservation flag is effective, the memory interface 503 outputs a reservation check signal to the data transfer request receiver 502.

The data transfer request receiver 502 puts the DMA transfer of reservation 1-1, which is stored in the first setting register of the priority-level-1 reservation register 611 shown in FIG. 8, into execution, by the memory interface 503.

It is assumed that, during execution of the DMA transfer of reservation 1-1, the priority level of the reservation 2-1, which has already been stored in the first setting register of the priority-level-2 reservation register 612, is desired to be changed to the priority level 3.

In this case, initially, the processor 511 reads the current state of the reservation register 610 through the local bus. Now, since the reservation 1-1 in the priority-level-1 reservation register 611 is being executed, in the priority-level-1 reservation register 611, the reservation pointer 621 and the read pointer 631 indicate the same position. In the priority-level-2 reservation register 612, since two reservations are set but not executed yet, the reservation pointer 622 selects the third setting register while the read pointer 632 selects the first setting register. In the priority-level-3 reservation register 613, since one reservation is set but not executed yet, the reservation pointer 623 selects the second setting register while the read pointer 632 selects the first setting register. Further, the reservation 201 is set in the first setting register of the priority-level-2 reservation register 612.

In order to change the reservation 2-1 to the priority level 3, the processor 511 rewrites the read pointer 632 of the priority-level-2 reservation register 612 so as to select the second setting register. Thereby, the reservation 2-1 stored in the first setting register of the priority-level-2 reservation register 612 is canceled. Further, in order to set the reservation 201 at the priority level 3, the processor 511 writes the resource type information indicated by the reservation 201 into the second setting register of the priority-level-3 reservation register 613. Thereafter, the reservation pointer 623 is changed so as to select the third register.

Figure 9:
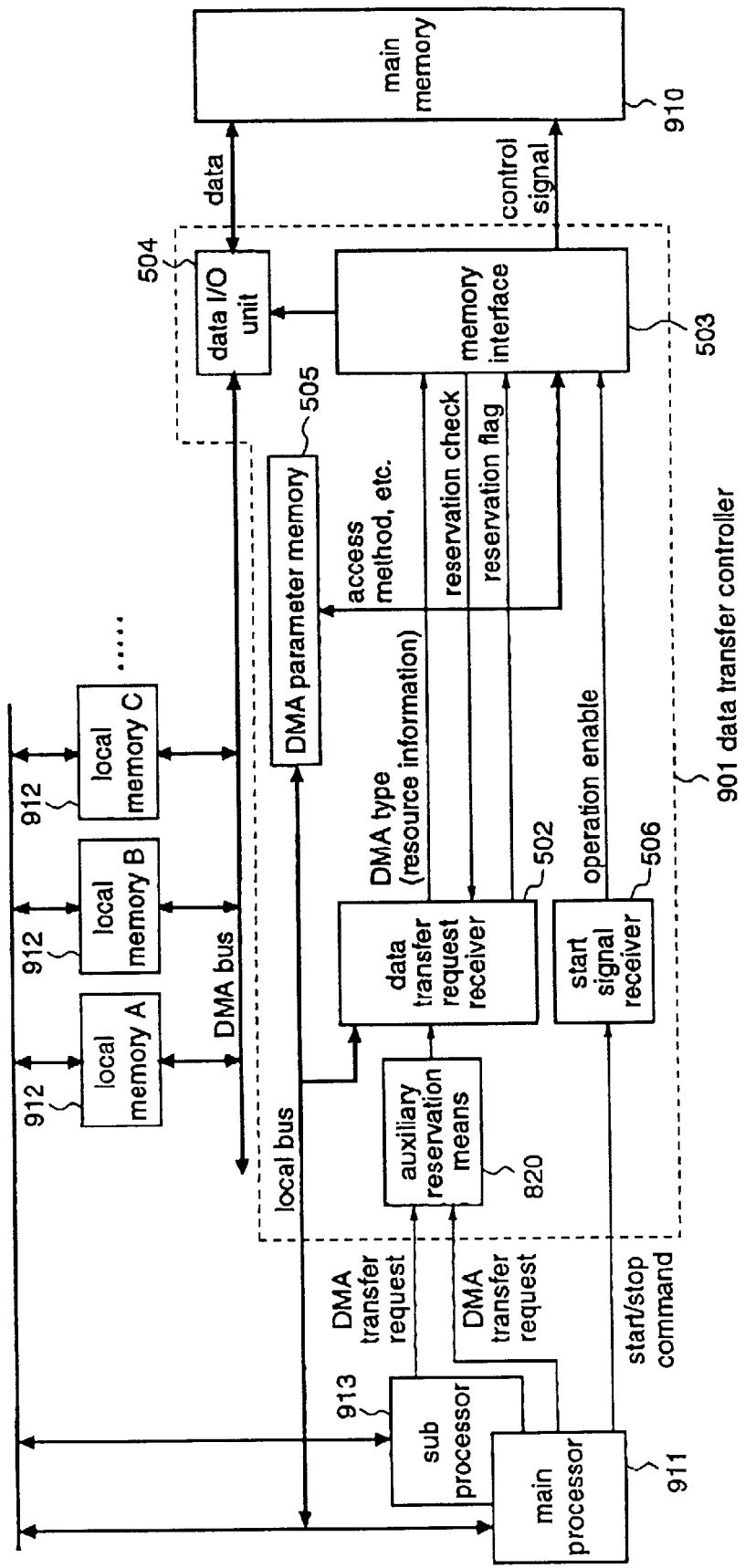
FIG. 9 is a block diagram illustrating a system including a DMA controller which receives DMA transfer requests from plural sources of DMA transfer requests, according to the fifth embodiment.
Figure 10:
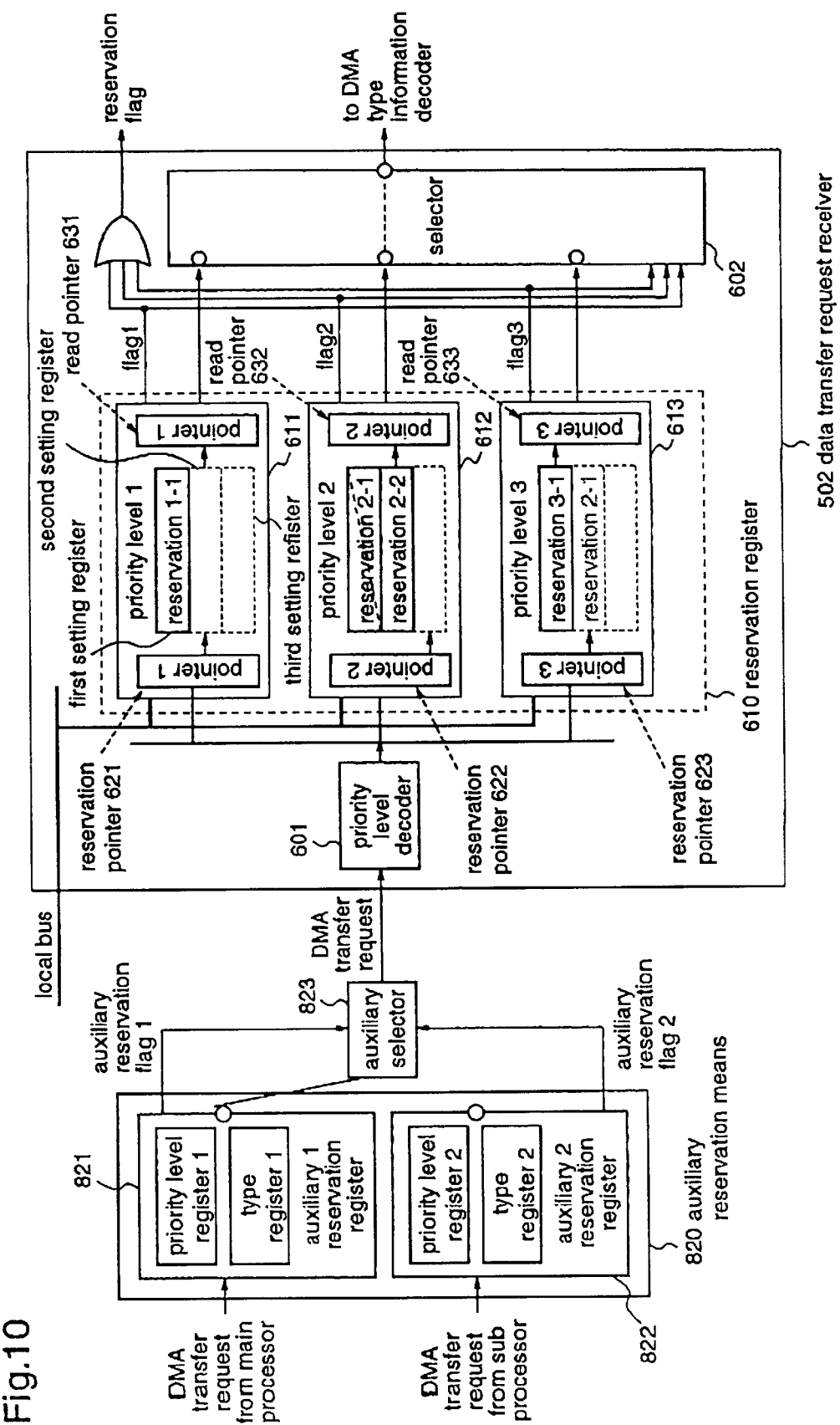
FIG. 10 is a block diagram illustrating an auxiliary reservation means and a data transfer request receiver which are included in the DMA controller according to the fifth embodiment.

While in this fifth embodiment the system has only one processor as a source of DMA transfer requests, the system may be provided with plural sources of DMA transfer requests as shown in FIGS. 9 and 10. In this case, the main processor 911 is connected to the data transfer request receiver 502 through the local bus so that the main processor 911 can arbitrarily read/write the reservation register 610 and, further, the reservation means 820 is placed before the data transfer request receiver 502.

As described above, according to the fifth embodiment of the invention, since the processor and the reservation register are connected through the local bus so that the processor can arbitrarily read/write the reservation register, it is possible to cancel the DMA request which has already been reserved, interchange the priority levels, or change the order of priority levels.

Thereby, the programmability (the degree of freedom in program design) of the processor is improved, whereby program design by plural developers is facilitated. Further, the DMA controller of this fifth embodiment can flexibly deal with various kinds of error processes and application requests, which occur during system operation.

While in this fifth embodiment both of the number of priority levels and the number of setting registers for the respective priority levels are three, these numbers may be arbitrary.

Further, while in this fifth embodiment an example of reservation replacement is described, it is also possible to restore the DMA reservation that was once executed, in like manner as described above.

[Embodiment 6]

Hereinafter, a DMA controller according to a sixth embodiment of the present invention will be described.

Initially, a DMA controller and a system having the DMA controller according to the sixth embodiment will be described with reference to FIGS. 1 and 11.

Figure 11:
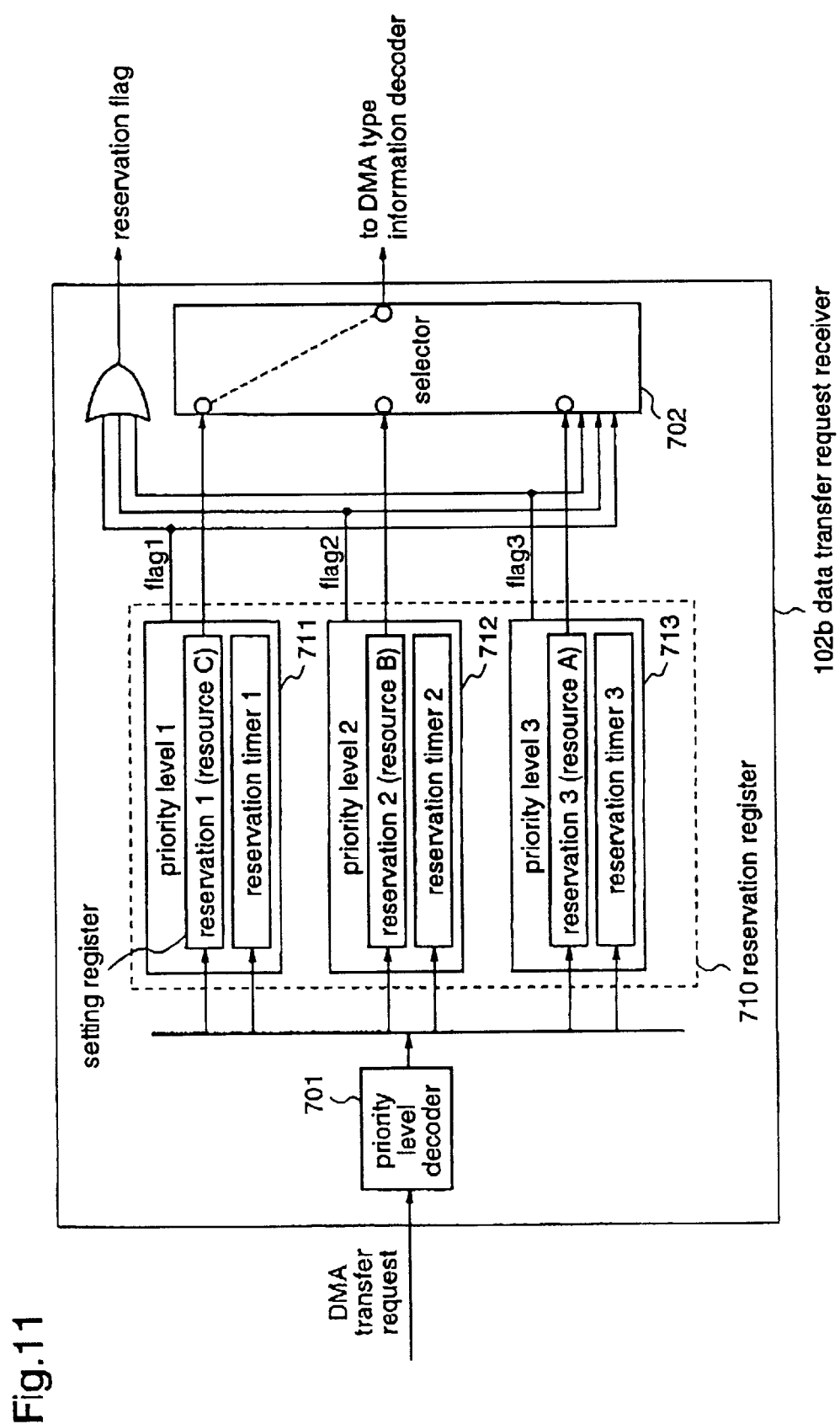
FIG. 11 is a block diagram illustrating a data transfer request receiver included in a DMA controller according to a sixth embodiment of the invention.

FIG. 11 is a block diagram illustrating a data transfer request receiver included in the DMA controller (data transfer controller) of this sixth embodiment.

In FIG. 11, a data transfer request receiver 102b comprises a priority level decoder 701, a reservation register 710, and a selector 702. In the reservation register 710, each of priority level reservation registers 711~713 includes a setting register and a reservation timer.

Other constituents of the DMA controller and the system having the DMA controller according to this sixth embodiment are identical to those described for the first embodiment and, therefore, do no require repeated description.

Next, a description will be qiven of the operation of the DMA controller (data transfer controller) 101 in the system of this sixth embodiment, with reference to FIGS. 1 and 11.

It is assumed that, at present, the system shown in FIG. 1 is in the startup state, and the processor 111 has already issued a start command to the data transfer controller 101. Further, the data transfer controller 101 is executing DMA transfer of reservation 1 in the priority-level-1 reservation register 711, and DMA transfers of reservation 2 and reservation 3 are stored in the setting registers of the priority-level-2 reservation register 712 and the priority-level-3 reservation register 713, respectively.

It is assumed that the processor 111 issues a DMA transfer request to the data transfer request receiver 102b. This DMA transfer request includes the priority level, the resource type information, and the execution timing information indicating the number of cycles before execution.

It is assumed that the processor 111 designates "resource B" as the resource type information to the setting register of the priority-level-1 reservation register 711, and "1000 cycles" as the execution timing information to the reservation timer 1 of the register 711.

On receipt of the DMA transfer request, the data transfer request receiver 102b selects the priority-level-1 reservation register 711 by the priority level decoder 701, and sets "resource B" as the resource type information in the setting register of the priority-level-1 reservation register 711, and "1000 cycles" as the execution timing information in the reservation timer 1. After the setting, the reservation timer 1 starts countdown to 1000 cycles, and the reservation of resource B in the priority-level-1 reservation register 711 is not executed during the countdown. Accordingly, the reservation flag 1 remains at "0", and it becomes "1" after 1000 cycles.

When the DMA transfer between the main memory 110 and the local memory C of reservation 1 is completed, since the reservation flag 1 becomes "0" and the reservation flag 2 becomes "2", the DMA transfer with the resource B of reservation 2, that is set in the priority-level-2 reservation register 712, takes place.

When the countdown by the reservation timer 1 is not ended at completion of the DMA transfer with the resource B of reservation 2, since the reservation flags 1 and 2 are "0" and the reservation flag 3 is "1", the DMA transfer with the resource A of reservation 3, that is set in the priority-level-3 reservation register 713, is executed.

When the reservation timer 1 ends the countdown of 1000 cycles during execution of the DMA transfer of reservation 3, the reservation flag 1 becomes "1" at this point of time, and the DMA transfer with the resource B that is reserved at priority level 1 is put to execution after completion of the DMA transfer with the resource A of reservation 3.

Figure 12:
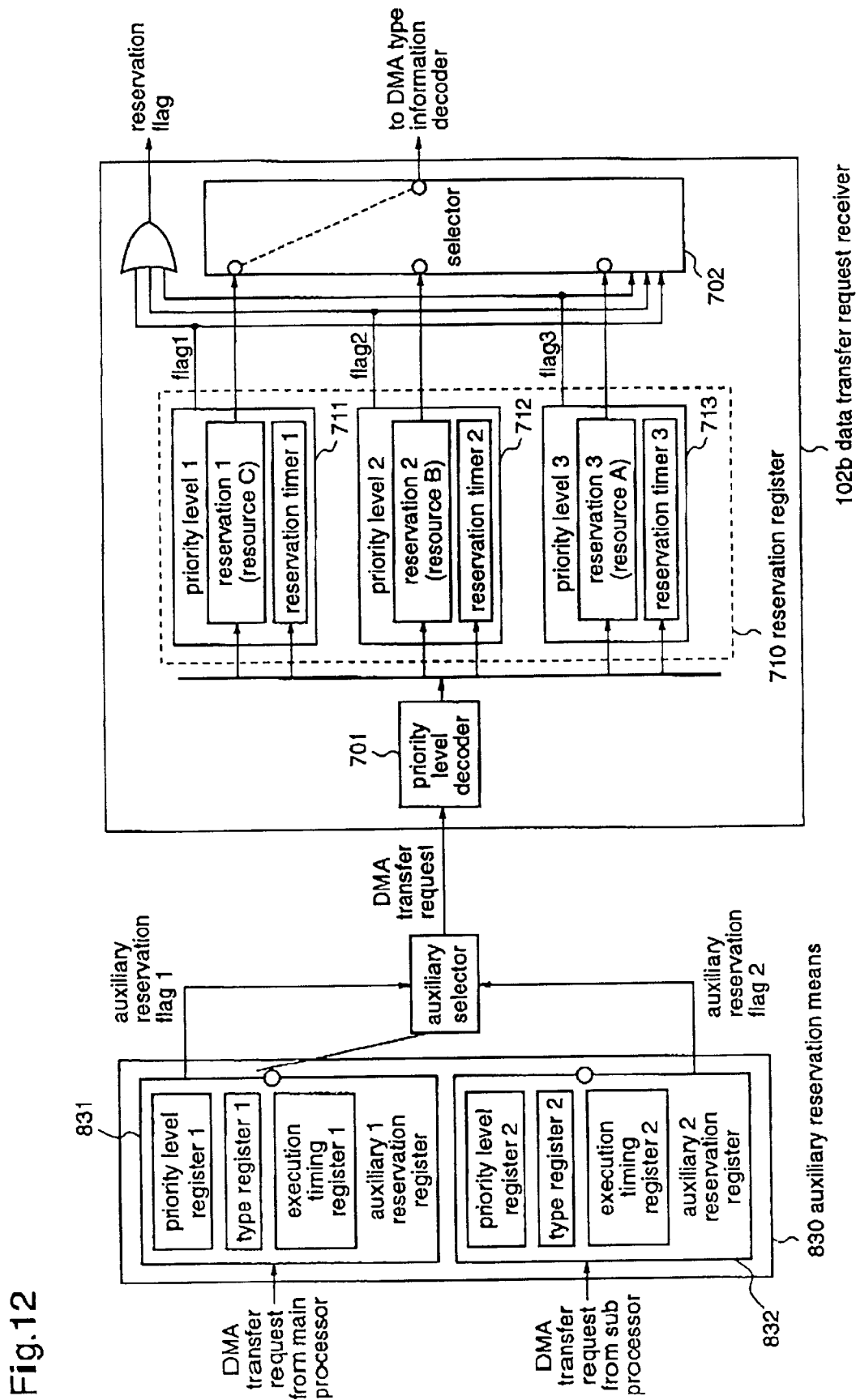
FIG. 12 is a block diagram illustrating an auxiliary reservation means and a data transfer request receiver which are included in a DMA controller that receives DMA transfer requests from plural sources of DMA transfer requests, according to the sixth embodiment.

The DMA transfer process according to this sixth embodiment can be applied to the case where there are plural sources of DMA transfer requests as described for the second embodiment. In this case, as shown in FIG. 12, an execution timing register capable of holding execution timing information is added to each of auxiliary reservation registers 831 and 832 corresponding to the respective DMA transfer request resources.

As described above, according to the sixth embodiment of the present invention, the number of cycles after reservation is designated as an execution timing of DMA transfer reserved in the data transfer request receiver 102b so that the DMA transfer should be executed after the designated time has passed, whereby the delayed DMA transfer can be executed easily. Therefore, for example, program design of a processor can be easily separated into fabrication of a module performing issue and control of DMA transfer and fabrication of a processing module disregarding DMA transfer. Thus, the facility in developing the processor is increased, leading to improved efficiency of development, reduced time period for development, and reduced number of program steps.

[Embodiment 7]

Hereinafter, a DMA controller according to a seventh embodiment of the present invention will be described.

Initially, a description will be given of a DMA controller and a system having the DMA controller according to the seventh embodiment, with reference to FIGS. 1 and 13.

Figure 13:
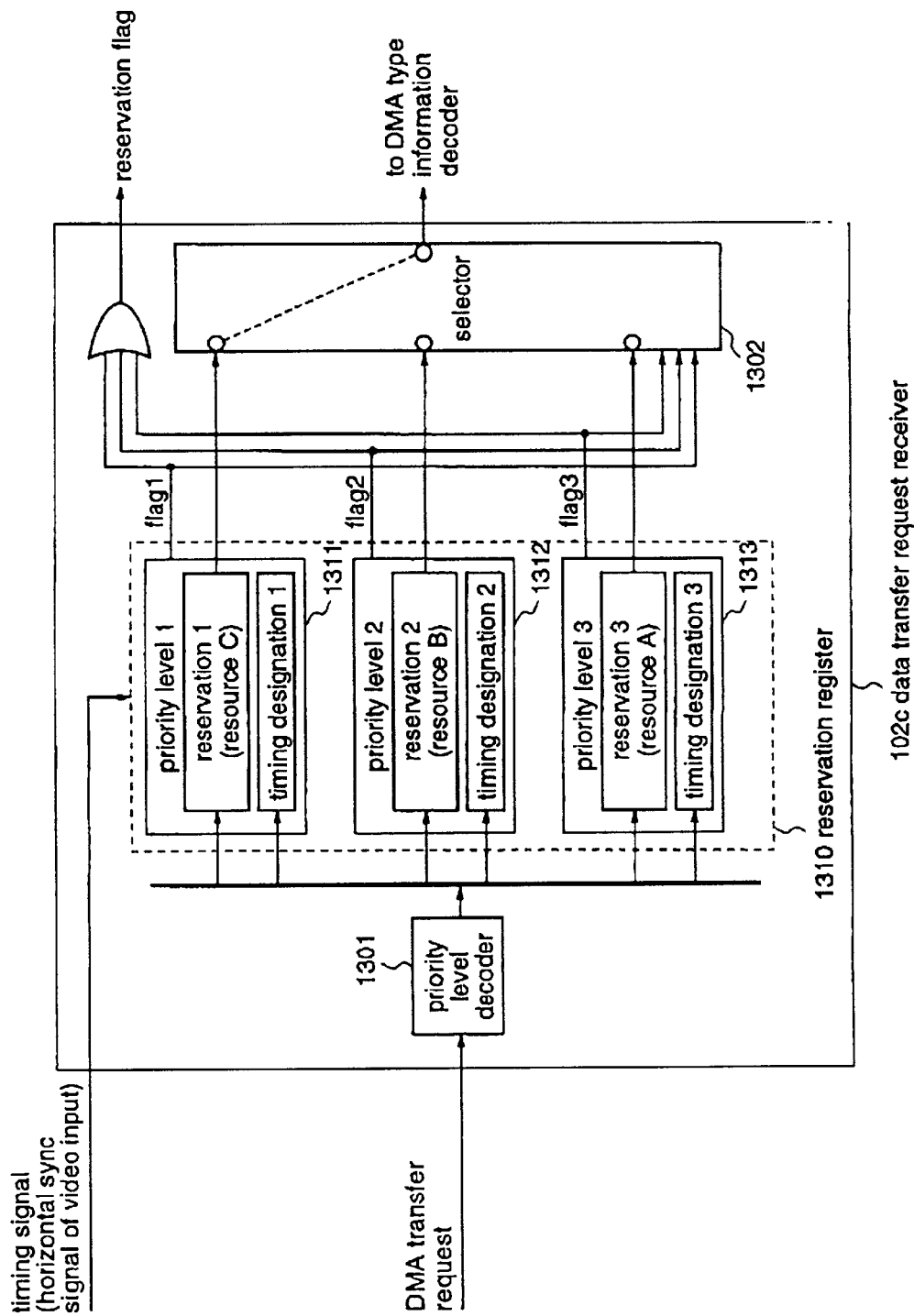
FIG. 13 is a block diagram illustrating a data transfer request receiver to which a predetermined timing signal is inputted, included in a DMA controller according to a seventh embodiment of the invention.

FIG. 13 is a block diagram illustrating a data transfer request receiver included in the DMA controller (data transfer controller) of this seventh embodiment.

In FIG. 13, a data transfer request receiver 102c comprises a priority level decoder 1301, a reservation register 1310, and a selector 1302. In the reservation register 1310, each of priority level reservation registers 1311~1313 includes a setting register for holding resource type information, and a timing designation register for designating whether a predetermined timing signal that is inputted to the reservation register 1310 is to be used as an execution timing or not.

Other constituents of the DMA controller and the system having the DMA controller according to this seventh embodiment are identical to those described for the first embodiment and, therefore, do no require repeated description.

Next, a description will be given of the operation of the DMA controller (data transfer controller) 101 in the system of this seventh embodiment, with reference to FIGS. 1 and 13.

It is assumed that, at present, the system shown in FIG. 1 is in the startup state, and the processor 111 has already issued a start command to the data transfer controller 101.

It is assumed that the processor 111 issues a DMA transfer request indicating "priority level 1", "resource C" as resource type information, and "execution timing designated" as execution timing information. The predetermined timing signal used as the execution timing is, for example, a horizontal sync signal of video input.

On receipt of the DMA transfer request, the data transfer request receiver 102c selects the priority-level-1 reservation register 1311 by the priority level decoder 1301. Then, the data transfer request receiver 102c sets "resource C" as the resource type information in the setting register of the priority-level-1 reservation register 1311, and a flag of "1" in the timing designation register 1. After the setting, the reservation of resource C in the priority-level-1 reservation register 1311 is not executed until the execution timing comes. Accordingly, the reservation flag 1 remains at "0", and it becomes "1" when the execution timing comes.

Next, the processor 111 designates a DMA transfer request indicating "priority level 2", "resource B" as resource type information, and "no execution timing designated" as execution timing information, and then designates a DMA transfer request indicating "priority level 3", "resource A" as resource type information, and "no execution timing designated" as execution timing information.

On receipt of the DMA transfer requests, the data transfer request receiver 102c sets the respective requests in the priority-level-2 reservation register 1312 and the priority-level-3 reservation register 1313 and, initially, puts the DMA transfer of resource B that is set in the priority-level-2 reservation register 1312, into execution.

It is assumed that a timing signal is inputted immediately after the execution. Since the execution timing of the reservation 1 that is set in the priority-level-1 reservation register 1311 is designated in the timing designation register 1, the reservation flag 1 becomes "1" at the timing when the timing signal is inputted, and the DMA transfer reservation becomes effective at this point of time.

Accordingly, when the currently executed DMA transfer of resource B is completed, since the reservation flag 1 of the priority-level-1 reservation register 1311 is "1", the DMA transfer of resource C that is set in the priority-level-1 reservation register 1311 is put into execution.

In the above description, the execution timing information indicates whether the predetermined timing signal inputted to the reservation register (in this embodiment, horizontal sync signal of video input) is to be used as DMA transfer execution timing or not. However, the execution timing signal may designate the type of a timing signal to be used as DMA transfer execution timing, among plural timing signals inputted to the reservation register.

Figure 14:
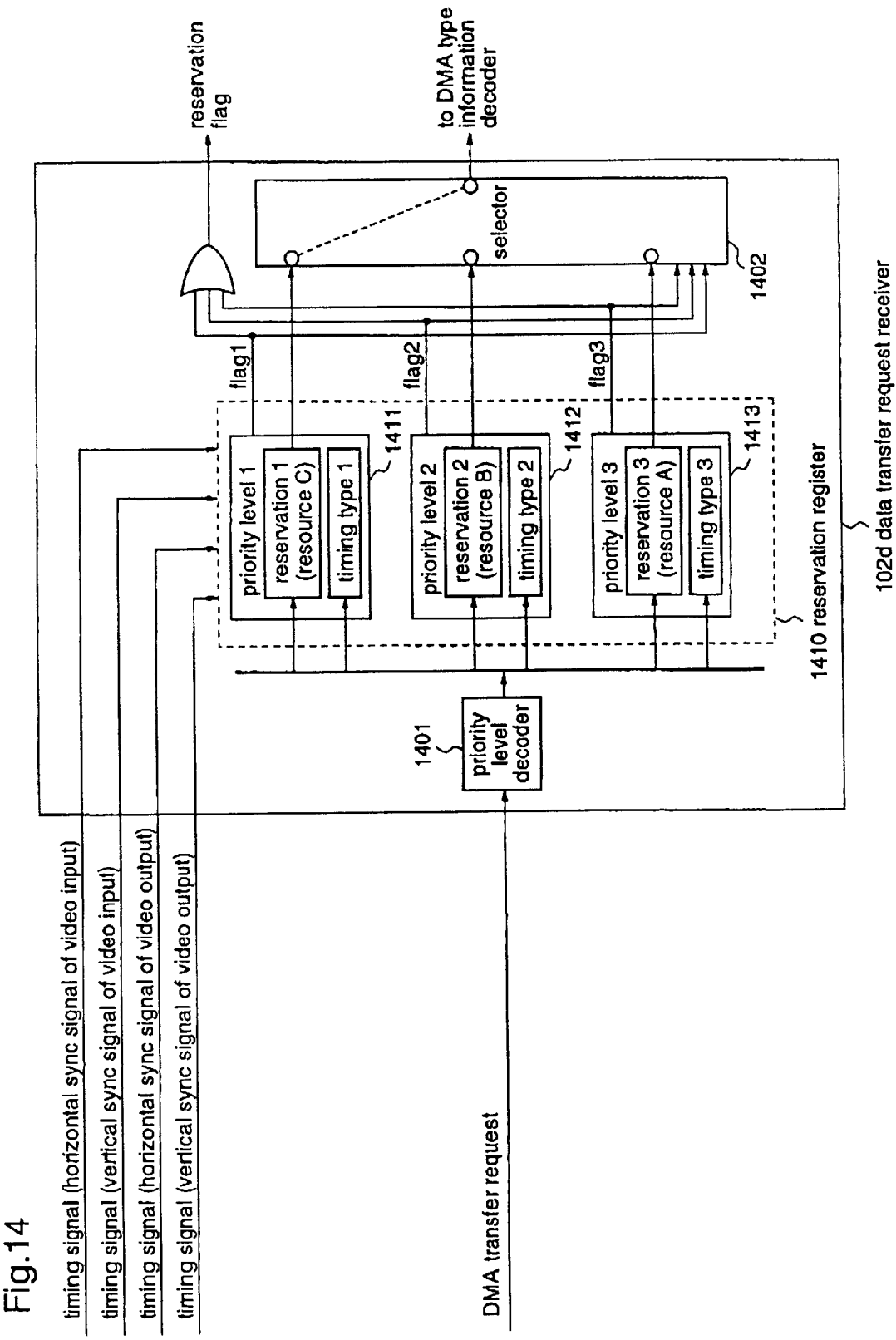
FIG. 14 is a block diagram illustrating a data transfer request receiver to which plural timing signals are inputted, included in the DMA controller according to the seventh embodiment.

In this case, as shown in FIG. 14, plural timing signals are inputted to the reservation register 1411 in the data transfer request receiver 102d, and a timing signal to be used as execution timing is selected by a value that is set in the timing type register included in each of the priority level reservation registers 1411~1413. For example, when "0" is set in the timing type 1 register, a horizontal sync signal of video input is selected, and when "1" is set, a vertical sync signal of video input is selected.

Further, the DMA transfer process according to the seventh embodiment is applicable to the case where there are plural sources of DMA transfer requests as described in the second embodiment. In this case, like the sixth embodiment shown in FIG. 12, an execution timing register for holding the execution timing information (timing designation or timing type) that is added to the information of DMA transfer request is added to each of the auxiliary reservation registers 831 and 832 in the auxiliary reservation means 830.

As described above, according to the seventh embodiment of the present invention, a predetermined timing signal inputted to the reservation register in the data transfer request receiver is designated, and execution of DMA transfer reserved in the data transfer request receiver is started utilizing the timing at which the designated signal is inputted. Therefore, it is possible to make a reservation to the data transfer request receiver without considering the timing at which the processor (data transfer request source) issues a DMA transfer request. Thereby, the degree of freedom in program development of the processor is increased, and the load on the development is considerably reduced, contributing to reduced time period for the development.

Further, since a timing signal designating an execution timing of DMA transfer is selected from plural signals, the degree of freedom in designating the execution timing is increased, thereby increasing the degree of freedom in program development of the processor, and facilitating the development.

Further, while in this seventh embodiment the number of priority levels is three and the number of setting register in each priority level reservation register is one, these numbers may be arbitrary.

Moreover, the execution timing information included in the DMA transfer request may be a combination of the number of cycles before DMA transfer execution (sixth embodiment) and the information as to whether the timing signal is to be used or not (seventh embodiment). In this case, when the number of cycles is included in the information of the DMA transfer request, the number of cycles is counted with the reservation timer in the reservation register, and when the information as to whether the timing signal is to be used or not is included, the DMA transfer is executed according to the timing of the timing signal.

[Embodiment 8]

Hereinafter, a DMA controller according to an eighth embodiment of the present invention will be described.

Initially, the constructions of a DMA controller and a system including the DMA controller according to this eighth embodiment will be described with reference to FIGS. 1 and 15.

Figure 15:
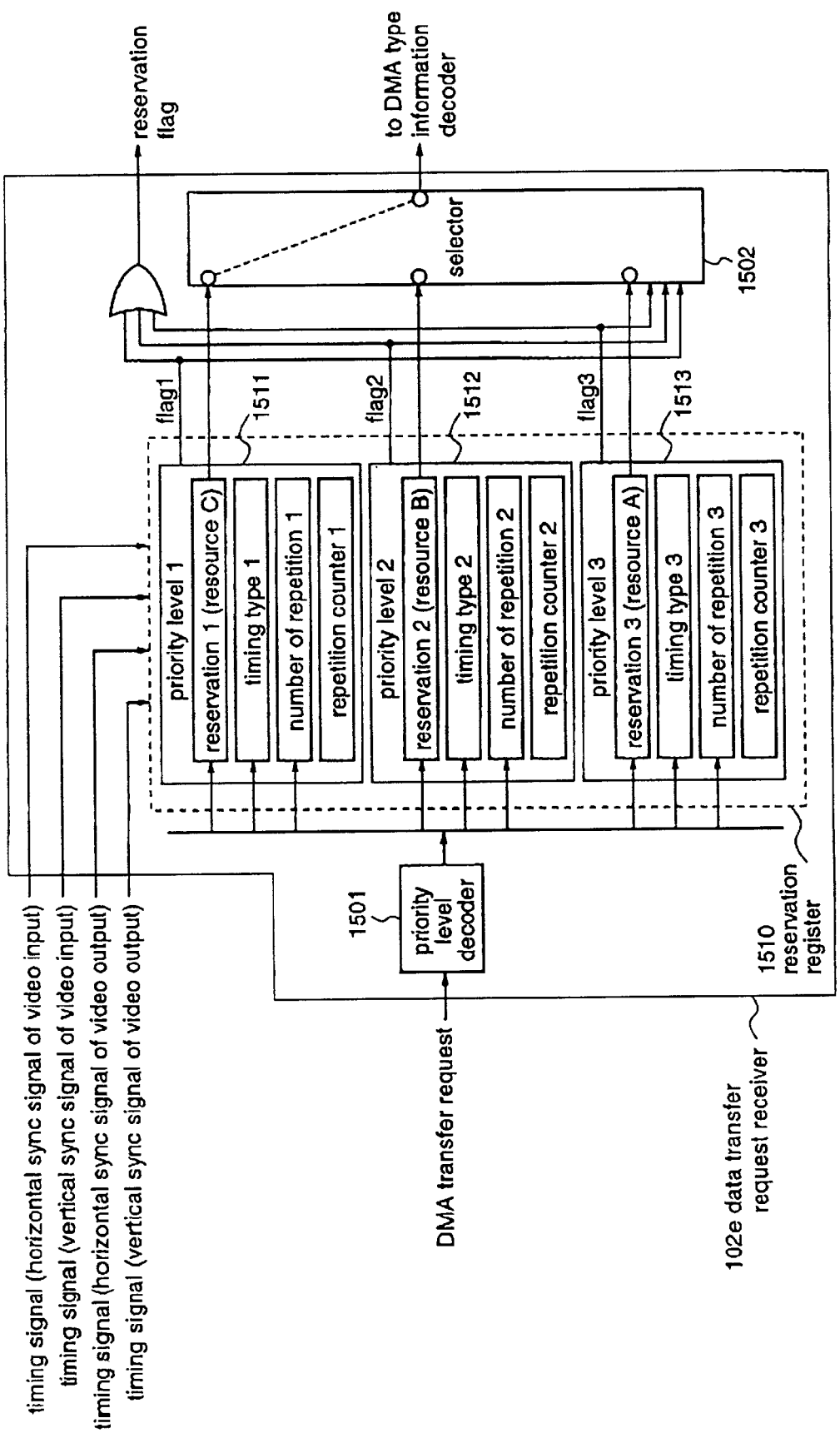
FIG. 15 is a block diagram illustrating a data transfer request receiver included in a DMA controller according to an eighth embodiment of the invention.

FIG. 15 is a block diagram illustrating a data transfer request receiver included in the DMA controller (data transfer controller) of this eighth embodiment.

In this eighth embodiment, a data transfer request from the processor 111 includes repetition information indicating the number of times the DMA transfer is repeated, in addition to the execution timing information (i.e., information as to whether a timing signal is designated or not, or information designating the type of a timing signal).

In this case, as shown in FIG. 15, each of the priority level reservation registers 1511~1513 in the data transfer reservation receiver 102e is provided with a number-of-repetition setting register for holding the number of times a DMA transfer request is executed, and a number-of-repetition counter for counting the number of execution times set in the number-of-repetition setting register, in addition to the setting register holding resource type information, and the timing type register holding execution timing information indicating the type of a timing signal to be used as execution timing.

Other constituents of the DMA controller and the system having the DMA controller according to this eighth embodiment are identical to those described for the first embodiment and, therefore, do no require repeated description.

Next, the operation of the DMA controller (data transfer controller) 101 in the system according to this eighth embodiment will be described with reference to FIGS. 1 and 15.

It is now assumed that a DMA transfer request is supplied from the processor 111 to the priority-level-1 reservation register 1511 and, simultaneously, "3" (execution timing information) is set in the timing type register 1 so that a vertical sync signal of video output is selected, and "2" (number of execution times) is set in the number-of-repetition setting register 1. At this time, the initial value of the number-of-repetition counter 1 is the value set in the number-of-repetition setting register 1. Although the reservation flag 1 of the priority-level-1 reservation register 1511 is initially "0", it becomes "1" at the timing of the falling edge (start of vertical blanking) of the vertical sync signal of video output. When the currently executed DMA transfer is ended, the DMA transfer set in the priority-level-1 reservation register 1511 is put to execution, and the number-of-repetition counter 1 decrements the count to "1". Even when this DMA transfer has been completed, the reservation flag 1 remains at "1", and when the same DMA transfer set in the priority-level-1 reservation register 1511 is put to execution, the number-of-repetition counter 1 decrements the count to "0". At the same time, the reservation flag 1 becomes "0", indicating that there is no reservation. In this eighth embodiment, each priority level reservation register is provided with a number-of-repetition setting register and a number-of-repetition counter, and the number of repetition set in the setting register is counted by the counter. However, each reservation register may be provided with only a number-of-repetition counter in which the number of repetition is set.

Further, the DMA transfer process according to the eighth embodiment is applicable to the case where there are plural sources of DMA transfer requests as described for the second embodiment. In this case, as shown in FIG. 16, each of the auxiliary reservation registers 841 and 842 in the auxiliary reservation means 840 is provided with an execution timing register for holding the execution timing information (timing designation or timing type) that is added to the information of DMA transfer request, and a number-of-repetition register for holding the number-of-repetition information.

As described above, according to the eighth embodiment of the invention, since the number of repetition is designated, the processor (DMA transfer request source) does not need to make plural requests of the same DMA transfer, whereby the request issuing process is simplified. This facilitates the hardware design of the processor, and the software design such as programming of the processor. As the result, the load on development is reduced, and the easiness of development is increased.

While in this eighth embodiment the number of priority levels is three and the number of priority level reservation registers is one, these numbers may be arbitrary.

[Embodiment 9]

Hereinafter, a DMA controller according to a ninth embodiment of the present invention will be described.

FIG. 17 is a diagram illustrating data arrangement in a DMA parameter memory according to the ninth embodiment.

In FIG. 17, the first half of the DMA parameter memory indicates that parameters required for DMA transfer are put together for each resource with which the main memory performs data transfer. For example, in a resource A parameter area, access pattern designation parameter information indicates an access pattern to the main memory in the DMA transfer with the corresponding resource. Read/write information indicates whether the DMA transfer is reading from the main memory or writing into the main memory. Access unit information indicates whether access to the main memory is performed in byte units or in word units. Further, a start address indicating a transfer start address and the number of transfers are stored to perform fundamental sequential access.

In the second half of the DMA parameter memory, parameters required for each access pattern are stored. For example, there are three kinds of access patterns as follows: (1) access pattern to a rectangle area, (2) access pattern to ring buffer 1 area, (3) access pattern to ring buffer 2 area.

The rectangle area access pattern contains a start address, the number of accesses in the vertical direction, and the number of accesses in the horizontal direction.

The ring buffer 1 area access pattern contains an area head address and an area end address for forming a ring buffer, a start address as a DMA transfer start address, and the number of transfers.

The ring buffer 2 (high-performance ring buffer) area access pattern includes an area head address, an area end address, a start address for writing, the number of transfers for writing, a start address for reading, and the number of transfers for reading.

In this way, the parameters corresponding to the respective resources are stored in an address area of the DMA parameter memory while the parameters corresponding to the respective access patterns are stored in another address area of the DMA parameter memory.

Since the constituents of the DMA controller and the system having the DMA controller according to this ninth embodiment are identical to those described for the first embodiment, repeated description is not necessary.

Next, a description will be given of the operation of the DMA controller (data transfer controller) 101 in the system according to this ninth embodiment, with reference to FIGS. 1, 2, and 17.

The processor 111 stores parameters required for DMA transfer, in the DMA parameter memory 105, using the local bus. For example, as shown in FIG. 17, the processor 111 stores, in each of the parameter areas of resources A, B, and C, the access pattern information, the read/write information, the access unit information, the start address at fundamental access (continuous access), and the number of transfers. Since required parameters are put together for each resource, the processor 111 can set the parameters by continuous address access on the local bus.

Further, the processor 111 stores parameters required for the respective access patterns, i.e., the rectangle area access, the ring buffer 1, and the ring buffer 2. Since required parameters are put together for each access pattern, the CPU can make access to relating information by continuous address access on the local bus.

When the processor 111 issues desired DMA transfer requests to the data transfer request receiver 102, the DMA transfer requests are reserved in the priority level reservation registers as shown in FIG. 2.

When a start command is inputted to the start signal receiver 106 in the data transfer controller 101, the DMA transfers are sequentially put to execution, starting from that in the reservation register of the highest priority level.

In this ninth embodiment, initially, the DMA transfer between the resource C and the main memory 110, which is set in the priority-level-1 reservation register 211, is executed.

When the data transfer controller 101 transfers the DMA type information to the memory interface 103, the memory interface 103 knows that the DMA transfer relates to the resource C. Thereby, the memory interface 103 reads the parameters relating to the resource C from the DMA parameter memory 105. From the read parameters, the memory interface 103 knows that the DMA transfer relating to the resource C is continuous access (access pattern), writing into the main memory 110, and word-by-word transfer. Further, since the access pattern is continuous access, the memory interface 103 executes DMA write transfer from the resource C to the main memory 110, using the start address "$3F00" (hexadecimal) and the number of transfers "88".

When the DMA transfer with the resource C is completed, the end address is written in the resource C start address section in the DMA parameter memory 105. At the same time, the DMA transfer with the resource B of priority level 2 is put to execution.

The memory interface 103 knows that this is the DMA transfer with the resource B, from the DMA type information, and continuously reads the data (parameters) from the area where the information relating to the resource B is stored in the DMA parameter memory 105. From the read parameters, the memory interface 103 knows that the DMA transfer relating to the resource B is rectangle area access (access pattern), reading from the main memory 110, and data transfer in byte units. Since the access pattern is rectangle area access, the memory interface 103 continuously reads the data (parameters) from the area where the information relating to the rectangle area access is stored in the DMA parameter memory 105. Thereby, the memory interface 103 knows that the head address of the rectangle access area is $1000 (hexadecimal), the number of accesses in the horizontal direction is 16, and the number of accesses in the vertical direction is 16. Using these parameters, DMA read transfer of 16×16 rectangle area starting from $1000 is executed from the main memory 110 to the resource B.

When the DMA transfer of the resource B is completed, DMA write transfer of ring buffer 2 of the resource A at priority level 3 is executed in byte units, in like manner as mentioned above.

The DMA transfer process according to this ninth embodiment is also applicable to the case where there are plural sources of DMA transfer requests as described for the second embodiment.

As described above, according to the ninth embodiment of the invention, since the parameters required for DMA transfer are put together for each resource in an address area, it is possible to continuously set the data (parameters) relating to plural resources and take out the data, even when only one DMA parameter memory is used.

Further, since the access pattern information is provided for each resource, it is possible to make access to the main memory using plural access patterns.

Further, since the parameter memory contains the read/write information and the access unit information, it is not necessary to specify the information in a DMA transfer request. Therefore, the DMA transfer request is simplified, whereby the program code of the processor is simplified.

Furthermore, according to the ninth embodiment, since each access pattern is provided with the start address information and the number of transfers, the start address and the number of transfers can be fixed by the access pattern. Therefore, it is not necessary to specify the access start address every time the access pattern of each resource changes. Further, since the parameters corresponding to each access pattern are put together in an address area, these parameters can be continuously set and read out. As the result, the program of the processor is simplified, and the circuit control is facilitated, resulting in reduction in the time period for development.

The method of storing parameters in the memory shown in FIG. 17, the kinds of parameters, and the values of parameters are merely examples, and the present invention is not restricted thereto.

[Embodiment 10]

Hereinafter, a DMA controller according to a tenth embodiment of the present invention will be described.

Initially, the constructions of a DMA controller and a system including the DMA controller according to the tenth embodiment will be described with reference to FIG. 18.

Figure 18:
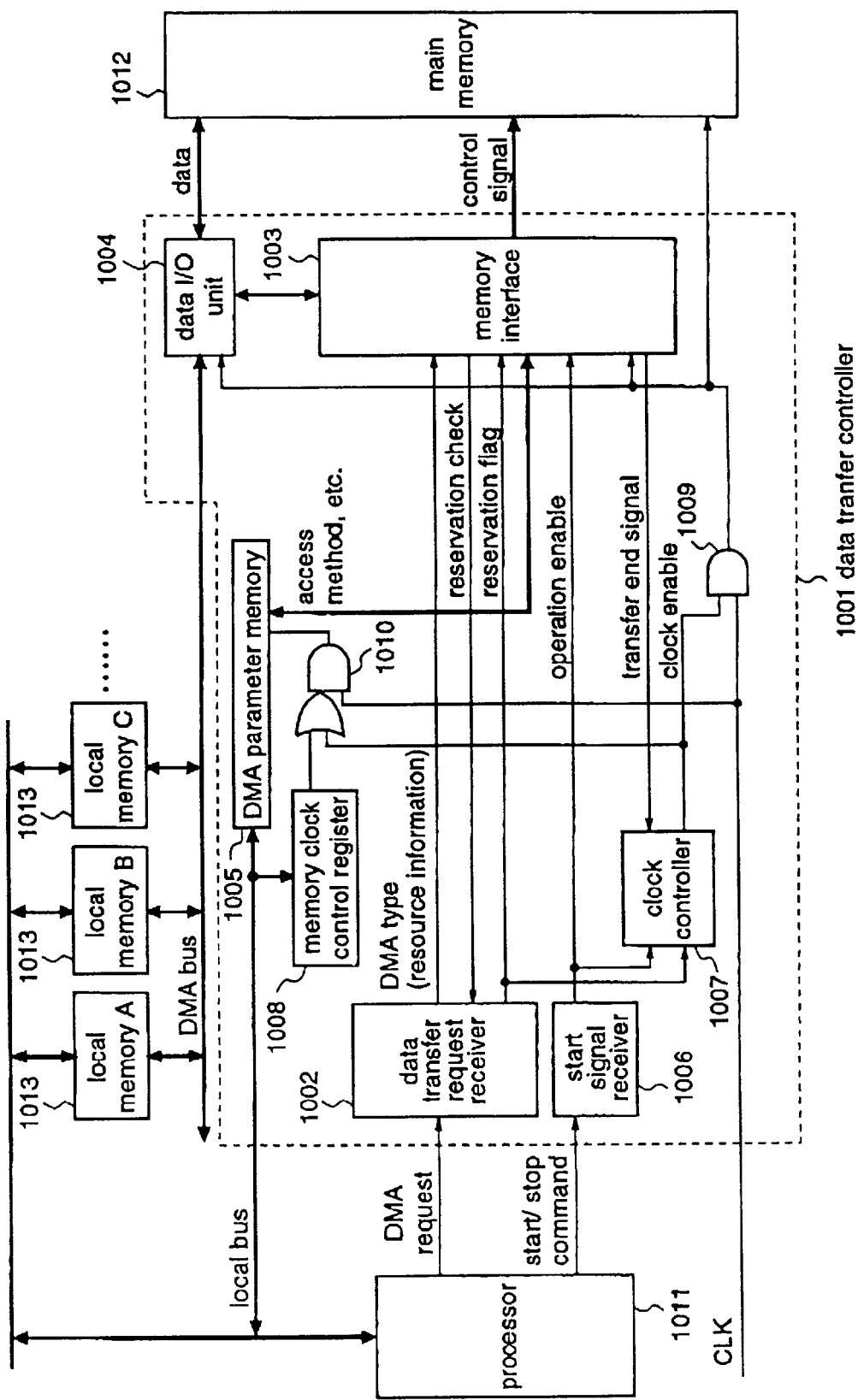
FIG. 18 is a block diagram illustrating a system including a DMA controller according to a tenth embodiment of the present invention.

FIG. 18 is a block diagram illustrating the system having the DMA controller according to this tenth embodiment.

The system shown in FIG. 18 is composed of a data transfer controller 1001 as a DMA controller, a processor 1011, a main memory 1012, local memories 1013, a local bus, and a DMA bus.

The processor 111 controls the whole system including the data transfer controller 1001, and issues a DMA transfer request to the data transfer controller 1001.

The main memory 1012 holds various kinds of data, and the local memories 1013 are a group of local memories connected to the processor 1011 through the local bus.

The data transfer controller (DMA controller) 1001 comprises a data transfer request receiver 1002, a memory interface 1003, a data I/O unit 1004, a DMA parameter memory 1005, a start signal receiver 1006, a clock controller 1007, a memory clock control register 1008, a clock supply/stop units 1009 and 1010.

The clock controller 1007 outputs a clock enable signal only when the start signal receiver 1006 issues an operation enable signal, and DMA transfer reservations are stored in the data transfer request receiver 1002.

The memory clock control register 1008 is a register for memory clock control, which is specially provided for the DMA parameter memory 1005. This register 1008 controls compulsory supply of a clock to the DMA parameter memory 1005.

The clock supply/stop units 1009 and 1010 control supply and stop of clocks to the DMA parameter memory 1005, the memory interface 1003, the data I/O unit 1004, and the main memory 1012. The clock supply/stop unit 1009 is constituted by, for example, an AND gate, and is controlled by the clock controller 1007. The memory interface 1003, the data I/O unit 1004, and the main memory 1012 are operated according to a clock outputted from the clock supply/stop unit 1009. The clock supply/stop unit 1010 is constituted by, for example, a composite gate created by OR and AND, and is controlled by the memory clock control register 1008 or the clock controller 1007. The DMA parameter memory 1005 is operated according to a clock outputted from the clock supply/stop unit 1010.

The constituents of the data transfer request receiver 1002 included in the data transfer controller 1001 according to this tenth embodiment are identical to those described for the first embodiment and, therefore, do not require repeated description.

Next, the operation of the DMA controller (data transfer controller) in the system of this tenth embodiment will be described with reference to FIGS. 18 and 2.

Initially, the processor 1011 writes "1" in the memory clock control register 1008 by using the local bus to enable a memory clock. Thereby, the clock is compulsorily supplied to the DMA parameter memory 1005. Thereafter, the processor 1011 stores parameters required for DMA transfer in the DMA parameter memory 1005, and writes "0" in the memory clock control register 1008 to stop the clock. Then, the processor 1011 issues a DMA transfer request that is required for initial transfer, to the data transfer request receiver 1002, to make reservation. It is assumed that three reservations of DMA transfers are made as shown in FIG. 2.

When the system is started, the processor 1011 issues a start command to the start signal receiver 1006. On receipt of the start command, the start signal receiver 1006 issues an operation enable signal to the memory interface 1003 and to the clock controller 1007. The clock controller 1007 is provided with the operation enable signal and a reservation flag, and when both of them are effective, the clock controller 1007 operates to enable a clock enable signal. The clock enable signal outputted from the clock controller 1007 is inputted to the clock supply/stop units 1009 and 1010, and the clock supply/stop units 1009 and 1010 controls the clock so that the clock is supplied to the main memory 1012, the memory interface 1003, the data I/O unit 1004, and the DMA parameter memory 1005 only when the clock enable signal is effective.

When the three reservations shown in FIG. 2 are executed in the order of the priority levels and, in each DMA transfer, writing of data into the main memory 1012 or writing of data into each local memory 1013 is completed, the data I/O unit 1004 informs the completion to the memory interface 1003, and the memory interface 1003 outputs a transfer end signal to the clock controller 1007. Further, the reservation flag becomes "0" when the reservations in the data transfer request receiver 1002 have gone. On receipt of the transfer end signal from the memory interface 1003, the clock controller 1007 sets the clock enable signal to "0" at the timing when the reservation flag from the data transfer request receiver 1002 becomes "0", and outputs the clock enable signal to the clock supply/stop units 1009 and 1010. On receipt of the clock enable signal, the clock supply/stop units 1009 and 1010 stop supply of the clock to the main memory 1012, the memory interface 1003, the data I/O unit 1004, and the DMA parameter memory 1005.

The above-described DMA transfer process according to the tenth embodiment is also applicable to the case where there are plural sources of DMA transfer requests as described for the second embodiment.

As described above, according to the tenth embodiment, since the control clock for data transfer and the clock of the main memory are automatically supplied during the minimum period required, the power can be controlled efficiently, resulting in a system that realizes low power consumption.

Further, according to the tenth embodiment, since the program of the processor doesn't need to perform clock control every time a DMA transfer request is issued, the program is not complicated and, moreover, the number of program steps is reduced.

[Embodiment 11]

Hereinafter, a DMA controller according to an eleventh embodiment of the present invention will be described.

Initially, a DMA controller and a system including the DMA controller according to the eleventh embodiment will be described with reference to FIG. 19.

Figure 19:
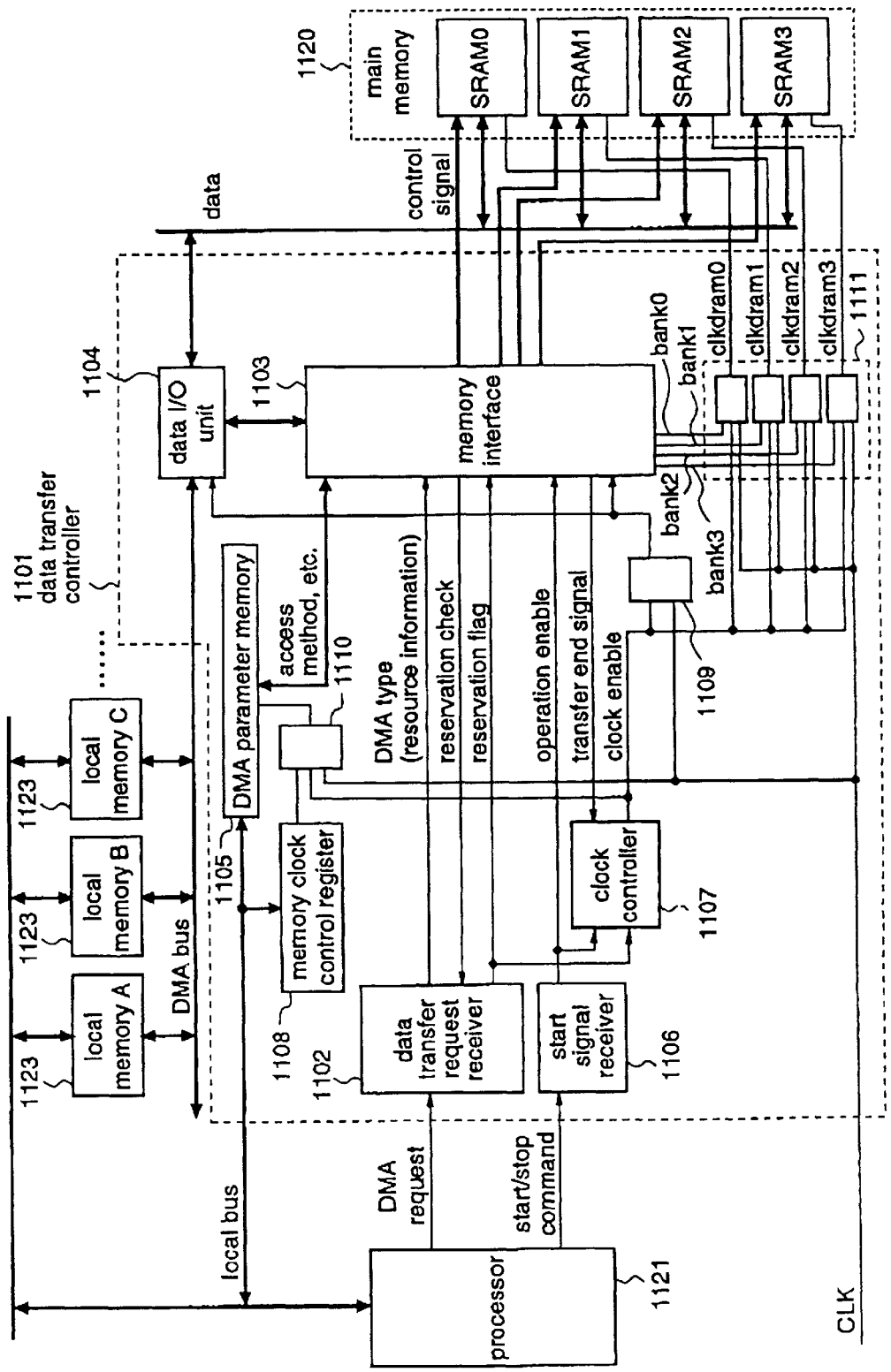
FIG. 19 is a block diagram illustrating a system including a DMA controller according to an eleventh embodiment of the present invention.

FIG. 19 is a block diagram illustrating a system having a DMA controller (data transfer controller) according to this eleventh embodiment.

In FIG. 19, the system comprises a data transfer controller (DMA controller) 1101, a main memory 1120, a processor 1121, local memories 1123, a local bus, and a DMA bus.

The main memory 1120 holds various kinds of data, and it is constituted by a SRAM. A linear address area of the SRAM is physically divided into four banks (SRAM0~SRAM3), and independent clocks are inputted to the respective banks.

The processor 1121 controls the whole system including the data transfer controller 1101, and issues a DMA transfer request to the data transfer controller 1101.

The local memories 1123 are a group of local memories connected to the processor 1121 through the local bus.

The data transfer controller (DMA controller) 1101 comprises a data transfer request receiver 1102, a memory interface 1103, a data I/O unit 1104, a DMA parameter memory 1105, a start signal receiver 1106, a clock controller 1107, a memory clock control register 1108, clock supply/stop units 1109 and 1110, and a main memory clock supply/stop unit 1111.

The clock controller 1107 outputs a clock enable signal only when the start signal receiver 1106 issues an operation enable signal, and DMA transfer reservations are stored in the data transfer request receiver 1102.

The memory clock control register 1108 is a special register for the DMA parameter memory 1105. This register 1108 controls compulsory supply of a clock to the DMA parameter memory 1105.

The memory interface 1103, the data I/O unit 1104, and the main memory clock supply/stop unit 1111 are operated according to a clock outputted from the clock supply/stop unit 1109. The clock supply/stop unit 1109 is constituted by, for example, an AND gate. The DMA parameter memory 1105 is operated according to a clock outputted from the clock supply/stop unit 1110, and the clock supply/stop unit 1110 is controlled by the memory clock control register 1108 or the clock controller 1107. For example, the clock supply/stop unit 1110 is constituted by a composite gate which is created by the OR between the output of the memory clock control register 1108 and the clock enable signal, and the AND between the output of the OR and the clock.

The main memory clock supply/stop unit 1111 is provided with clock supply/stop units corresponding to the SRAM0~SRAM3 of the main memory 1120 so as to supply independent clocks clkram0~clkram3 to the respective memories (SRAM0~SRAM3). The clock supply/stop unit corresponding to each SRAM is supplied with a clock enable signal from the clock controller 1107. Further, the upper two bits of the address of the main memory 1120 are decoded, and the clock supply/stop unit is supplied with these bits as a bank selection signal from the memory interface 1103. Table 1 shows the relationship between the upper two bits of the address and the bank selection signal.

TABLE 1

| upper two bits of address | bank selection signal | | | |
| --- | --- | --- | --- | --- |
| | bank0 | bank1 | bank2 | bank3 |
| 00 | 1 | 0 | 0 | 0 |
| 01 | 0 | 1 | 0 | 0 |
| 10 | 0 | 0 | 1 | 0 |
| 11 | 0 | 0 | 0 | 1 |

The respective memory clock supply/stop units of the main memory clock supply/stop unit 1111 supply the clocks to the respective SRAMs in the main memory 1120 only when the address-decoded bank selection signals bank0~bank3 are effective and the clock enable signal from the clock controller 1107 is effective. These memory clock supply/stop units are constituted by, for example, AND gates.

The constituents of the data transfer request receiver 1102 in the data transfer controller 1101 according to this eleventh embodiment are identical to those described for the first embodiment, and the data arrangement in the DMA parameter memory 1105 according to this eleventh embodiment is identical to that described for the ninth embodiment. Therefore, repeated description is not necessary.

Next, the operation of the DMA controller (data transfer controller) 1101 in the system of this eleventh embodiment will be described with reference to FIGS. 19, 2, and 17.

Initially, as described for the tenth embodiment, the processor 1121 writes "1" in the memory clock control register 1108 by using the local bus to enable a memory clock. Thereby, the clock is compulsorily supplied to the DMA parameter memory 1105. Thereafter, the processor 1211 stores parameters required for DMA transfer in the DMA parameter memory 1105, and writes "0" in the memory clock control register 1108 to stop the clock. Then, the processor 1211 issues a DMA transfer request that is required for initial transfer, to the data transfer request receiver 1102, to make reservation. It is assumed that three reservations of DMA transfers are made as shown in FIG. 2.

When the system is started, the processor 1211 issues a start command to the start signal receiver 1106. On receipt of the start command, the start signal receiver 1106 issues an operation enable signal to the memory interface 1103 and to the clock controller 1107. The clock controller 1107 is provided with the operation enable signal and a reservation flag. When both of them are effective, the clock controller 1107 operates to enable the clock enable signal. The clock enable signal is inputted to the clock supply/stop units 1109 and 1110, and the clock is supplied to the memory interface 1103, the data I/O unit 1104, and the DMA parameter memory 1105 only when the clock enable signal is effective.

It is now assumed that DMA transfer between the resource C and the main memory 1120, which is the reservation of priority level 1, is being executed, and the DMA parameters at this time are as shown in FIG. 17. In this case, the DMA transfer is word-by-word write transfer having continuous access as the access pattern, $3F00 (hexadecimal) as the start address, and 88 as the number of transfers.

Initially, since the upper two bits of the access start address of the main memory 1120 are "00", the memory interface unit 1103 outputs the signals of bank0=1, bank1=0, bank2=0, and bank3=0 to the main memory clock supply/stop unit 1111. The main memory clock supply unit 1111 receives the clock enable signal from the clock controller 1107 and the bank0 signal from the memory interface 1103, and supplies only the clock clkram0 to the SRAM0.

At the time when the above-described transfer of 16 words is completed, when the address changes to $4000 (hexadecimal), the upper two bits of the address changes to "10", whereby the memory interface 1107 outputs the signals of bank0=1, bank1=1, bank2=0, and bank3=0 to the main memory clock supply/stop unit 1111. On receipt of the clock enable signal from the clock controller 1107 and the bank1 signal from the memory interface 1103, the main memory clock supply/stop unit 1111 supplies only the clock clkram1 to the SRAM1, and stops clock supply to the SRAM0, SRAM2, and SRAM3.

Under the above-mentioned control, the three reservations shown in FIG. 2 are executed in the order of the priority levels. In each DMA transfer, when writing of data into the main memory 1120 or writing of data into each local memory 1123 is completed, the data I/O unit 1104 informs this completion to the memory interface 1103. Then, the memory interface 1103 outputs a transfer end signal to the clock controller 1107, and the reservation flag becomes "0" when the reservations in the data transfer request receiver 1102 have gone. On receipt of the transfer end signal from the memory interface 1103, the clock controller 1107 sets the clock enable signal to "0" at the timing when the reservation flag from the data transfer request receiver 1102 becomes "0", and outputs the clock enable signal to the clock supply/stop units 1109 and 1110. On receipt of the clock enable signal, the clock supply/stop units 1109 and 1110 stop supply of the clock to the memory interface 1103, the data I/O unit 1104, the DMA parameter memory 1105, and the main memory clock supply/stop unit 1111.

The above-described DMA transfer process according to the eleventh embodiment is also applicable to the case where there are plural sources of DMA transfer requests as described for the second embodiment.

As described above, according to the eleventh embodiment, the main memory is physically divided into plural memories, and the clock and the control signal are inputted to each of the memories so that supply of the clock and the control signal to the unused address area can be automatically stopped, whereby a system that can efficiently realize low power consumption is obtained.

Further, according to the eleventh embodiment, since the circuit automatically performs clock control, the program of the processor doesn't need to perform clock control. Therefore, the program is not complicated and, moreover, the number of program steps can be reduced.

[Embodiment 12]

Hereinafter, a DMA controller according to a twelfth embodiment of the present invention will be described.

Initially, a description will be given of the constructions of a DMA controller according to the twelfth embodiment and a system including the DMA controller, with reference to FIG. 20.

Figure 20:
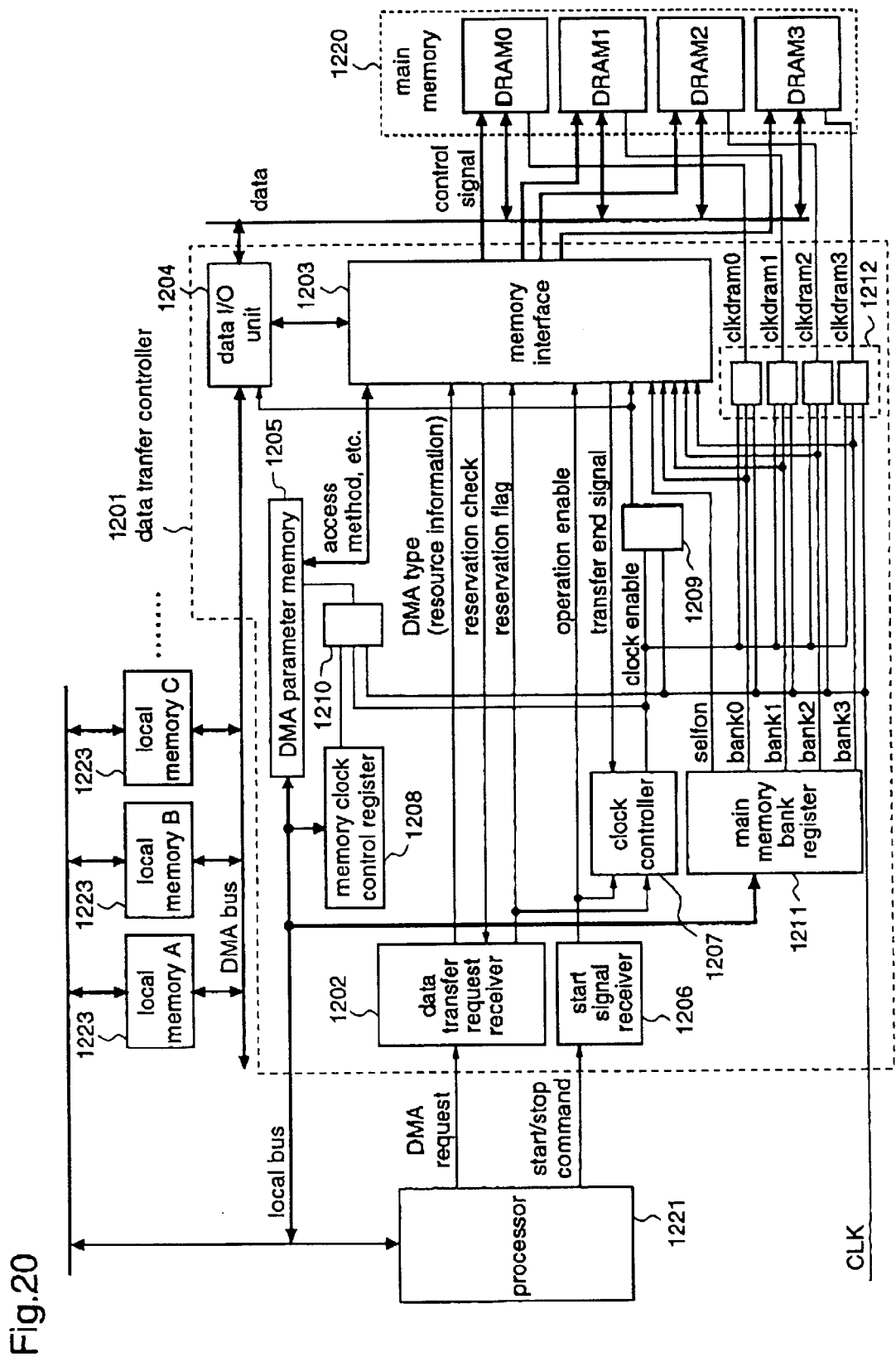
FIG. 20 is a block diagram illustrating a system including a DMA controller according to a twelfth embodiment of the present invention.

FIG. 20 is a block diagram illustrating the system including the DMA controller according to the twelfth embodiment.

In FIG. 20, the system comprises a data transfer controller (DMA controller) 1201, a main memory 1220, a processor 1221, a local memory 1223, a local bus, and a DMA bus.

The main memory 1220 holds various kinds-of data, and it is constituted by a DRAM. A linear address area of the DRAM is physically divided into four banks (DRAM0~DRAM3), and independent clocks are inputted to the respective banks.

The processor 1221 controls the whole system including the data transfer controller 1201, and issues a DMA transfer request to the data transfer controller 1201.

The local memories 1223 are a group of local memories connected through the local bus to the processor 1221.

The data transfer controller (DMA controller) 1201 comprises a data transfer request receiver 1202, a memory interface 1203, a data I/O unit 1204, a DMA parameter memory 1205, a start signal receiver 1206, a clock controller 1207, a memory clock control register 1208, clock supply/stop units 1209 and 1210, a main memory bank register 1211, and a main memory clock supply/stop unit 1212.

The clock controller 1207 outputs a clock enable signal only when the start signal receiver 1206 issues an operation enable signal, and DMA transfer request reservations are stored in the data transfer request receiver 1202. The memory clock control register 1208 is a special memory for the DMA parameter memory 1205, and controls compulsory supply of a clock to the DMA parameter memory 1205.

The memory interface 1203, the data I/O unit 1204, and the main memory 1220 are operated according to a clock outputted from the clock supply/stop unit 1209. The clock supply/stop unit 1209 is constituted by, for example, an AND gate. The DMA parameter memory 1205 is operated according to a clock outputted from the clock supply/stop unit 1210, and the clock supply/stop unit 1210 is controlled by the memory clock control register 1208 or the clock controller 1207. For example, the clock supply/stop unit 1210 is constituted by, for example, a composite gate created by the OR between the output of the memory clock control register 1208 and the clock enable signal, and the AND between the output of the OR and the clock.

The main memory bank register 1211 controls selection of a bank from the four banks into which the main memory 1220 is divided, and it is connected to the processor 1221 through the local bus. The main memory bank register 1211 selects a bank to be used, and decides whether the DRAMs other than the bank to be used should be completely turned off or only self-refreshing should be carried out. Further, the main memory bank register 1211 outputs bank selection signals bank0~bank3 corresponding to the DRAM0~DRAM3, respectively, on the basis of the values of 0~3 that are set by the lower two bits. Table 2 shows the relationship among the set value, the self-refreshing setting, and the bank selection signal.

TABLE 2 self-refreshing control signal and bank selection signal

| set value | self on | bank0 | bank1 | bank2 | bank3 | operation |
|---|---|---|---|---|---|---|
| 000 | 1 | 1 | 0 | 0 | 0 | Self-refresh bank1~bank3 |
| 001 | 1 | 1 | 1 | 0 | 0 | Self-refresh bank2, bank3 |
| 010 | 1 | 1 | 1 | 1 | 0 | Self-refresh bank3 |
| 011 | 1 | 1 | 1 | 1 | 1 | Normal operation of all banks |
| 100 | 0 | 1 | 0 | 0 | 0 | Set bank1~bank3 in OFF states |
| 101 | 0 | 1 | 1 | 0 | 0 | Set bank2,bank3 in OFF states |
| 110 | 0 | 1 | 1 | 1 | 0 | Set bank 3 in OFF state |
| 111 | 0 | 1 | 1 | 1 | 1 | Normal operation of all banks |

The main memory clock supply/stop unit 1212 is a clock supply/stop means for supplying independent clocks clkdram0~clkdram3 to the DRAM0~DRAM3 (main memory 1220), respectively, and it is constituted by, for example, AND gates.

The bank selection signals (bank0~bank3) and the self-refreshing control signal (selfon) are inputted to the memory interface 1203 to be used for selection of control signals to the DRAM0~DRAM3.

Since the constituents of the data transfer request receiver 1202 included in the data transfer controller 1201 according to the twelfth embodiment are identical to those described for the first embodiment, repeated description is not necessary.

Next, the operation of the DMA controller (data transfer controller) 1201 in the system according to the twelfth embodiment will be described with reference to FIGS. 20 and 2.

Initially, as described for the tenth embodiment, the processor 1221 writes "1" in the memory clock control register 1208 by using the local bus to enable a memory clock. Thereby, the clock is compulsorily supplied to the DMA parameter memory 1205. Thereafter, the processor 1221 stores parameters required for DMA transfer in the DMA parameter memory 1205, and writes "0" in the memory clock control register 1208 to stop the clock.

Then, the processor 1221 issues a DMA transfer request that is required for initial transfer, to the data transfer request receiver 1202, to make reservation. It is assumed that three reservations of DMA transfers are made as shown in FIG. 2.

Now, it is assumed that half of the DRAMs are to be used. The processor 1221 sets "self-refreshing OFF" and three bits "101" indicating "DRAM area to be used=2 banks", in the main memory bank register 1211, using the local bus.

When the system is started, the processor 1221 issues a start command to the start signal receiver 1206. On receipt of the start command, the start signal receiver 1206 issues an operation enable signal to the memory interface 1203 and to the clock controller 1207. The clock controller 1207 is provided with the operation enable signal and a reservation flag. When both of them are effective, the clock controller 1207 operates to enable the clock enable signal. The clock enable signal is inputted to the clock supply/stop units 1209 and 1210, and the clock is supplied to the memory interface 1203, the data I/O unit 1204, and the DMA parameter memory 1205 only when the clock enable signal is effective.

Further, the main memory clock supply/stop unit 1212 is supplied with the clock enable signal from the clock controller 1207, and the bank selection signals bank0=1, bank1=1, bank2=0, and bank3=0 from the main memory bank register 1211, and the clocks clkdram0 and clkdram1 are supplied to the selected banks (DRAM0 and DRAM1) during the period when the clock enable signal is effect.

Further, the memory interface 1203 controls the DRAM1~DRAM3 on the basis of the control signals selfon, and bank0~bank3 which are supplied from the main memory bank register 1211. When the selfon signal is "0", since the DRAM2 and DRAM3 other than the DRAM0 and DRAM1 which are selected by the bank signals are in the OFF states, access is not carried out and, moreover, even refreshing is not carried out. Further, supply of the control signals to the selected banks DRAM 0 and DRAM1 is also controlled by the upper two bits of the addresses, in the memory interface 1203. Furthermore, auto-refreshing is carried out as necessary, simultaneously with normal access. The auto-refreshing is a refreshing command to be periodically executed on the DRAMs from the outside, and this is inputted together with the clock.

Under the above-mentioned state, the three reservations shown in FIG. 2 are executed in the order of the priority levels, and in each DMA transfer, when writing of data into the main memory 1220 or writing of data into each local memory 1223 is completed, the data I/O unit 1204 informs this completion to the memory interface 1203. Then, the memory interface 1203 outputs a transfer end signal to the clock controller 1207, and the reservation flag becomes "0" when the reservations in the data transfer request receiver 1202 have gone. On receipt of the transfer end signal from the memory interface 1203, the clock controller 1207 sets the clock enable signal to "0" at the timing when the reservation flag from the data transfer request receiver 1202 becomes "0", and outputs the clock enable signal to the clock supply/stop units 1209 and 1210. On receipt of the clock enable signal, the clock supply/stop units 1209 and 1210 stop supply of the clock to the memory interface 1203, the data I/O unit 1204, and the DMA parameter memory 1205. Further, on receipt of the clock enable signal from the clock controller 1207, the main memory clock supply/stop unit 1212 stops supply of the clock to the DRAM0 and DRAM1.

Next, a description will be given of the case where access is made to the whole area at first and, thereafter, the area to access is changed to half the area.

Initially, the processor 1221 sets "self-refreshing ON" and three bits "011" indicating that the DRAM area to be used is the whole area, in the main memory bank register 1211, by using the local bus, simultaneously with setting of the parameters into the DMA parameter memory 1205, and reservation of the DMA transfer requests into the data transfer request receiver 1202, When the system is started, the processor 1221 issues a start command to the start signal receiver 1206. On receipt of the start command, the start signal receiver 1206 issues an operation enable signal to the memory interface 1203 and to the clock controller 1207. The clock controller 1207 is provided with the operation enable signal and a reservation flag. When both of them are effective, the clock controller 1207 enables the clock enable signal. The clock enable signal is inputted to the clock supply/stop units 1209 and 1210, and the clock is supplied to the memory interface 1203, the data I/O unit 1204, and the DMA parameter memory 1205 only when the clock enable signal is effective.

Further, the main memory clock supply/stop unit 1212 is supplied with the clock enable signal from the clock controller 1207, and the bank selection signals bank0=1, bank1=1, bank2=0, and bank3=0 from the main memory bank register 1211, and the clocks clkdram0, clkdram1, clkdram2, and clkdram3 are supplied to the selected banks (whole area of DRAM0~DRAM3) during the period when the clock enable signal is effect.

Further, the memory interface 1203 controls the respective DRAM banks on the basis of the control signals selfon, and bank0~bank3 which are supplied from the main memory bank register 1211. Since the selfon signal is now "1" and the bank signals indicate that all banks are effective, all bank normal operation mode takes place, and access is carried out with auto refreshing as necessary. The auto-refreshing is a refreshing command that is periodically executed on the DRAMs from the outside.

Further, supply of the control signals to the selected banks is controlled by the upper two bits of the addresses in the memory interface 1203.

It is assumed that, under the above-mentioned state, the three reservations set in the data transfer request receiver as shown in FIG. 2 are executed in the order of the priority levels. In each DMA transfer, when writing of data into the main memory 1220 or writing of data into each local memory 1223 is completed, the data I/O unit 1204 informs this completion to the memory interface 1203. Then, the memory interface 1203 outputs a transfer end signal to the clock controller 1207, and the reservation flag becomes "0" when the reservations in the data transfer request receiver 1202 have gone. On receipt of the transfer end signal from the memory interface 1203, the clock controller 1207 sets the clock enable signal to "0" at the timing when the reservation flag from the data transfer request receiver 1202 becomes "0", and outputs the clock enable signal to the clock supply/stop units 1209 and 1210. On receipt of the clock enable signal, the clock supply/stop units 1209 and 1210 stop supply of the clock to the memory interface 1203, the data I/O unit 1204, and the DMA parameter memory 1205. Further, on receipt of the clock enable signal from the clock controller 1207, the main memory clock supply/stop unit 1212 stops supply of the clock to the DRAM0~DRAM3.

At this time, if the processor 1221 decides that only the half area of the main memory 1220 should be used for a while from now on, the processor 1221 sets "self-refreshing ON" and three bits "001" indicating "the DRAM area to be used is two banks (DRAM0 and DRAM1)", in the main memory bank register 1211, by using the local bus.

When the system is started, the processor 1221 issues a start command to the start signal receiver 1206. On receipt of the start command, the start signal receiver 1206 issues an operation enable signal to the memory interface 1203 and to the clock controller 1207. The clock controller 1207 is provided with the operation enable signal and a reservation flag. When both of them are effective, the clock controller 1207 enables the clock enable signal. The clock enable signal is inputted to the clock supply/stop units 1209 and 1210, and the clock is supplied to the memory interface 1203, the data I/O unit 1204, and the DMA parameter memory 1205 only when the clock enable signal is effective.

Further, the main memory clock supply/stop unit 1212 is supplied with the clock enable signal from the clock controller 1207, and the bank selection signals bank0=1, bank1=1, bank2=0, and bank3=0 from the main memory bank register 1211, and the clocks clkdram0 and clkdram1 supplied to the selected banks (DRAM0 and DRAM1) during the period when the clock enable signal is effect.

Further, the memory interface 1203 controls the respective DRAM banks on the basis of the control signals selfon, and bank0~bank3 which are supplied from the main memory bank register 1211. Since the selfon signal is "1" and the bank signals bank0 and bank 1 are effective, the DRAM2 and DRM3 other than the DRAM0 and DRAM1 selected by the bank signals are not accessed, and these DRAMs are in the self-refreshing states. The self-refreshing state is a state where clock supply is stopped with a self-refreshing control signal being "L".

Further, supply of the control signals to the selected banks (DRAM0 and DRAM1) is controlled by the upper two bits of the addresses, in the memory interface 1203. Refreshing is carried out by auto-refreshing that is performed between accesses.

It is assumed that, under the above-mentioned state, the three reservations set in the data transfer request receiver as shown in FIG. 2 are executed in the order of the priority levels. In each DMA transfer, when writing of data into the main memory 1220 or writing of data into each local memory 1223 is completed, the data I/O unit 1204 informs this completion to the memory interface 1203. Then, the memory interface 1203 outputs a transfer end signal to the clock controller 1207, and the reservation flag becomes "0"

when the reservations in the data transfer request receiver 1202 have gone. On receipt of the transfer end signal from the memory interface 1203, the clock controller 1207 sets the clock enable signal to "0" at the timing when the reservation flag from the data transfer request receiver 1202 becomes "0", and outputs the clock enable signal to the clock supply/stop units 1209 and 1210. On receipt of the clock enable signal, the clock supply/stop units 1209 and 1210 stop supply of the clock to the memory interface 1203, the data I/O unit 1204, and the DMA parameter memory 1205. Further, on receipt of the clock enable signal from the clock controller 1207, the main memory clock supply/stop unit 1212 stops supply of the clock to the DRAM0 and DRAM1.

Thereafter, if use of the whole area is desired, setting of the main memory bank register 1211 is changed to make the DRAM2 and the DRAM3 go out of the self-refreshing mode, resulting in the whole area normal access mode.

Hereinafter, a description will be given of the power consumption in the case where a DRAM is divided into plural banks in comparison with the case where a single DRAM is employed, taking specific example.

For example, a memory used for image processing is considered, which memory is used in an image processing apparatus for processing MPEG4 that is the international standard of image compression and decompression.

The area of the memory used for the above-mentioned image processing depends on the type of image to be processed, and Table 3 shows the relationship between the type of image to be processed and the memory capacity required.

TABLE 3 type of image to be processed and memory capacity required

| required capacity | type of image to be processed |
|---|---|
| 4Mbit | still image and graphics display |
| 8Mbit | QCIF size (176 pixels × 144 lines) codec |
| 12Mbit | CIF size (352 pixels × 288 lines) decode |
| 16Mbit | CIF size (352 pixels × 288 lines) codec |

Figure 21:
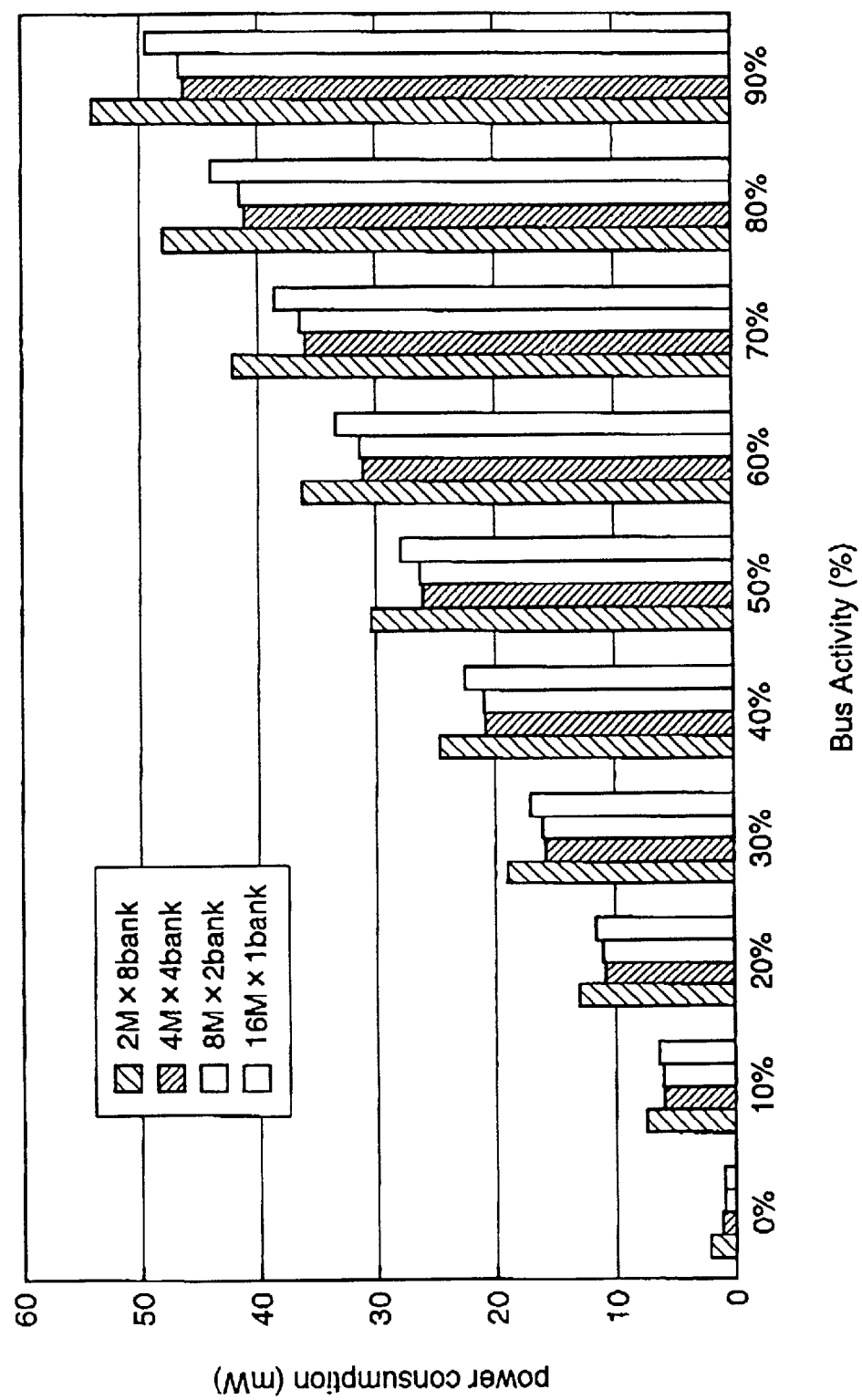
FIG. 21 is a graph for explaining comparison of power consumption when dividing a memory area into plural areas, according to the twelfth embodiment.

With reference to Table 3, the maximum memory capacity is 16 Mbit, and the power consumption of DRAMs that can be mounted on an LSI at this time is estimated as shown in FIG. 21. With reference to FIG. 21, a 16 Mbit memory area is divided into one, two, four, and eight banks, and these memory banks are compared with respect to the power consumption. It is evident from FIG. 21 that the power consumption is lower when the 16 Mbit memory area is divided into plural banks than when the memory area is used as a single DRAM.

Based on the result shown in FIG. 21, the 16 Mbit area is divided into four banks in units of 4 Mbit, and the memory is constituted using individual four DRAMs so that DRAMs to be used can be selected according to the type of processing.

Figure 22:
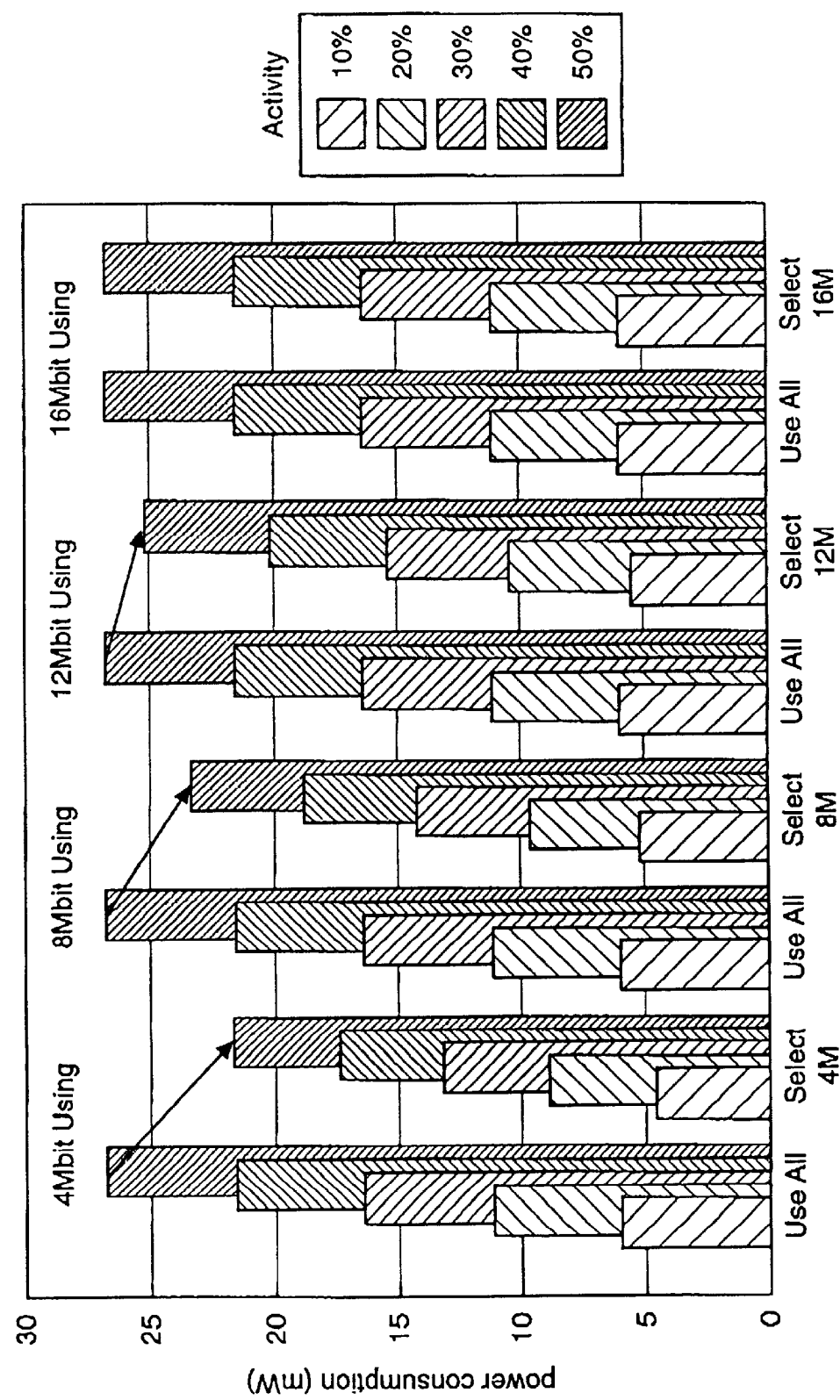
FIG. 22 is a graph for explaining comparison of power consumption when dividing a memory area into four areas, according to the twelfth embodiment.

For example, when executing a CIF size codec, it is necessary to use the whole area of 16 Mbits as shown in Table 3. However, when the image size is changed and a QCIF size codec is to be executed, since the required area is 8 Mbits, setting is changed so as to use two DRAM banks among the four DRAMs. Thereby, no clock and no control signal are supplied to the unused memory area and, further, no access is made to that area. FIG. 22 is a graph in which the power consumption when the memory area of 16 Mbits is divided into four banks and only each of the memory banks is used is compared with the power consumption when all of the memory banks are used. It is evident from FIG. 22 that the power consumption is lower in the case where no clock and no control signal are supplied to the unused memory area than in the case where all of the memory banks are used.

Figure 23:
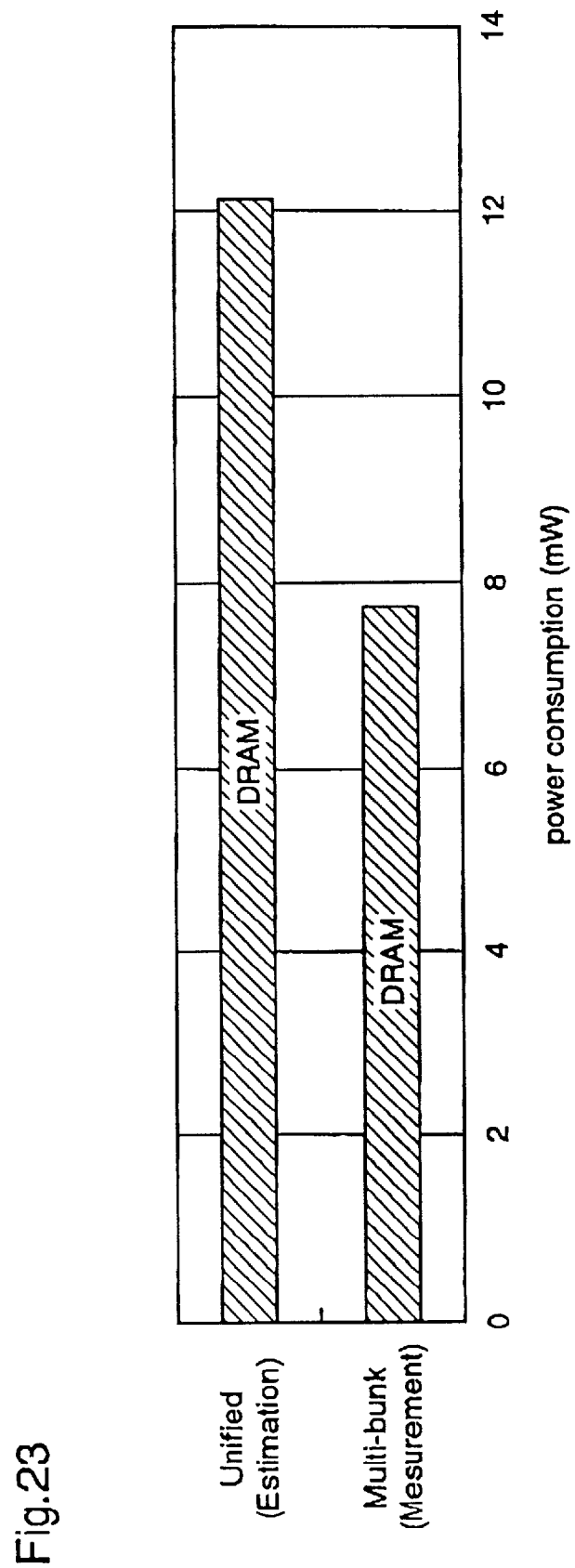
FIG. 23 is a graph for explaining comparison in power consumption between the case where Simple@L1 of MPEG4 is executed by divided memories and the case where it is executed by a single memory.

In execution of simple profile level 1 (Simple@L1) of MPEG4 under the above-mentioned control, when the estimated value in the case of using a memory constituted by a single DRAM is compared with the measured value in the case where a memory constituted by plural DRAMs, the memory constituted by plural DRAMs realizes about 36% of reduction in power consumption as shown in FIG. 23.

The DMA transfer process according to this twelfth embodiment can be applied to the case where there are plural sources of DMA transfer requests as described for the second embodiment As described above, according to the twelfth embodiment of the invention, the main memory (DRAM) as a continuous address area is physically divided into plural banks, and independent clocks are applied to only required banks. Therefore, the power is controlled with efficiency, resulting in a system that realizes lower power consumption.

Further, when only half of the mounted DRAMs are used depending on the application, the unnecessary half area is turned off in advance, whereby further reduction in power consumption is achieved.

Furthermore, when the use area varies in real time even during operation of an application, self-refreshing mode is performed on the unused banks, whereby the data are not lost and are fully used when the whole area is enabled again.

Moreover, since no clock and no control signal for auto-refreshing are inputted, the data are held and used at appropriate low power consumption.

While in this twelfth embodiment the main memory is divided into four banks, it may be divided into an arbitrary number of banks.

[Embodiment 13]

Hereinafter, a description will be given of a DMA controller according to a thirteenth embodiment of the present invention.

Figure 24:
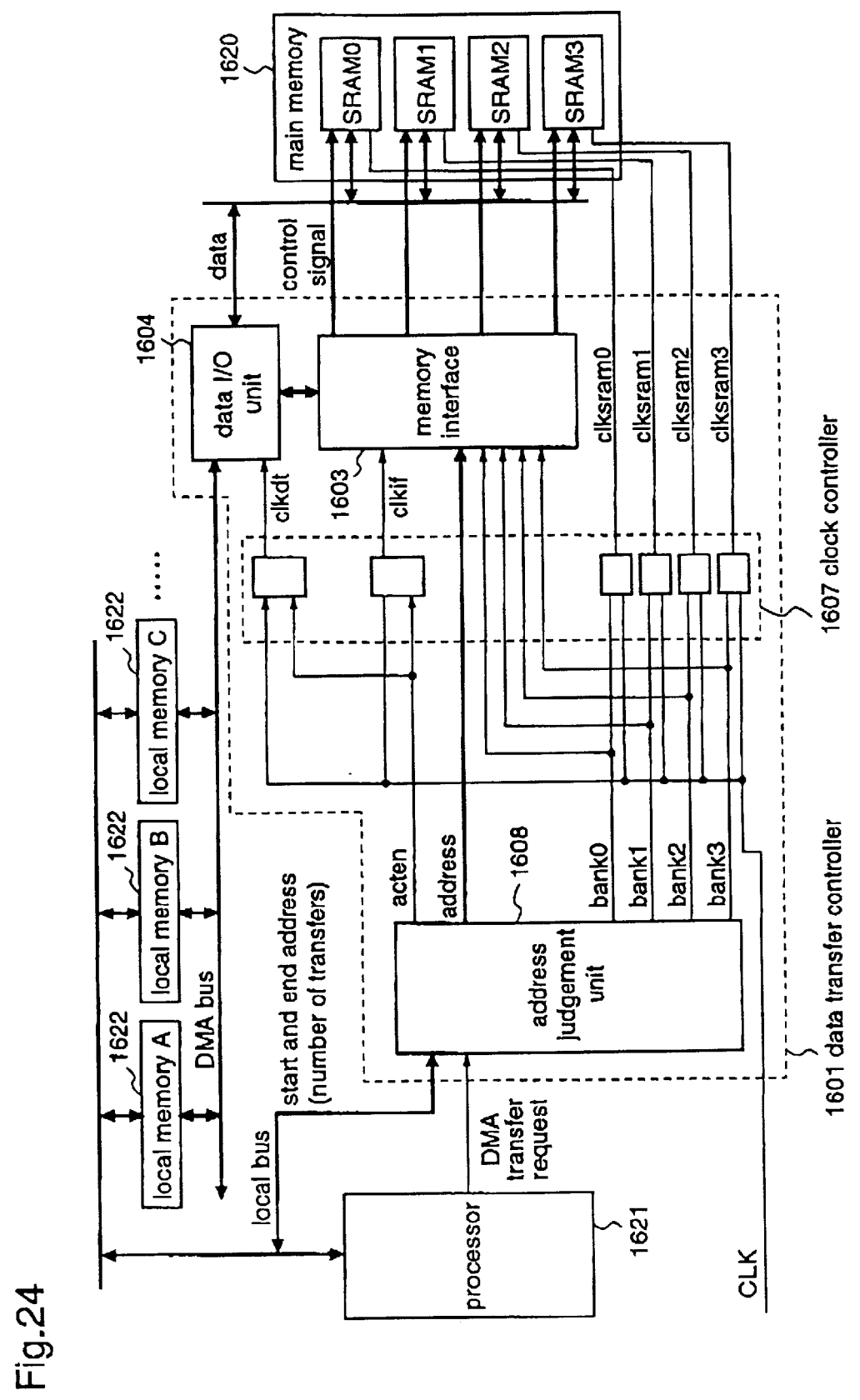

FIG. 24 is a block diagram illustrating a system including a DMA controller (data transfer controller) according to this thirteenth embodiment.

In FIG. 24, this system comprises a data transfer controller (DMA controller) 1601, a processor 1621, a main memory 1620, local memories 1622, a DMA bus, and a local bus.

The main memory 1620 holds various kinds of data, and it is constituted by a SRAM. A linear address area of the SRAM is physically divided into four banks (SRAM0~SRAM3), and independent clocks are inputted to the respective banks.

The processor 1621 controls the whole system including the DMA controller (data transfer controller) 1601, and issues a DMA transfer request to the data transfer controller 1601.

The local memories 1622 are a group of local memories connected to the processor 1621 through the local bus.

The data transfer controller (DMA controller) 1601 comprises a memory interface 1603, a data I/O unit 1604, a clock controller 1607, and an address judgement unit 1608.

The memory interface 1603 receives a command from the processor 1621 to control the main memory 1620. The address judgement unit 1608 specifies an address area to be accessed on the basis of a start address and an end address (or the number of transfers) which are set from the processor 1621, and outputs a control signal to the clock controller 1607 that performs clock supply and stop. The data I/O unit 1604 and the main memory 1620 are operated according to the clock outputted from the clock controller 1607. The clock controller 1607 is constituted by, for example, an AND gate.

Next, the operation of the DMA controller (data transfer controller) 1601 in the system according to this thirteenth embodiment will be described with reference to FIG. 24.

The processor 1621 sets the DMA transfer start address and end address in the data transfer controller 1601, by using the local bus. The address information set by the processor 1621 is transmitted through the address judgement unit 1608 in the data transfer controller 1601 to the memory interface 1603, and the memory interface 1603 uses the address information when making access to the main memory 1602.

It is now assumed that the processor 1621 issues a new DMA transfer request. The processor 1621 sets a start address and an end address of the DMA transfer to be issued in the address judgement unit 1608 of the data transfer controller 1601. The address judgement 1608 judges a bank to be accessed (access bank) in the main memory 1602, on the basis of the set addresses. When the processor 1621 issues the DMA transfer request, the address judgement unit 1608 enables any of bank signals bank0~bank3 corresponding to the access bank to indicate the access bank.

The main memory 1620 is an area of 1 MByte as a whole, and each SRAM (bank) has the capacity of 256 KByte. In the main memory 1602, addresses are continuous in the 1 MByte area through the four SRAMs.

It is now assumed that the processor 1621 sets a 200KByte-th address as a start address and a 300 KByte-th address as an end address.

After the setting of the addresses, when the processor 1621 issues a DMA transfer request, the address judgement unit 1608 enables an operation enable signal acten, and enables the bank0 where the 200 KByte-th address (start address) exists and the bank1 where the 300 KByte-th address (end address) exists. At this time, the bank2 and the bank3 remain disabled.

On receipt of the control signal, the clock controller 1607 supplies the clocks corresponding to the bank0 and bank1 to the corresponding SRAMs in the main memory 1620, and stops supply of the clocks corresponding to the bank2 and bank3.

As described above, according to the thirteenth aspect, the main memory is physically divided into plural areas, and clock supply/stop is controlled in units of the areas (units of memories), on the basis of the DMA transfer period after the DMA transfer request has been issued, and the addresses to be accessed. Therefore, it is possible to operate a desired area of the circuit for a desired period of time. As the result, the power consumption of the circuit can be controlled efficiently, resulting in a system that achieves further reduction in power consumption.

Furthermore, although the address judgement unit 1608 specifies an address area to be accessed on the basis of the start address and the end address (or the number of transfers) that are set from the processor 1621, the address judgement unit 1608 may specify an access area in real time in synchronization with the address generator included in the memory interface 1603. In this case, the time and area when/where the clock is to be supplied can be controlled more precisely. Thereby, supply/stop of the clock can be controlled in real time, further reduction in power consumption is achieved.

Furthermore, while in this thirteenth embodiment a SRAM is employed as the main memory 1620, the above-mentioned clock control is achieved even when a DRAM is employed.

[Embodiment 14]

Hereinafter, a description will be given of a DMA controller according to a fourteenth embodiment of the present invention.

Figure 25:
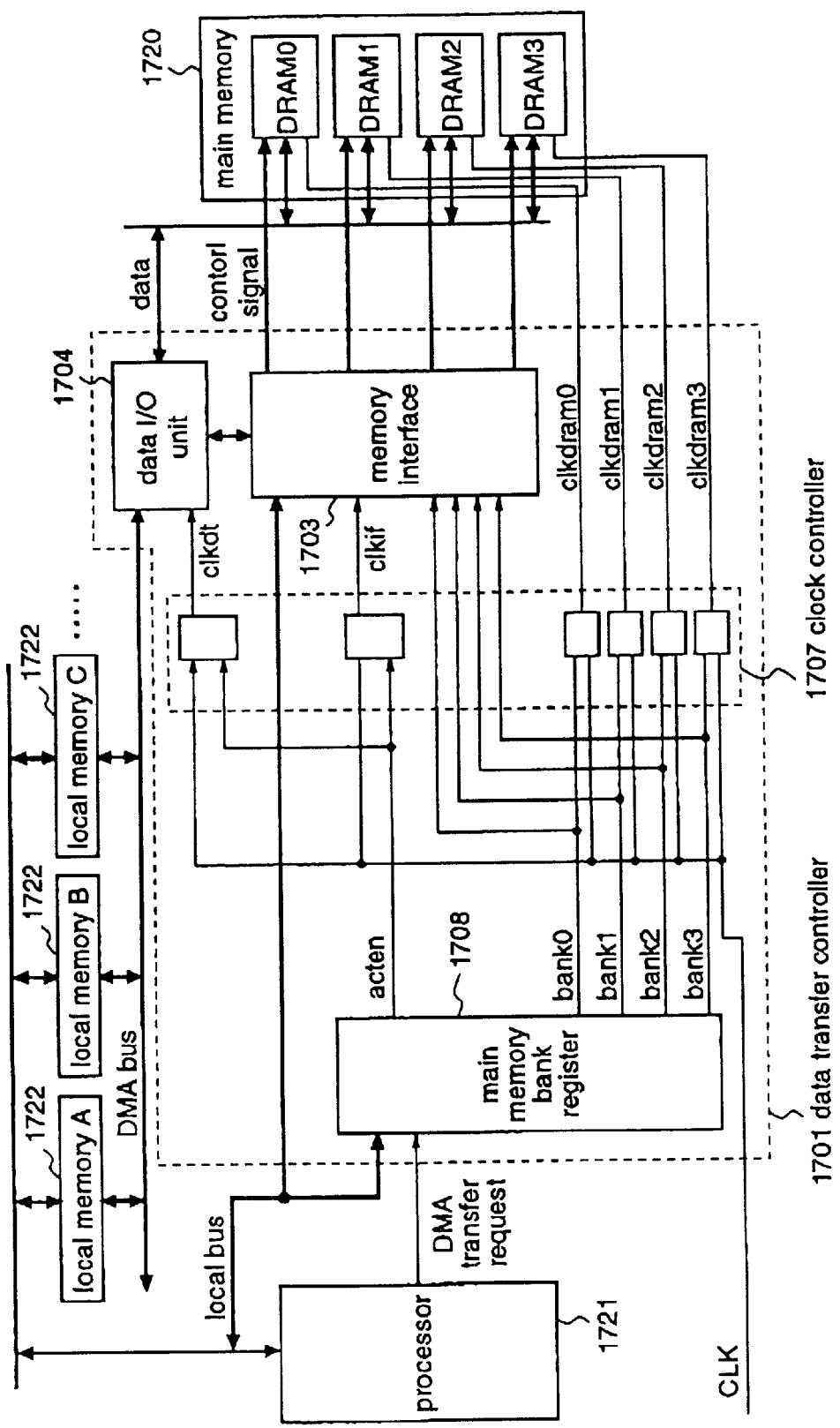
FIG. 25 is a block diagram illustrating a system including a DMA controller according to a fourteenth embodiment of the present invention.

FIG. 25 is a block diagram illustrating a system including a DMA controller (data transfer controller) according to this fourteenth embodiment.

In FIG. 25, this system comprises a data transfer controller (DMA controller) 1701, a processor 1721, a main memory 1720, local memories 1722, a DMA bus, and a local bus.

The main memory 1720 holds various kinds of data, and it is constituted by a DRAM. A linear address area of the DRAM is physically divided into four banks (DRAM0~DRAM3), and independent clocks are inputted to the respective banks.

The processor 1721 controls the whole system including the DMA controller (data transfer controller) 1701, and issues a DMA transfer request to the data transfer controller 1701.

The local memories 1722 are a group of local memories connected to the processor 1721 through the local bus.

The data transfer controller (DMA controller) 1701 comprises a memory interface 1703, a data I/O unit 1704, a clock controller 1707, and a main memory bank register 1708.

The memory interface 1703 receives a command from the processor 1721 to control the main memory 1720. The processor 1721 sets a memory area to be used in the main memory bank register 1708 through the local bus. The data I/O unit 1704 and the main memorory 1720 are operated according to the clock outputted from the clock controller 1607. The clock controller 1707 is constituted by, for example, an AND gate.

Next, the operation of the DMA controller (data transfer controller) 1701 in the system according to this fourteenth embodiment will be described with reference to FIG. 25.

It is assumed that the main memory 1720 is an area of 1 MByte area as a whole, and each DRAM has a capacity of 256 KByte. In the main memory 1702, addresses are continuous in the 1 MByte area through the four DRAMs.

Assuming that the whole area of the main memory 1720 is to be used, the processor 1721 performs setting to enable the whole area, through the local bus, on the main memory bank register 1708 in the data transfer controller 1701. Further, it is assumed that "111" is written in the main memory bank register 1708.

Further, the processor 1721 sets the DMA transfer start address, the number of transfers, and the like, in the memory interface 1703 in the data transfer controller 1701, using the local bus. Based on this information, the memory interface 1703 generates addresses for access to the main memory 1720.

Next, in order to execute DMA transfer, the processor 1721 issues a DMA transfer request. On receipt of the DMA transfer request, the main memory bank register 1708 enables an operation enable signal acten, and enables bank signals bank0~bank3. Thereby, clocks are supplied to all of the circuits and memories, and access and refreshing are permitted to all of the memories. When the access is ended, the supply of all clocks is stopped.

When a series of DMA transfer to execute the required processing is ended in this state, the processor 1721 sets a DRAM area required for the next processing, in the main memory bank register 1708.

It is assumed that the next processing requires only half of the main memory 1702 (i.e., DRAM0 and DRAM1). If the data of the remaining half area (i.e., DRAM2 and DRAM3)

should be maintained, the DRAM2 and the DRAM3 are set in the self-refreshing mode. On the other hand, if the data may be erased, the DRAM2 and the DRAM3 are set in the OFF states. For example, "101" is set for the self-refreshing, and "001" is set for the OFF state.

It is assumed that the processor 1721 sets "001" (OFF) in the main memory bank register 1708.

The processor 1721 sets the address, the number of transfers, and the like in the memory interface 1703 through the local bus and, thereafter, issues a DMA transfer request. Then, the main memory bank register 1708 enables the bank0 and bank1 while the bank2 and bank3 are disabled. On receipt of this, the clock controller 1707 supplies the clocks to the bank0 and bank1. Further, the memory interface 1703 supplies the control signal to the bank0 and bank1 to execute refreshing, while no access control is performed on the bank2 and bank3. That is, although the clocks are supplied from the clock controller 1707 while access is being executed, supply of the clocks from the clock controller 1707 to all the circuits and memories is stopped when the access is completed.

However, refreshing is periodically performed on the selected DRAMs by the memory interface 1703 so that the data are not erased.

As described above, according to the fourteenth embodiment of the present invention, the memory is physically divided into plural areas, and a memory area to be used is selected according to the processing mode while unnecessary memory areas are disabled. Therefore, it is possible to realize a processing system that can reduce the power consumption, and that can flexibly cope with various kinds of processing modes.

Further, since the operating area is set in advance, a circuit to decide the area is not required, and refreshing control can easily be selected and executed when the main memory is a DRAM.

[Embodiment 15]

Hereinafter, a description will be given of a DMA controller according to a fifteenth embodiment of the present invention.

Figure 26:
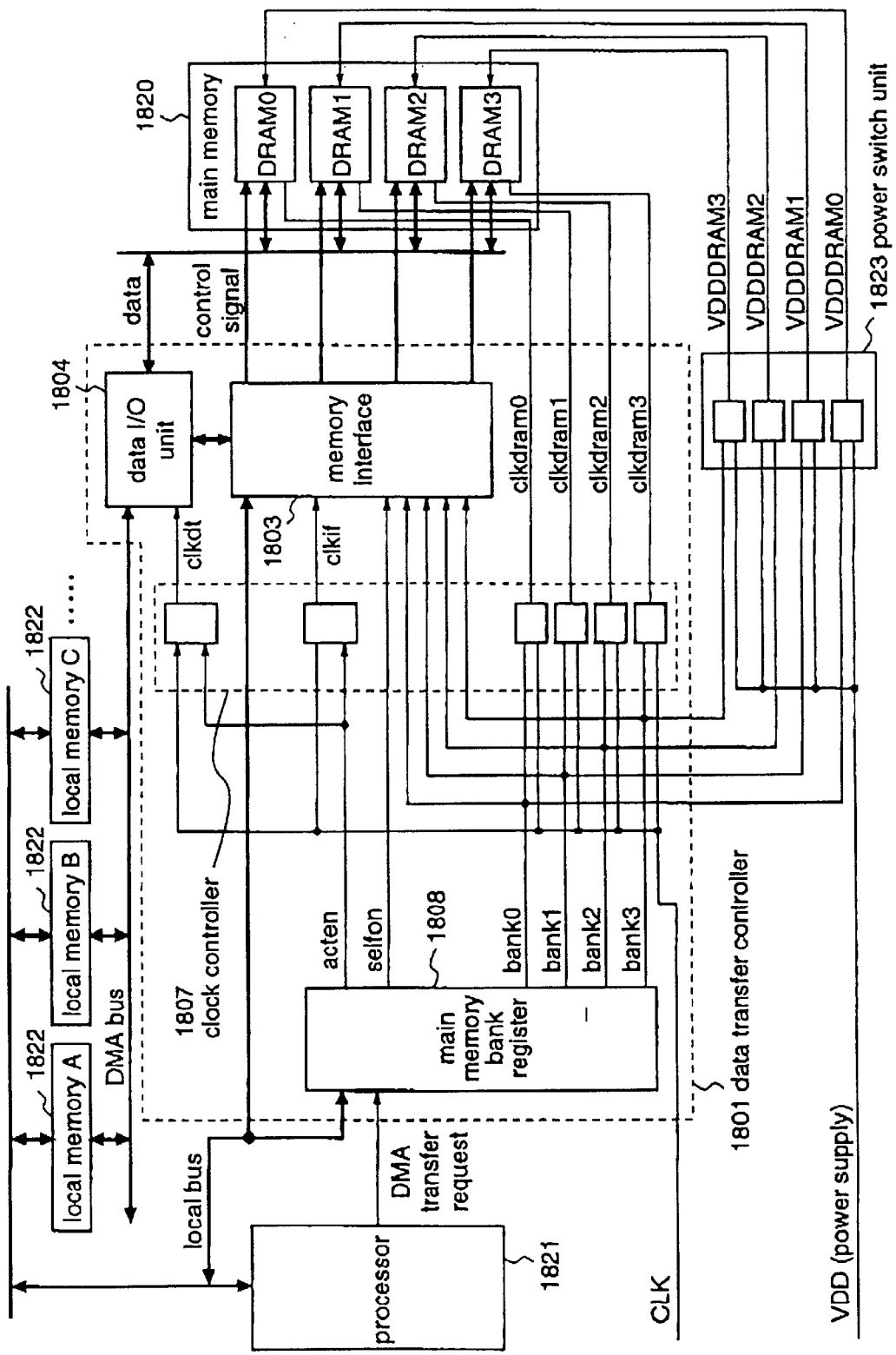
FIG. 26 is a block diagram illustrating a system including a DMA controller according to a fifteenth embodiment of the present invention.
Figure 27:
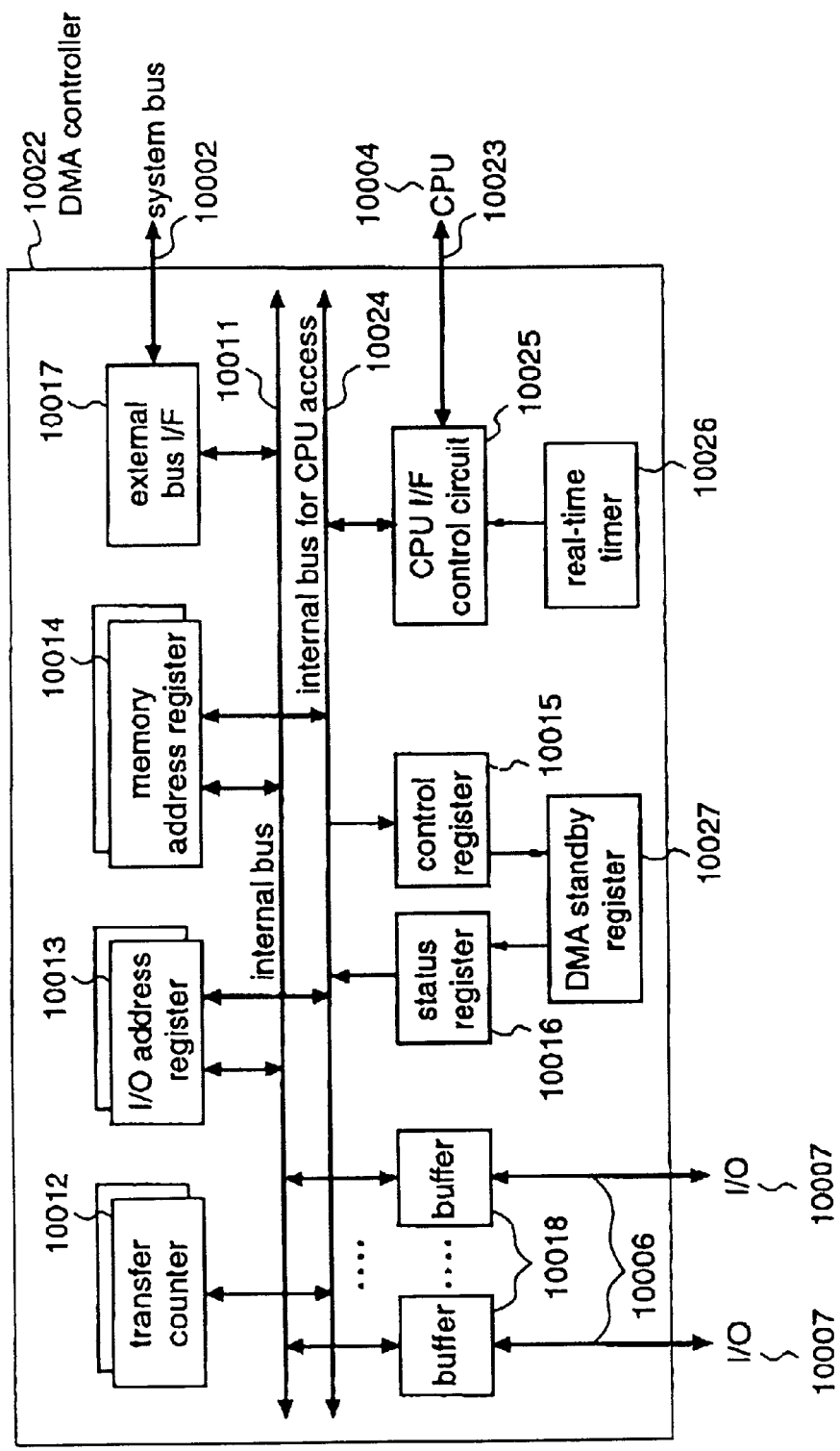
FIG. 27 is a block diagram illustrating a DMAC as a conventional direct memory access controller.
Figure 28:
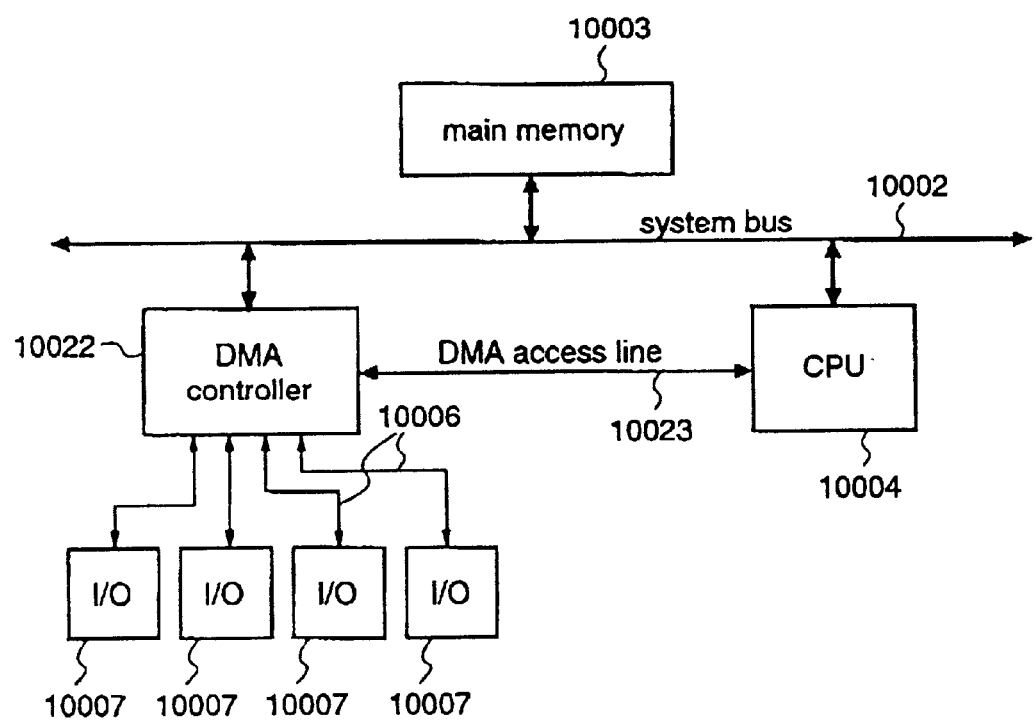
FIG. 28 is a block diagram illustrating a data processing apparatus including the DMAC.
Figure 29:
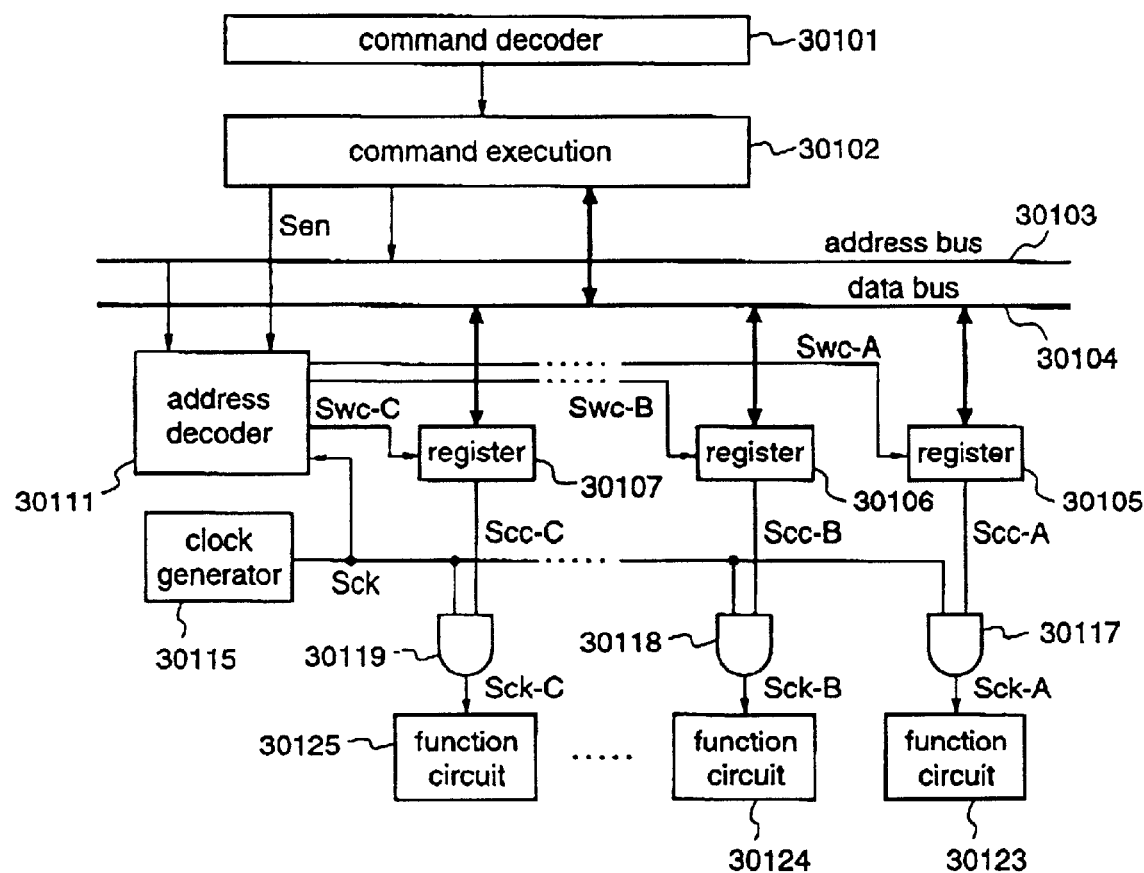
FIG. 29 is a block diagram illustrating an example of a conventional low power consumption apparatus.
Figure 30:
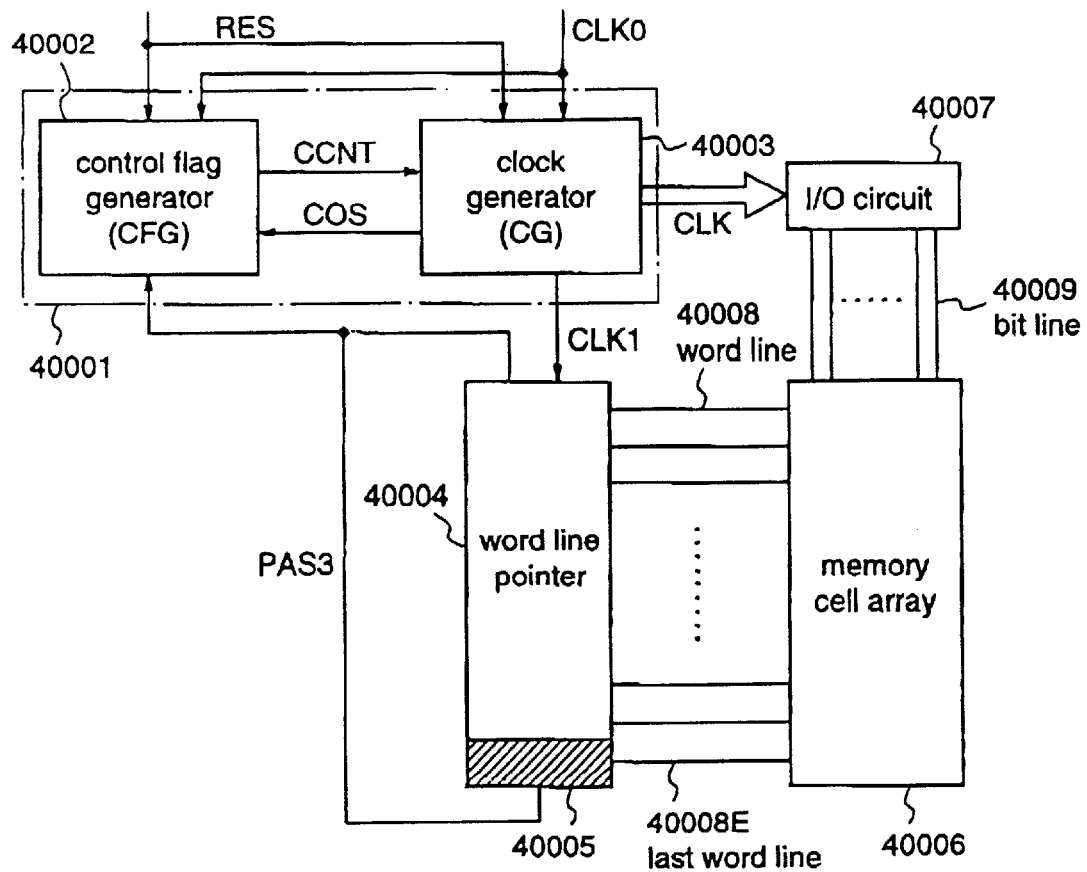
FIG. 30 is a block diagram illustrating an example of a conventional FIFO memory with regard to its function.
Figure 31:
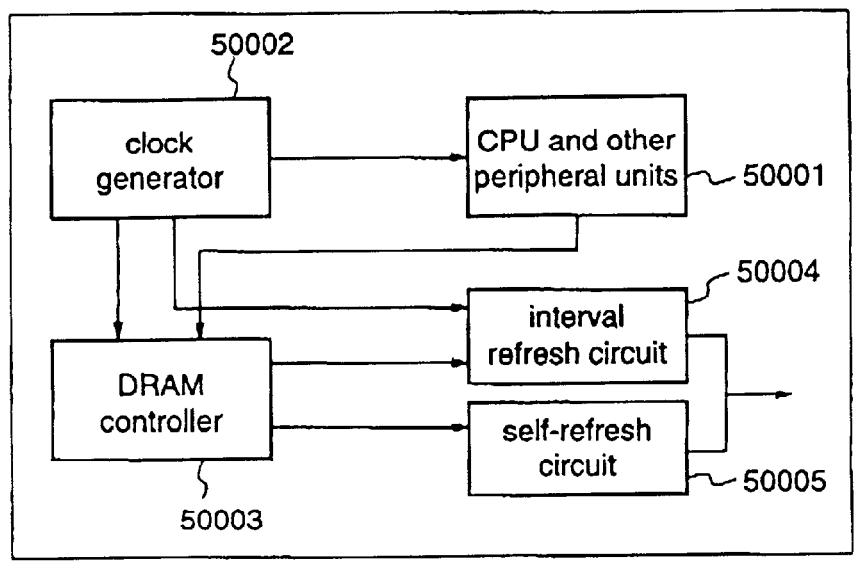
FIG. 31 is a block diagram illustrating an example of a conventional microcomputer system.
Figure 32:
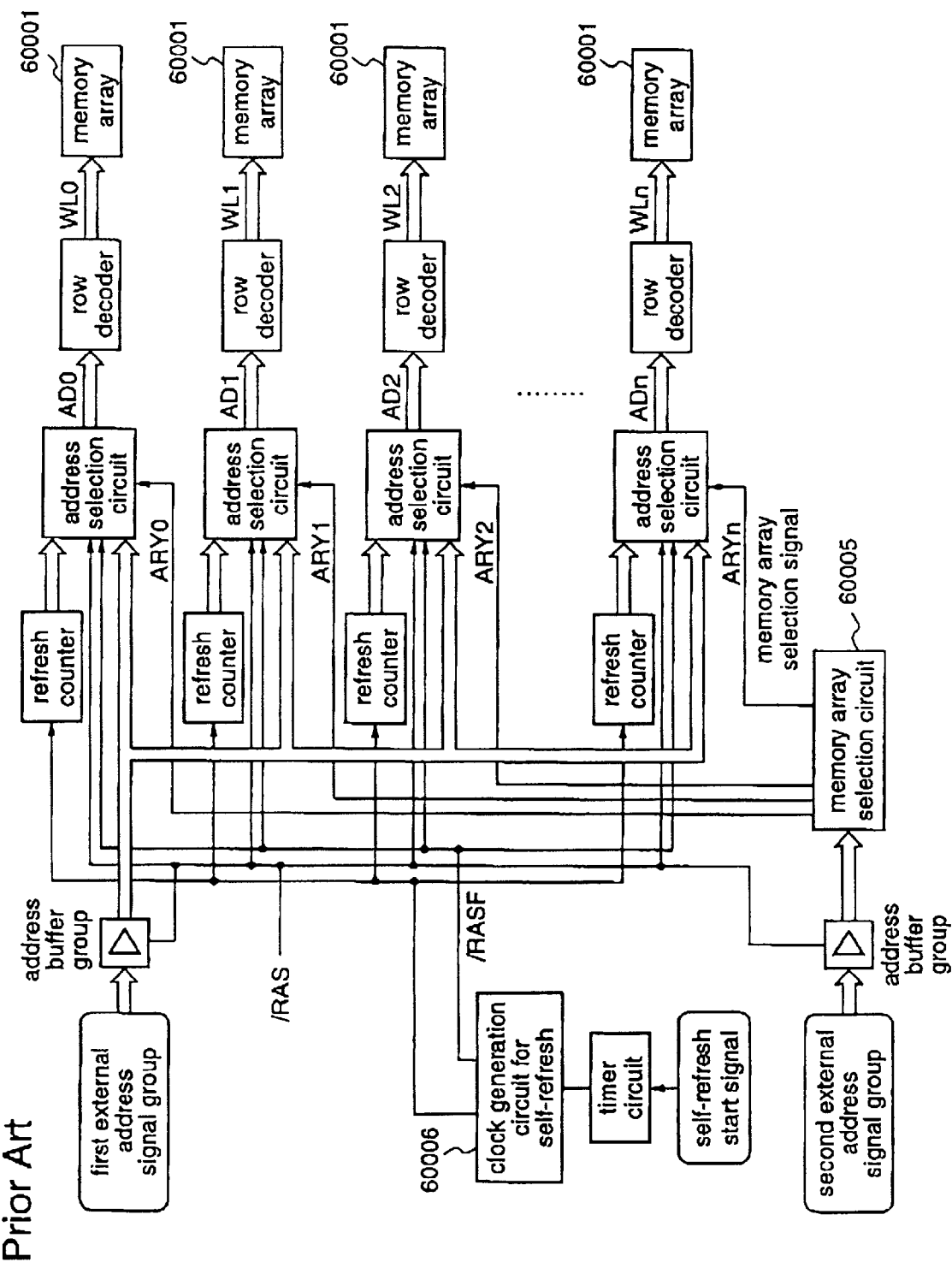
FIG. 32 is a block diagram illustrating a conventional semiconductor memory device in which a memory cell array is divided.

FIG. 26 is a block diagram illustrating a system including a DMA controller (data transfer controller) according to the twelfth embodiment.

In FIG. 26, the system comprises a data transfer controller (DMA controller) 1801, a processor 1821, a main memory 1820, local memories 1882, a power switch unit 1823, a DMA bus, and a local bus. The constituents of the data transfer controller 1801 are identical to those described for the fourteenth embodiment and, therefore, do not require repeated description.

The power switch unit 1823 comprises power switches corresponding to the DRAM0~DRAM3 in the main memory 1820 which are obtained by dividing the linear address area into four banks, and the power switches control supply of power to the respective DRAMs.

Next, a description will be given of the operation of the DMA controller (data transfer controller) 1801 in the system according to the fifteenth embodiment.

Bank selection signals bank0~bank3 are applied to the power switches corresponding to the DRAM0~DRAM3 in the power switch unit 1823. When the bank0~bank3 are ineffective, no power is supplied to the DRAMs by, for example, grounding.

When the control as described for this fourteenth embodiment is performed, not only clock supply but also power supply are stopped with respect to unselected memories in the system.

As described above, according to the fifteenth embodiment of the invention, since the memory is physically divided into plural areas and each memory area is provided with a power switch, leakage current from unused main memory is suppressed, resulting in further reduction in power consumption.

What is claimed is:

1. A high-performance DMA controller which is a data transfer controller for controlling data transfer between a main storage means holding various kinds of data, and a plurality of local storage means, said data transfer controller comprising:
    an interface for generating a control signal for controlling the main storage means;
    a data I/O unit for controlling input and output of data;
    a parameter holding unit for holding various kinds of parameters that are required for execution of data transfer;
    a data transfer request receiver for receiving requests of data transfer; and
    a start command receiver for receiving a start/stop command of the data transfer controller;
    wherein said data transfer request receiver receives, from a data transfer request source, reservations of plural data transfer requests comprising execution priority information and local storage means type information, each information being arbitrarily set by the data transfer request source, and holds the local storage means type information in association with each execution priority information; and
    said data transfer controller receives only the reservations of data transfer requests until a start command is issued from a system controller for controlling the whole apparatus and, when a start command is issued from the system controller, the data transfer controller sequentially decodes the local storage means type information of the reserved data transfer requests having relatively high execution priorities, in chronological order of the data transfer requests, and then sequentially takes parameters required for data transfer from the parameter holding unit according to the decoding result, to execute data transfer.

2. A high-performance DMA controller as defined in claim 1 wherein:
    when there are a plurality of data transfer request sources, said data transfer controller is provided with an auxiliary reservation unit for receiving reservations of data transfer requests from each of the data transfer request sources, said data transfer requests including execution priority information and local storage means type information which are arbitrarily set by the data transfer request sources; and
    said auxiliary reservation means transfers the data transfer requests which have been received for each of the data transfer request sources, to the data transfer request receiver, according to predetermined priorities of the data transfer request sources.

3. A high performance DMA controller as defined in claim 1, wherein one of the plural data transfer request sources is a system controller for controlling the whole system.

4. A high-performance DMA controller as defined in claim 2 wherein:
    said auxiliary reservation means comprises;
    a plurality of auxiliary reservation registers for temporarily holding the data transfer requests from the respective data transfer request sources, and an auxiliary selector for selecting the outputs of the data transfer requests which have temporarily been stored in the auxiliary reservation registers; and said auxiliary selector selects the data transfer requests according to the predetermined priorities of the data transfer request sources, and transfers them to the data transfer request receiver.

5. A high-performance DMA controller as defined in claim 1, wherein:

said data transfer request receiver comprises;
a priority level decoder for decoding the execution priority information of the data transfer requests,
a reservation register corresponding to each execution priority information, for holding the local storage means type information in association with each execution priority information, and
a selector for selecting the outputs of thelocal storage means type information; and said priority level decoder stores the plural data transfer requests in the reservation registers corresponding to the respective execution priority information, and said selector selects the local storage means type information to be executed next, according to the status of a reservation flag indicating whether or not the reservation register corresponding to each execution priority information holds the reservation of the data transfer request, and transfers the selected information to the interface.

6. A high-performance DMA controller as defined in claim 5, wherein said data transfer controller determines data transfer type information to be executed next from the data transfer requests previously reserved in the reservation registers, according to the execution priority information and the times at which the transfer requests have been made, at a time a predetermined period before the end of the previous data transfer.

7. A high-performance DMA controller as defined in claim 6, wherein any of the data transfer requests includes a cancel command for canceling a data transfer request reserved in any of the reservation registers.

8. A high-performance DMA controller as defined in claim 7, wherein said cancel command is effective to data transfer that is currently executed.

9. A high-performance DMA controller as defined in claim 7, wherein:

said priority level decoder further decodes whether any of the data transfer requests includes a cancel command for canceling a data transfer request reserved in any of the reservation registers;
when a cancel command is made to a reserved data transfer request, the data transfer request is canceled by changing the status of the reservation flag; and
when a cancel command is made to data transfer that is currently executed, the system controller terminates the data transfer.

10. A high-performance DMA controller as defined in claim 5, wherein:

said data transfer request receiver is connected to the system controller that controls the whole apparatus; and
said reservation register corresponding to each execution priority information comprises;
a plurality of setting registers arranged in a ring shape, and
a pointer register for selecting, from the plural setting registers, a setting register to be set next, and a setting register to be executed next.

11. A high-performance DMA controller as defined in claim 10, wherein:

said data transfer request receiver is connected to the system controller; and
said plural setting registers or said pointer register are/is arbitrarily read or written by the system controller, regardless of the data transfer requests.

12. A high-performance DMA controller as defined in claim 5, wherein:

said plural data transfer requests further include execution timing information that indicates timings to execute the data transfer requests reserved in the reservation register; and
said data transfer request receiver does not execute data transfer including the execution timing information at timing other than the specified execution timing, regardless of the execution priority, and executes data transfer when the execution timing has come, according to the execution priority at that time.

13. A high-performance DMA controller as defined in claim 12, wherein:

said execution timing information is the number of cycles from when a data transfer request is reserved to when the data transfer is executed; and
said reservation register corresponding to each execution priority information is further provided with a reservation timer for holding the number of cycles.

14. A high-performance DMA controller as defined in claim 12, wherein:

said execution timing information indicates whether a predetermined timing signal transmitted to the data transfer request receiver is to be used or not; and
said reservation register corresponding to each execution priority information is further provided with a timing designation register for holding designation as to whether the timing signal is to be used or not.

15. A high-performance DMA controller as defined in claim 12, wherein:

said execution timing information designates the type of a timing signal to be used, from plural timing signals transmitted to the data transfer request receiver; and
said reservation register corresponding to each execution priority information is further provided with a timing type register for holding the type of the designated timing signal.

16. A high-performance DMA controller as defined in claim 12, wherein:

said data transfer request further includes repetition information indicating the number of times the data transfer request is repeated;
said data transfer request receiver is further provided with a number-of-repetition designation register for holding the repetition information, and a number-of-repetition counter for counting the number-of-repetition; and
on receipt of the repetition information, said data transfer request receiver holds the reservation of the data transfer request, and when the execution timing has come, the data transfer request receiver executes the corresponding data transfer by the number of repetition times, according to the execution priority at that time.

17. A high-performance DMA controller as defined in claim 1, wherein:

said parameter holding unit has areas partitioned by addresses for each of the local storage means; and
parameters to be used for data transfer corresponding to each local storage means are previously stored in each area by the system controller.

18. A high-performance DMA controller as defined in claim 1, wherein:
said parameter holding unit has areas partitioned by addresses for each access pattern to the main storage means; and
parameters corresponding to each access pattern are previously stored in each area by the system controller.

19. A high-performance DMA controller as defined in claim 1, wherein:
said parameter holding unit has areas partitioned by addresses for each of the local storage means, and areas partitioned by addresses for each access pattern to the main storage means; and
parameters to be used for data transfer corresponding to each local storage means are previously stored in each of the areas partitioned by addresses for each local storage means, by the system controller, and parameters corresponding to each access pattern are previously stored in each of the areas partitioned by addresses for each access pattern, by the system controller.

20. A high-performance DMA controller as defined in claim 17, wherein:
the parameters stored in the parameter holding means include;
write/read information, access unit information, and access pattern information, corresponding to each local storage means, and
a start address, the number of transfers, rectangle area access information, and start and end address information of an area forming a ring buffer, corresponding to each access pattern.

21. A high-performance DMA controller as defined in claim 1, wherein:
said data transfer controller further includes a clock controller for controlling supply and stop of clocks to the interface, the data I/O unit, the parameter holding means, and the main storage means;
said clock controller stops supply of clocks when the system controller does not start the data transfer controller,
supplies clocks when the system controller starts the data transfer controller and a data transfer request is reserved in the data transfer request receiver, and
stops supply of clocks when the reservations in the data transfer request receiver have gone and the final data transfer has ended.

22. A high-performance DMA controller as defined in claim 12, wherein:
said data transfer controller is further provided with a clock controller for controlling supply and stop of clocks to the interface, the data I/O unit, the parameter holding means, and the main storage means;
said clock controller stops supply of clocks when the system controller does not start the data transfer controller,
supplies clocks when the system controller starts the data transfer controller and a data transfer request is reserved in the data transfer request receiver,
stops supply of clocks until the execution timing comes according to the execution timing information received by the data transfer request receiver even if the data transfer controller is started and a data transfer request is reserved, and starts supply of clocks when the execution timing has come, and
stops supply of clocks when the reservations in the data transfer request receiver have gone and the final data transfer has ended.

23. A high-performance DMA controller which is a data transfer controller for controlling data transfer between a main storage means holding various kinds of data, and a plurality of local storage means, wherein:
said main storage means comprises a plurality of individual main storage means that are obtained by dividing the main storage means into plural areas to which clocks are supplied independently;
said data transfer controller includes;
a clock controller for controlling supply and stop of clocks to the main storage means and the data transfer controller, and
an address decision unit for deciding an address area to access; and
said clock controller supplies clocks and control signals only to the areas-to-be-used selected by the address decision unit from the plural individual main storage means, and supplies no clocks and no control signal to the unselected areas.

24. A high-performance DMA controller which is a data transfer controller for controlling data transfer between a main storage means holding various kinds of data, and a plurality of local storage means, wherein:
said main storage means comprises a plurality of individual main storage means that are obtained by dividing the main storage means into plural areas to which clocks are supplied independently;
said data transfer controller includes;
a clock controller for controlling supply and stop of clocks to the main storage means and the data transfer controller, and
an area setting register for selecting areas-to-be-used from the individual main storage means; and
said clock controller supplies clocks and control signals only to the areas-to-be-used selected by the area setting register from the plural individual main storage means, and supplies no clocks and no control signals to the unselected areas.

25. A high-performance DMA controller as defined in claim 23, wherein:
said data transfer controller is provided with a power supply controller for controlling supply and stop of power to the individual main storage means; and
said power supply controller supplies power to only the selected areas-to-be-used, and supplies no power to the unselected areas.

26. A high-performance DMA controller as defined in claim 23, wherein the individual main storage means are constituted by SRAMs.

27. A high-performance DMA controller as defined in claim 23, wherein:
the individual main storage means are constituted by DRAMs, clocks and control signals are supplied to only selected DRAMs, and the selected DPAMs perform refreshing; and
no clocks and no control signals are supplied to unselected DRAMs, and the unselected DRAMs do no perform refreshing.

28. A high-performance DMA controller as defined in claim 23, wherein:
the individual main storage means are constituted by DRAMs, clocks and control signals are supplied to only selected DRAMs, and the selected DRAMs perform auto-refreshing; and
no clocks and no control signals are supplied to unselected DRAMs, and the unselected DRAMs do not perform auto-refreshing but perform self-refreshing.

* * * * *